(12) United States Patent
Terayama

(10) Patent No.: US 8,248,699 B2
(45) Date of Patent: Aug. 21, 2012

(54) REFLECTION REDUCING FILM, OPTICAL MEMBER AND OPTICAL SYSTEM

(75) Inventor: Etsuo Terayama, Saitama (JP)

(73) Assignee: Fujifilm Corporation, Tokyo (JP)

( * ) Notice: Subject to any disclaimer, the term of this patent is extended or adjusted under 35 U.S.C. 154(b) by 488 days.

(21) Appl. No.: 12/470,216

(22) Filed: May 21, 2009

(65) Prior Publication Data

US 2009/0290219 A1 Nov. 26, 2009

(30) Foreign Application Priority Data

May 22, 2008 (JP) ................ P2008-134224
May 22, 2008 (JP) ................ P2008-134225

(51) Int. Cl.
*G02B 1/10* (2006.01)
(52) U.S. Cl. ................ 359/588; 359/581
(58) Field of Classification Search ............ 359/581, 359/586, 588
See application file for complete search history.

(56) References Cited

U.S. PATENT DOCUMENTS

2005/0122576 A1   6/2005   Yonetani et al.

FOREIGN PATENT DOCUMENTS

| EP | 1808714 A1 | 7/2007 |
|---|---|---|
| JP | 60-32001 | 2/1985 |
| JP | 61-80203 | 4/1986 |
| JP | 2001-100002 A | 4/2001 |
| JP | 2002-267801 A | 9/2002 |
| JP | 2003-248103 | 9/2003 |
| JP | 2004-198778 | 7/2004 |
| JP | 2005-338366 A | 12/2005 |
| JP | 2006-228285 | 8/2006 |
| JP | 2007-156365 | 6/2007 |

OTHER PUBLICATIONS

Tikhonravov et al., "Application of the Needle Optimization Technique to the Design of Optical Coatings", Applied Optics, vol. 35, No. 28, Oct. 1, 1996, pp. 5493-5508, XP009053835.
Tikhonravov et al., "Development of the Needle Optimization Technique and New Features of 'OptiLayer' Design Software", SPIE, vol. 2253, pp. 10-20, XP007915354, Nov. 4, 1994.
Extended European Search Report dated Apr. 11, 2011 in corresponding European Application No. 09006854.5.
Office Action, Japanese Notification of Reasons for Refusal for Japanese Patent Application No. 2008-134224, Jul. 27, 2010.
Office Action, Japanese Notification of Reasons for Refusal for Japanese Patent Application No. 2008-134225, Jul. 27, 2010.
"Thin Films & Their Applications in Opto-Electronics", The Optronics Co. Ltd, pp. 246-247, Oct. 9, 1989.

*Primary Examiner* — Alessandro Amari
(74) *Attorney, Agent, or Firm* — Birch, Stewart, Kolasch & Birch, LLP

(57) ABSTRACT

A reflection reducing film is provided on a surface of an optical substrate, and is sequentially provided with a buffer layer and a reflection reducing layer. The reflection reducing layer includes first to eighth layers sequentially laminated from the side of the buffer layer. The first and sixth layers are made of a low-refractive index material having a refractive index in the range of 1.35 to 1.50 at the d-line, the third, fifth and seventh layers are made of an intermediate-refractive index material having a refractive index in the range of 1.55 to 1.85 at the d-line, and the second, fourth and eighth layers are made of a high-refractive index material having a refractive index in the range of 1.70 to 2.50 at the d-line.

8 Claims, 45 Drawing Sheets

EXAMPLE 1-4

EXAMPLE 1-4

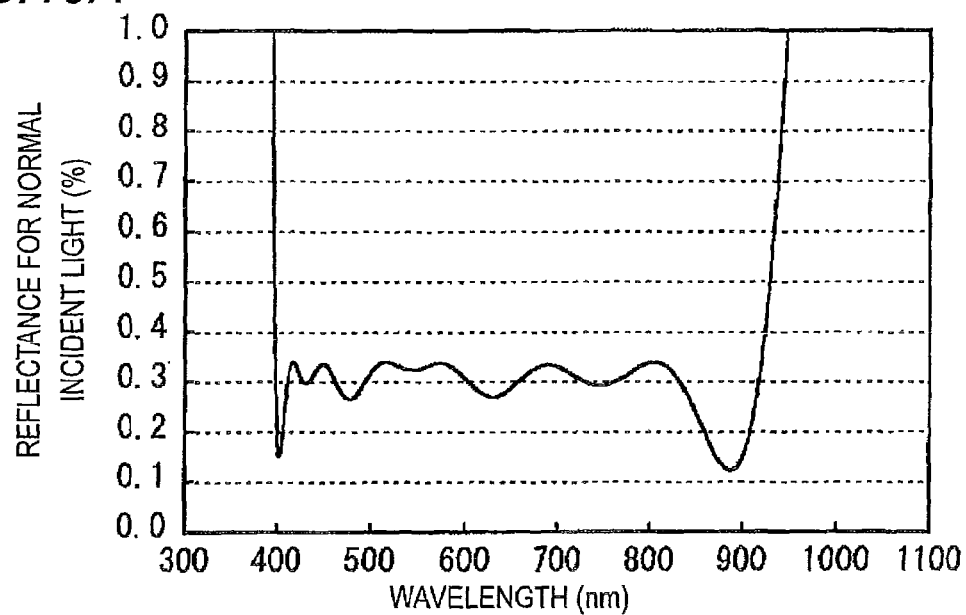
FIG.19A EXAMPLE 1-6
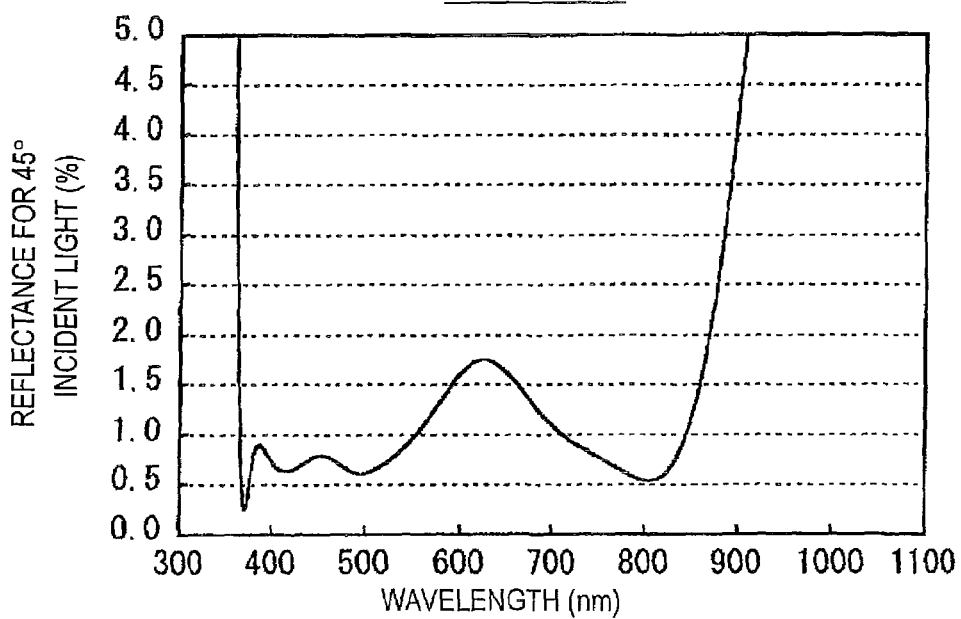
FIG.19B EXAMPLE 1-6

EXAMPLE 4-1

EXAMPLE 4-1

EXAMPLE 6-2

EXAMPLE 6-2

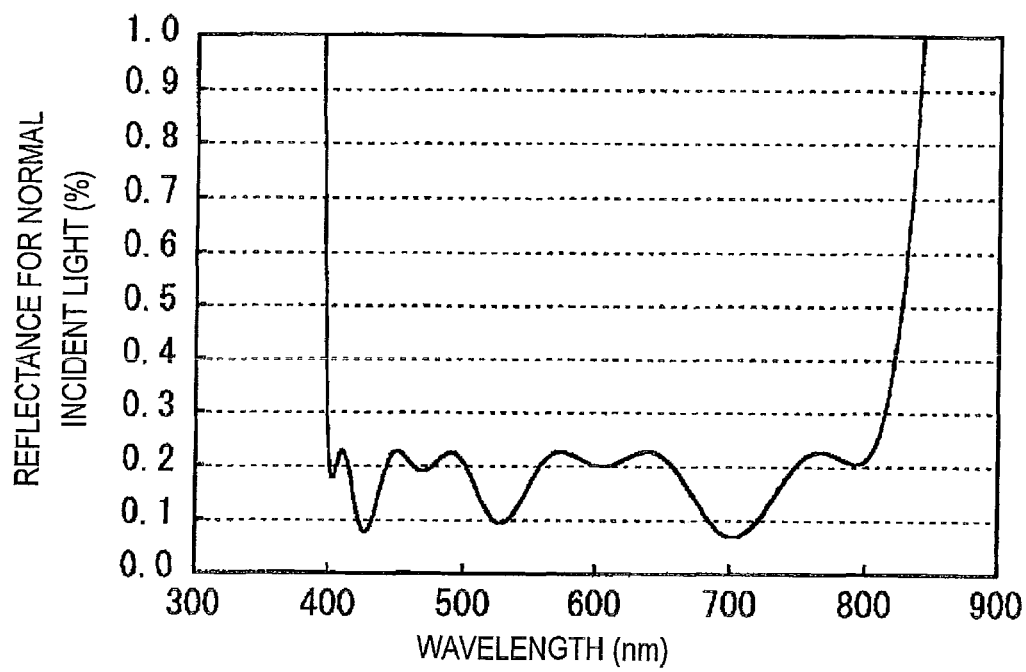
FIG.43A EXAMPLE 9-4
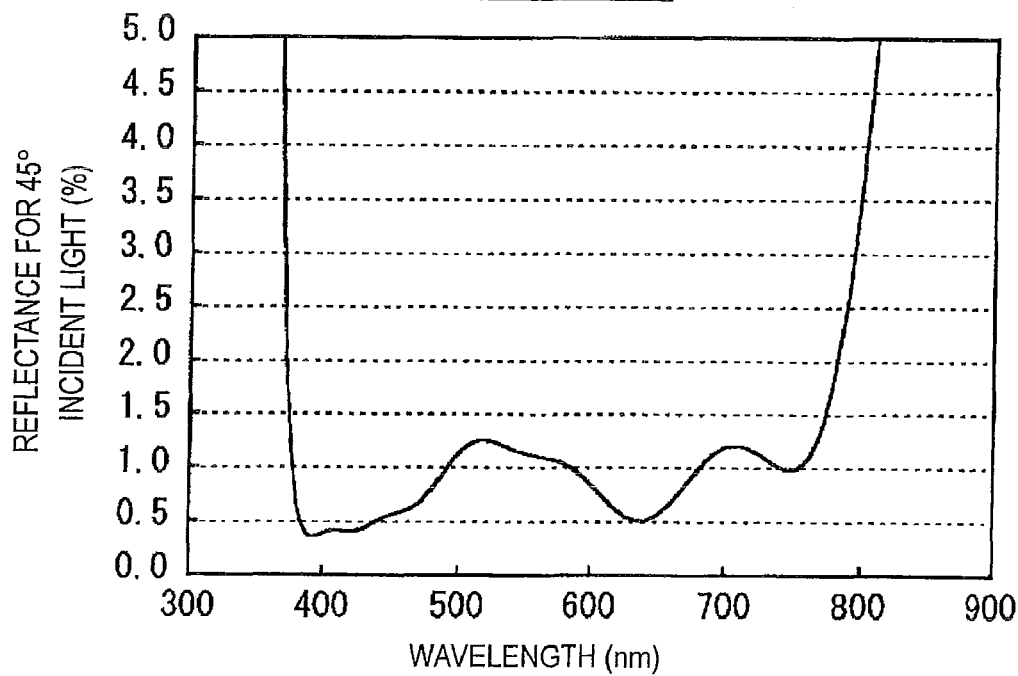
FIG.43B EXAMPLE 9-4

REFLECTION REDUCING FILM, OPTICAL MEMBER AND OPTICAL SYSTEM

CROSS-REFERENCE TO RELATED APPLICATIONS

This application is based on and claims priority under 35 USC 119 from Japanese Patent Application No. 2008-134224 filed May 22, 2008 and Japanese Patent Application No. 2008-134225 filed May 22, 2008; the entire contents of which are incorporated herein by reference.

BACKGROUND

1. Technical Field

The present invention relates to a reflection reducing film which is formed on one face of an optical member such as a lens, a filter and the like to exhibit a reflection reducing effect with respect to light having a predetermined wavelength band, and an optical member and an optical system which have the reflection reducing film.

2. Related Art

Generally, an image pickup apparatus such as a photographic camera or a TV broadcasting camera has a number of optical members such as lenses, prisms, filters and the like disposed on an optical path thereof. When light is incident on surfaces of the respective optical members, a portion of the light becomes reflection light. Herein, when the number of the optical members increases, a total amount of the reflection light increases and thus defects, for example, flare and ghost occur in images of a broadcasting camera. In addition, since reflectances on the surfaces of the optical members have distribution with respect to a wavelength of the incident light and wavelength dependences of various reflectances are shown in accordance with constituent materials for the respective optical member, a chromaticity balance deteriorates, and thus it is necessary to adjust a white balance in an entire image pickup apparatus.

Accordingly, a surface of each optical member may be provided with a reflection reducing film (also referred to as the antireflection film). The reflection reducing film is a multilayer film in which dielectric films having different refractive indices are combined, and a configuration thereof is disclosed in, for example, the following Non-Patent Document 1. In the Non-Patent Document 1 ("Light Thin Film Manual", The Optronics Co., Ltd, Oct. 9, 1989, P 246-247), an antireflection film having a 5-layer structure is disclosed and an attempt has been made to achieve a low reflectance over a wider band.

In addition to the Non-Patent Document 1, Patent Document 1 (JP-A-2002-267801) discloses an antireflection film having a 9-layer structure.

For example, the antireflection film disclosed in the above Non-Patent Document 1 exhibits relatively excellent low reflectance characteristics when being provided on an optical substrate having a refractive index lower than 1.70 at the d-line. However, it is found that there is a tendency in which flatness in reflectance distribution is lost as described later and a reflectance is thus increased at a specific wavelength when the antireflection film is provided on an optical substrate having a high refractive index higher than 1.75.

Tables 1 and 2 show basic data (constituent materials, refractive indices and optical film thicknesses) of antireflection films (Related examples 1 and 2) having a laminate structure corresponding to the antireflection film disclosed in Non-Patent Document 1. And FIG. 45 shows reflectance distributions of the antireflection films having the basic data of Tables 1 and 2.

TABLE 1

| RELATED EXAMPLE 1 | CONSTITUENT MATERIAL | REFRACTIVE INDEX N | CENTER WAVELENGTH λ0 = 500 nm OPTICAL FILM THICKNESS INDEX N × d |
|---|---|---|---|
| OPTICAL SUBSTRATE | BK-7 | 1.51 | — |
| 1st LAYER | SUB-M1 | 1.67 | 0.25 λ0 |
| 2nd LAYER | ZrO$_2$ | 2.05 | 0.50 λ0 |
| 3rd LAYER | Al$_2$O$_3$ | 1.62 | 0.50 λ0 |
| 4th LAYER | SUB-H4 | 2.05 | 0.50 λ0 |
| 5th LAYER | MgF$_2$ | 1.39 | 0.25 λ0 |
| AIR | — | 1.00 | — |

TABLE 2

| RELATED EXAMPLE 2 | CONSTITUENT MATERIAL | REFRACTIVE INDEX N | CENTER WAVELENGTH λ0 = 500 nm OPTICAL FILM THICKNESS INDEX N × d |
|---|---|---|---|
| OPTICAL SUBSTRATE | S-LAH58 | 1.88 | — |
| 1st LAYER | SUB-M3 | 1.78 | 0.25 λ0 |
| 2nd LAYER | ZrO$_2$ | 2.05 | 0.50 λ0 |
| 3rd LAYER | Al$_2$O$_3$ | 1.62 | 0.50 λ0 |
| 4th LAYER | SUB-H4 | 2.05 | 0.50 λ0 |
| 5th LAYER | MgF$_2$ | 1.39 | 0.25 λ0 |
| AIR | — | 1.00 | — |

Related example 1 of Table 1 is a constitutional example when a refractive index of an optical substrate on which the antireflection film is formed is relatively low, and Related example 2 of Table 2 is a constitutional example when a refractive index of an optical substrate is relatively high. In Tables 1 and 2, "SUB-M1" represents a substance M1 (Merck & Co., Inc.) including PrAlO$_3$ as a main component, "SUB-M3" represents a substance M3 (Merck & Co., Inc.) including lanthanum aluminate (La$_{2x}$Al$_{2Y}$O$_{3(X+Y)}$) as a main component, and "SUB-H4" represents a substance H4 (Merck & Co., Inc.) including LaTiO$_3$ as a main component. In FIG. 45, a curved line 23A indicates the reflectance distribution of Related example 1 and a curved line 23B indicates the reflectance distribution of Related example 2. In Related example 2 in which the refractive index of the optical substrate is 1.8830 as above, the reflectance distribution is not flat and peaks are generated at wavelengths of about 420 nm, 510 nm and 650 nm.

Moreover, recently, demand for a day and night vision camera (day-night-camera) as a broadcasting camera increases. However, the antireflection film described in the above Patent Document 1 has insufficient antireflection performance in a near-infrared region. Thus, an optical system capable of excellently performing photographing in a near-infrared region at a wavelength of about 700 to 900 nm in addition to in a visible light region is strongly required.

Accordingly, a reflection reducing film, which has a sufficiently low reflectance for light at a wavelength of about 400 to 900 nm even when being provided on an optical substrate having a relatively high refractive index, is desired.

SUMMARY

The invention is contrived in view of the problem and a first object of the invention is to provide a reflection reducing film which has a sufficiently reduced reflectance in a wider wavelength band. A second object of the invention is to provide an optical member and an optical system which have the reflection reducing film.

A reflection reducing film of the invention includes: a reflection reducing layer which is provided on a substrate and includes first to eighth layers sequentially laminated from the opposite side to the substrate. The first and sixth layers are made of a low-refractive index material having a refractive index equal to or higher than 1.35 and equal to or lower than 1.50 at the d-line, the third, fifth and seventh layers are made of an intermediate-refractive index material having a refractive index equal to or higher than 1.55 and equal to or lower than 1.85 at the d-line, and the second, fourth and eighth layers are made of a high-refractive index material having a refractive index higher than that of the intermediate-refractive index material in the range of 1.70 to 2.50 at the d-line. An optical member of the invention has the reflection reducing film provided on a surface thereof, and an optical system of the invention is provided with the optical member.

In the reflection reducing film of the invention, the first to eighth layers of the reflection reducing layer provided on the substrate are made of materials having predetermined refractive indices and thus reflectance distribution is sufficiently reduced in a wider wavelength band.

In the reflection reducing film of the invention, all the following conditional expressions (1) to (8) are preferably satisfied. $\lambda 0$ is a center wavelength, N1 to N8 are refractive indices of the first to eighth layers at the center wavelength $\lambda 0$, and d1 to d8 are physical film thicknesses of the first to eighth layers.

$$0.23 \times \lambda 0 \leq N1 \times d1 \leq 0.25 \times \lambda 0 \quad (1)$$

$$0.11 \times \lambda 0 \leq N2 \times d2 \leq 0.13 \times \lambda 0 \quad (2)$$

$$0.03 \times \lambda 0 \leq N3 \times d3 \leq 0.05 \times \lambda 0 \quad (3)$$

$$0.25 \times \lambda 0 \leq N4 \times d4 \leq 0.29 \times \lambda 0 \quad (4)$$

$$0.22 \times \lambda 0 \leq N5 \times d5 \leq 0.24 \times \lambda 0 \quad (5)$$

$$0.22 \times \lambda 0 \leq N6 \times d6 \leq 0.26 \times \lambda 0 \quad (6)$$

$$0.21 \times \lambda 0 \leq N7 \times d7 \leq 0.24 \times \lambda 0 \quad (7)$$

$$0.45 \times \lambda 0 \leq N8 \times d8 \leq 0.53 \times \lambda 0 \quad (8)$$

In the reflection reducing film of the invention, a buffer layer, which is provided between the substrate and the reflection reducing layer to reduce reflection light generated between the substrate and the reflection reducing layer, may be further included. The buffer layer preferably has a single-layer structure made of the intermediate-refractive index material or a multilayer structure in which a layer coming into contact with the reflection reducing layer is made of the intermediate-refractive index material. The buffer layer moderates a sudden change in refractive index between the substrate and the reflection reducing layer to reduce the reflection on the surface of the substrate. When the buffer layer has the multilayer structure, it preferably has, for example, 3 to 5 layers. Specifically, a refractive index of the substrate at the d-line is preferably equal to or higher than 1.66 and equal to or lower than 2.2, the buffer layer preferably includes ninth to thirteenth layers sequentially laminated from the side of the reflection reducing layer, the ninth, eleventh and thirteenth layers are preferably made of the intermediate-refractive index material, and the tenth and twelfth layers are preferably made of the high-refractive index material. Or, a refractive index of the substrate at the d-line is preferably equal to or higher than 1.51 and equal to or lower than 1.72, the buffer layer preferably includes ninth to eleventh layers sequentially laminated from the side of the reflection reducing layer, the ninth and eleventh layers are preferably made of the intermediate-refractive index material, and the tenth layer is preferably made of the high-refractive index material. Or, a refractive index of the substrate at the d-line is preferably equal to or higher than 1.40 and equal to or lower than 1.58, the buffer layer preferably includes ninth to twelfth layers sequentially laminated from the side of the reflection reducing layer, and the ninth and twelfth layers are preferably made of the intermediate-refractive index material, the tenth layer is preferably made of the high-refractive index material, and the eleventh layer is preferably made of the low-refractive index material, or the ninth layer is preferably made of the intermediate-refractive index material, the tenth and twelfth layers are preferably made of the high-refractive index material, and the eleventh layer is preferably made of the low-refractive index material.

Among the antireflection films proposed before, antireflection films exhibiting relatively excellent low reflectance characteristics for normal incident light have been known. However, the number of antireflection films also exhibiting sufficiently low reflectance characteristics for oblique incident light was small, and even when there were such antireflection films, there was no antireflection film exhibiting excellent low reflectance characteristics in an entire visible light region. When being incident on, for example, a lens system of a broadcasting camera, the oblique incident light is reflected by a lens face and thus becomes a cause of flare and ghost.

Accordingly, a reflection reducing film exhibiting excellent low reflectance characteristics for normal incident light and oblique incident light in a wide wavelength band is desired.

A reflection reducing film of the invention includes: a reflection reducing layer which is provided on a substrate and includes first to ninth layers sequentially laminated from the opposite side to the substrate. In the reflection reducing layer, the first and eighth layers are made of a low-refractive index material having a refractive index equal to or higher than 1.35 and equal to or lower than 1.50 at the d-line, the third, fifth, seventh and ninth layers are made of an intermediate-refractive index material having a refractive index equal to or higher than 1.55 and equal to or lower than 1.85 at the d-line, and the second, fourth and sixth layers are made of a high-refractive index material having a refractive index higher than that of the intermediate-refractive index material in the range of 1.70 to 2.50 at the d-line. An optical member of the invention has the reflection reducing film provided on a surface thereof, and an optical system of the invention is provided with the optical member.

In the reflection reducing film of the invention, the first to ninth layers of the reflection reducing layer provided on the substrate are made of materials having predetermined refractive indices and thus reflectance distribution for normal incident light and oblique incident light is sufficiently reduced in at least a visible region.

In the reflection reducing film of the invention, all the following conditional expressions (11) to (19) are preferably satisfied. $\lambda 0$ is a center wavelength, N1 to N9 are refractive indices of the first to ninth layers at the center wavelength $\lambda 0$, and d1 to d9 are physical film thicknesses of the first to ninth layers.

$$0.24 \times \lambda 0 \leq N1 \times d1 \leq 0.27 \times \lambda 0 \quad (11)$$

$$0.16 \times \lambda 0 \leq N2 \times d2 \leq 0.19 \times \lambda 0 \quad (12)$$

$$0.03 \times \lambda 0 \leq N3 \times d3 \leq 0.05 \times \lambda 0 \quad (13)$$

$$0.20 \times \lambda 0 \leq N4 \times d4 \leq 0.25 \times \lambda 0 \quad (14)$$

$$0.48 \times \lambda 0 \leq N5 \times d5 \leq 0.51 \times \lambda 0 \quad (15)$$

$$0.48 \times \lambda 0 \leq N6 \times d6 \leq 0.51 \times \lambda 0 \quad (16)$$

$$0.29 \times \lambda 0 \leq N7 \times d7 \leq 0.33 \times \lambda 0 \quad (17)$$

$$0.09 \times \lambda 0 \leq N8 \times d8 \leq 0.13 \times \lambda 0 \quad (18)$$

$$0.34 \times \lambda 0 \leq N9 \times d9 \leq 0.47 \times \lambda 0 \quad (19)$$

In the reflection reducing film of the invention, a buffer layer provided between the substrate and the reflection reducing layer and having a multilayer structure is preferably further included. In this case, a layer coming into contact with the reflection reducing layer in the buffer layer may have a refractive index higher than that of the layer coming into contact with the buffer layer in the reflection reducing layer. Such a buffer layer moderates a sudden change in refractive index between the substrate and the reflection reducing layer to reduce the reflection on the surface of the substrate.

In the reflection reducing film of the invention, when a refractive index of the substrate at the d-line is equal to or higher than 1.84 and equal to or lower than 2.2, the buffer layer preferably includes tenth to fifteenth layers sequentially laminated from the side of the reflection reducing layer, the eleventh, thirteenth and fifteenth layers are preferably made of the intermediate-refractive index material, and the tenth, twelfth and fourteenth layers are preferably made of the high-refractive index material. When a refractive index of the substrate at the d-line is equal to or higher than 1.71 and equal to or lower than 1.89, the buffer layer preferably includes tenth to thirteenth layers sequentially laminated from the side of the reflection reducing layer, the eleventh and thirteenth layers are preferably made of the intermediate-refractive index material, and the tenth and twelfth layers are preferably made of the high-refractive index material. When a refractive index of the substrate at the d-line is equal to or higher than 1.51 and equal to or lower than 1.72, the buffer layer preferably includes tenth to thirteenth layers sequentially laminated from the side of the reflection reducing layer, the eleventh layer is preferably made of the low-refractive index material, the thirteenth layer is preferably made of the intermediate-refractive index material, and the tenth and twelfth layers are preferably made of the high-refractive index material. When a refractive index of the substrate at the d-line is equal to or higher than 1.57 and equal to or lower than 1.62, the buffer layer preferably includes tenth to fourteenth layers sequentially laminated from the side of the reflection reducing layer, the tenth, twelfth and fourteenth layers are preferably made of the high-refractive index material, and the eleventh and thirteenth layers are preferably made of the low-refractive index material. When a refractive index of the substrate at the d-line is equal to or higher than 1.40 and equal to or lower than 1.58, the buffer layer preferably includes tenth to twelfth layers sequentially laminated from the side of the reflection reducing layer, and the tenth layer is preferably made of the high-refractive index material, the eleventh layer is preferably made of the low-refractive index material and the twelfth layer is preferably made of the intermediate-refractive index material, or the tenth and twelfth layers are preferably made of the high-refractive index material and the eleventh layer is preferably made of the low-refractive index material.

According to a reflection reducing film and an optical member of the invention, first to eighth layers of the reflection reducing layer on a substrate are made of materials having predetermined refractive indices and thus a reflectance for normal incident light and oblique incident light can be sufficiently reduced in a wide wavelength band from a visible region to a near-infrared region. Accordingly, when the reflection reducing film and the optical member of the invention are applied to an optical system of an image pickup apparatus such as a broadcasting camera, the occurrence of flare and ghost can be suppressed and a more excellent chromaticity balance can be obtained. Moreover, as being able to cope with both of the visible region and the near-infrared region, it is preferably used for an optical system of a day and night vision camera.

According to a reflection reducing film and an optical member of the invention, first to ninth layers of the reflection reducing layer on a substrate are made of materials having predetermined refractive indices and thus reflectance distribution for normal incident light and oblique incident light can be sufficiently reduced in at least a visible region. Accordingly, when the reflection reducing film and the optical member of the invention are applied to an optical system of an image pickup apparatus such as a broadcasting camera, the occurrence of flare and ghost can be suppressed and a more excellent chromaticity balance can be obtained.

BRIEF DESCRIPTION OF THE DRAWINGS

FIGS. 19A and 19B are reflectance distribution graphs of Example 1-6 corresponding to the reflection reducing film shown in FIG. 1.

FIGS. 43A and 43B are reflectance distribution graphs of Example 9-4 corresponding to the reflection reducing film shown in FIG. 9.

DETAILED DESCRIPTION

Hereinafter, exemplary embodiments of the invention will be described in detail with reference to the drawings.

First Embodiment

Figure 1:
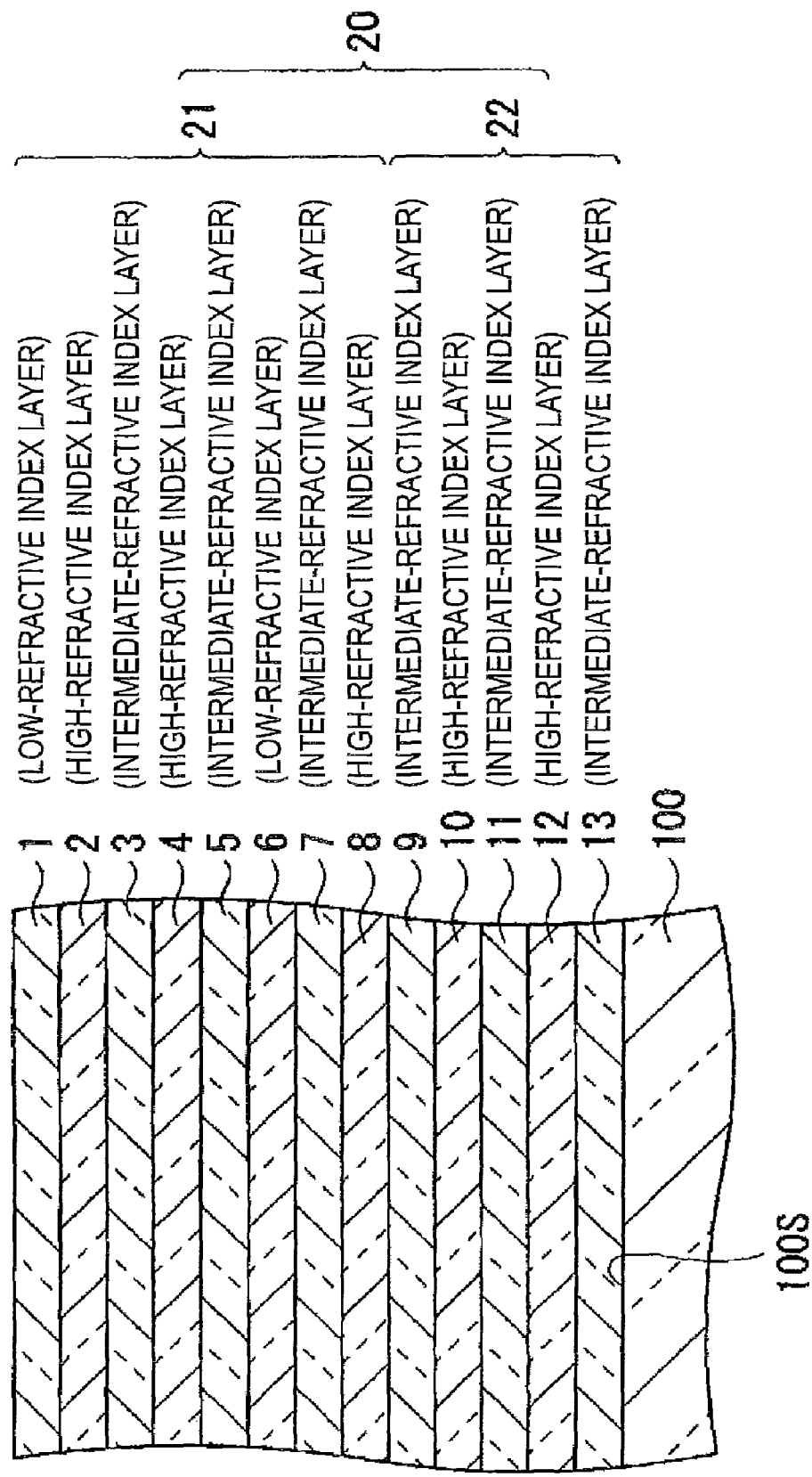
FIG. 1 is a cross-sectional view of a reflection reducing film according to a first embodiment of the invention.

FIG. 1 is a schematic cross-sectional view showing the configuration of a reflection reducing film 20 according to a first embodiment of the invention. The reflection reducing film 20 of FIG. 1 corresponds to first numerical examples (Tables 3 to 9 and FIGS. 14A to 20B) to be described later.

The reflection reducing film 20 is a multilayer film composed of total 13 layers provided on a surface 100S of an optical substrate 100 and first to thirteenth layers 1 to 13 are sequentially laminated from the opposite side to the optical substrate 100. The first to eighth layers 1 to 8 serve as a reflection reducing layer 21 and the ninth to thirteenth layers 9 to 13 serve as a buffer layer 22. The buffer layer 22 is provided to come into close contact with both of the surface 100S of the optical substrate 100 and the eights layer 8 of the reflection reducing layer 21, and has a multilayer structure. The buffer layer 22 functions to moderate a sudden change in refractive index between the optical substrate 100 and the reflection reducing layer 21 so as to reduce the reflection on the surface 100S. Herein, the surface 100S is a flat surface, but is not limited to this and may be a curved surface. That is, using a lens having a spherical surface or an aspherical surface as the optical substrate 100, the reflection reducing film 20 may be provided on the spherical surface or the aspherical surface.

The optical substrate 100 is made of a transparent material such as glass or a crystalline material. Specifically, a material having a refractive index equal to or higher than 1.66 and equal to or lower than 2.20 at the d-line (wavelength $\lambda=587.56$ nm) is preferably used. Examples of the transparent material include S-LAH79 (OHARA INC.), S-NPH2 (OHARA INC.), LASF-N17 (SUMITA Optical glass, Inc.), S-TIH53 (OHARA INC.), SFL6 (SHOTT), SF14 (SUMITA Optical glass, Inc.), S-TIH1 (OHARA INC.), BASF-2 (SUMITA Optical glass, Inc.) and the like.

The first layer 1 and the sixth layer 6 of the reflection reducing layer 21 are low-refractive index layers made of a low-refractive index material having a refractive index equal to or higher than 1.35 and equal to or lower than 1.50 at the d-line (wavelength $\lambda=587.56$ nm). Herein, as the low-refractive index material, for example, magnesium fluoride ($MgF_2$), $SiO_2$, aluminum fluoride ($AlF_3$) and mixtures and compounds thereof can be used. Particularly, the first layer 1 and the sixth layer 6 are preferably made of a low-refractive index material (for example, $MgF_2$) having a refractive index equal to or higher than 1.37 and equal to or lower than 1.40 at the d-line. In addition, in order to obtain a higher mechanical strength, a substance L5 (Merck & Co., Inc.) including $SiO_2$ as a main component is preferably employed. The substance L5 (Merck & Co., Inc.) includes a minute amount of aluminum oxide ($Al_2O_3$) in addition to $SiO_2$ and has a refractive index equal to or higher than 1.46 and equal to or lower than 1.48 at the d-line.

The third layer 3, the fifth layer 5 and the seventh layer 7 of the reflection reducing layer 21 are intermediate-refractive index layers made of an intermediate-refractive index material having a refractive index equal to or higher than 1.55 and equal to or lower than 1.85 at the d-line. Herein, as the intermediate-refractive index material, for example, aluminum oxide ($Al_2O_3$), praseodymium aluminate ($PrAlO_3$), lanthanum aluminate ($La_{2x}Al_{2y}O_{3(X+Y)}$), germanium oxide ($GeO_2$), yttrium oxide ($Y_2O_3$) and mixtures and compounds thereof can be used. Particularly, the third layer 3, the fifth layer 5 and the seventh layer 7 are preferably made of an intermediate-refractive index material (for example, $Al_2O_3$) having a refractive index equal to or higher than 1.62 and equal to or lower than 1.65 at the d-line.

Moreover, the second layer 2, the fourth layer 4 and the eighth layer 8 of the reflection reducing layer 21 are high-refractive index layers made of a high-refractive index material having a refractive index higher than that of an intermediate-refractive index material in the range of 1.70 to 2.50 at the d-line. Herein, as the high-refractive index material, for example, lanthanum titanate ($LaTiO_3$), zirconium oxide ($ZrO_2$), titanium oxide ($TiO_2$), tantalum oxide ($Ta_2O_5$), niobium oxide ($Nb_2O_5$), hafnium oxide ($HfO_2$), cerium oxide ($CeO_2$) and mixtures and compounds thereof can be used. Particularly, the second layer 2, the fourth layer 4 and the eighth layer 8 may be made of a high-refractive index material (for example, the substance H4 (Merck & Co., Inc.) including $LaTiO_3$ as a main component) having a refractive index equal to or higher than 2.08 and equal to or lower than 2.11 at the d-line.

The first to eighth layers 1 to 8 are preferably configured to satisfy the following conditional expressions (1) to (8). $\lambda 0$ is a center wavelength (unit: nm), N1 to N8 are refractive indices of the first to eighth layers 1 to 8 at the center wavelength $\lambda 0$ and d1 to d8 are physical thicknesses (unit: nm) of the first to eighth layers 1 to 8.

$$0.23 \times \lambda 0 \leq N1 \times d1 \leq 0.25 \times \lambda 0 \quad (1)$$

$$0.11 \times \lambda 0 \leq N2 \times d2 \leq 0.13 \times \lambda 0 \quad (2)$$

$$0.03 \times \lambda 0 \leq N3 \times d3 \leq 0.05 \times \lambda 0 \quad (3)$$

$$0.25 \times \lambda 0 \leq N4 \times d4 \leq 0.29 \times \lambda 0 \quad (4)$$

$$0.22 \times \lambda 0 \leq N5 \times d5 \leq 0.24 \times \lambda 0 \quad (5)$$

$$0.22 \times \lambda 0 \leq N6 \times d6 \leq 0.26 \times \lambda 0 \quad (6)$$

$$0.21 \times \lambda 0 \leq N7 \times d7 \leq 0.24 \times \lambda 0 \quad (7)$$

$$0.45 \times \lambda 0 \leq N8 \times d8 \leq 0.53 \times \lambda 0 \quad (8)$$

In the buffer layer 22, the ninth layer 9 coming into contact with the eighth layer 8 of the reflection reducing layer 21 is made of the above-described intermediate-refractive index material. As well as the ninth layer 9, the eleventh layer 11 and the thirteenth layer 13 are also preferably made of the above-described intermediate-refractive index material. In addition, the tenth layer 10 and the twelfth layer 12 are preferably made of the above-described high-refractive index material. As the intermediate-refractive index material for the buffer layer 22, $Al_2O_3$ or the like having a refractive index equal to or higher than 1.62 and equal to or lower than 1.65 at the d-line is particularly preferably used. In addition, as the high-refractive index material for the buffer layer 22, the substance H4 (Merck & Co., Inc.) or the like having a refractive index equal to or higher than 2.08 and equal to or lower than 2.11 at the d-line is particularly preferably used.

According to the reflection reducing film 20 of this embodiment, the first to thirteenth layers 1 to 13 each having a refractive index in a predetermined range are sequentially laminated from the air-side on the optical substrate 100 having a refractive index equal to or higher than 1.66 and equal to or lower than 2.20 at the d-line and thus a reflectance for normal incident light and oblique incident light can be sufficiently reduced in a wide wavelength band from a visible region to a near-infrared region. Particularly, the optical film thicknesses N×d can be optimized by satisfying the conditional expressions (1) to (8) and thus the above advantages can be enhanced. Accordingly, when the reflection reducing film and the optical member of the invention are applied to an optical system of an image pickup apparatus such as a broadcasting camera, the occurrence of flare and ghost can be suppressed and a more excellent chromaticity balance can be obtained. Moreover, as being able to cope with both of the visible region and the near-infrared region, it is preferably used for an optical system of a day and night vision camera.

Second Embodiment

Figure 2:
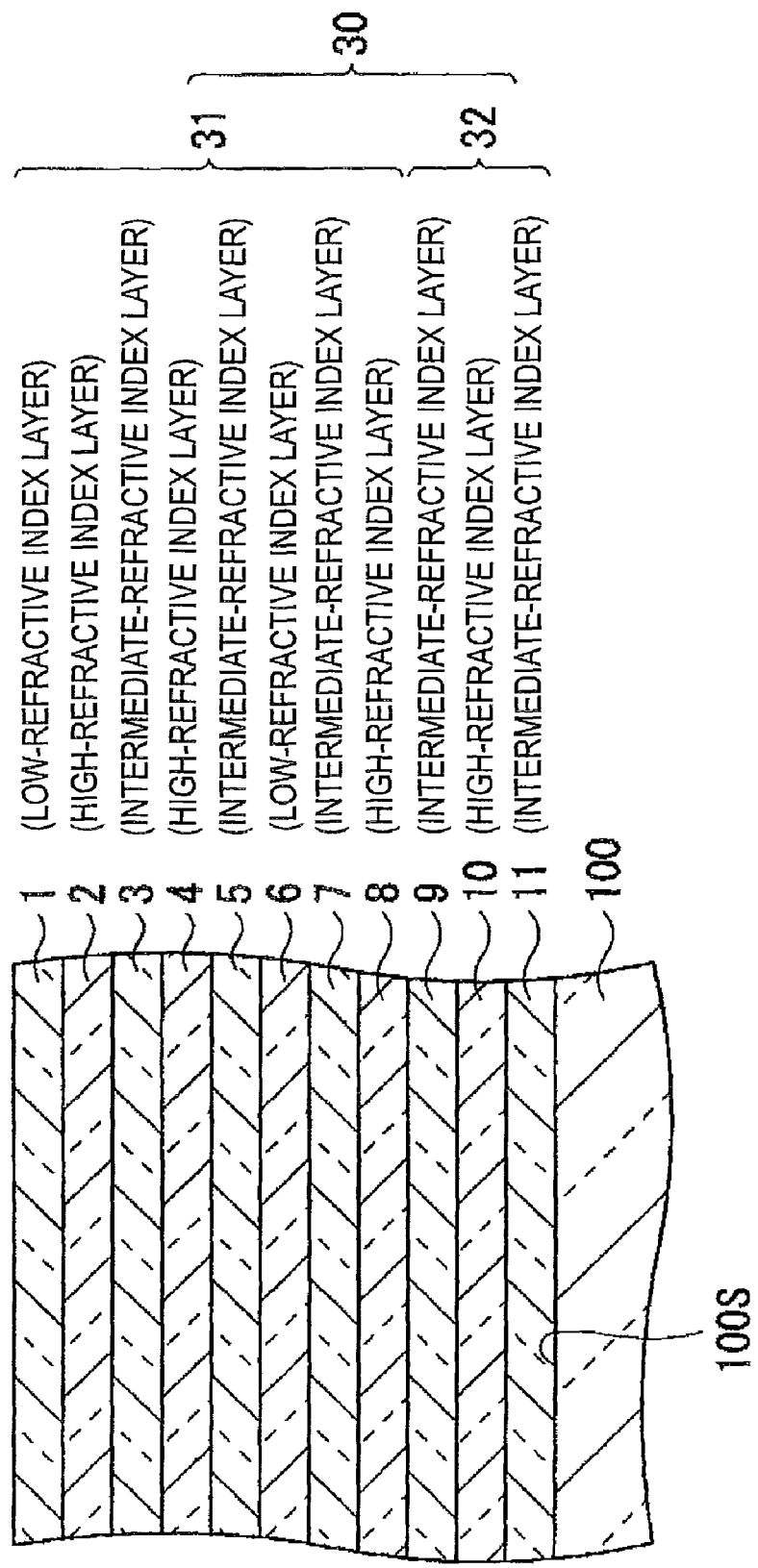
FIG. 2 is a cross-sectional view of a reflection reducing film according to a second embodiment of the invention.

FIG. 2 is a schematic cross-sectional view showing the configuration of a reflection reducing film 30 according to a second embodiment of the invention. The reflection reducing film 30 of FIG. 2 corresponds to second numerical examples (Tables 10 to 12 and FIGS. 21A to 23B) to be described later.

The reflection reducing film 30 is a multilayer film composed of total 11 layers provided on a surface 100S of an optical substrate 100 and first to eleventh layers 1 to 11 are sequentially laminated from the opposite side to the optical substrate 100. Among them, the first to eighth layers 1 to 8 serve as a reflection reducing layer 31 and the ninth to eleventh layers 9 to 11 serve as a buffer layer 32. The reflection reducing layer 31 has the same configuration as the reflection reducing layer 21. In the following explanation for the reflection reducing film 30, constituent elements which are substantially different from in the reflection reducing film 20 according to the first embodiment will be described and a description for the same constituent elements will be arbitrarily omitted.

For the optical substrate 100, a transparent material having a refractive index equal to or higher than 1.51 and equal to or lower than 1.72 at the d-line can be preferably used. Examples of the transparent material are S-TIH1 (OHARA INC.), BASF-2 (SUMITA Optical glass, Inc.), F-3 (SUMITA Optical glass, Inc.), LF1 (SUMITA Optical glass, Inc.), BK7 (SUMITA Optical glass, Inc.) and the like.

The buffer layer 32 has a 3-layer structure and the ninth layer 9 coming into contact with the eighth layer 8 of the reflection reducing layer 31 is made of the above-described intermediate-refractive index material. As well as the ninth layer 9, the eleventh layer 11 is also preferably made of the above-described intermediate-refractive index material. In addition, the tenth layer 10 is preferably made of the above-described high-refractive index material. As the intermediate-refractive index material for the buffer layer 32, $Al_2O_3$ or the like having a refractive index equal to or higher than 1.62 and equal to or lower than 1.65 at the d-line is particularly preferably used. In addition, as the high-refractive index material for the buffer layer 32, the substance H4 (Merck & Co., Inc.) or the like having a refractive index equal to or higher than 2.08 and equal to or lower than 2.11 at the d-line is particularly preferably used.

According to the reflection reducing film 30 of this embodiment, the first to eleventh layers 1 to 11 each having a refractive index in a predetermined range are sequentially laminated from the air-side on the optical substrate 100 having a refractive index equal to or higher than 1.51 and equal to or lower than 1.72 at the d-line and thus the same advantages as in the reflection reducing film 20 of the first embodiment are obtained.

Third Embodiment

Figure 3:
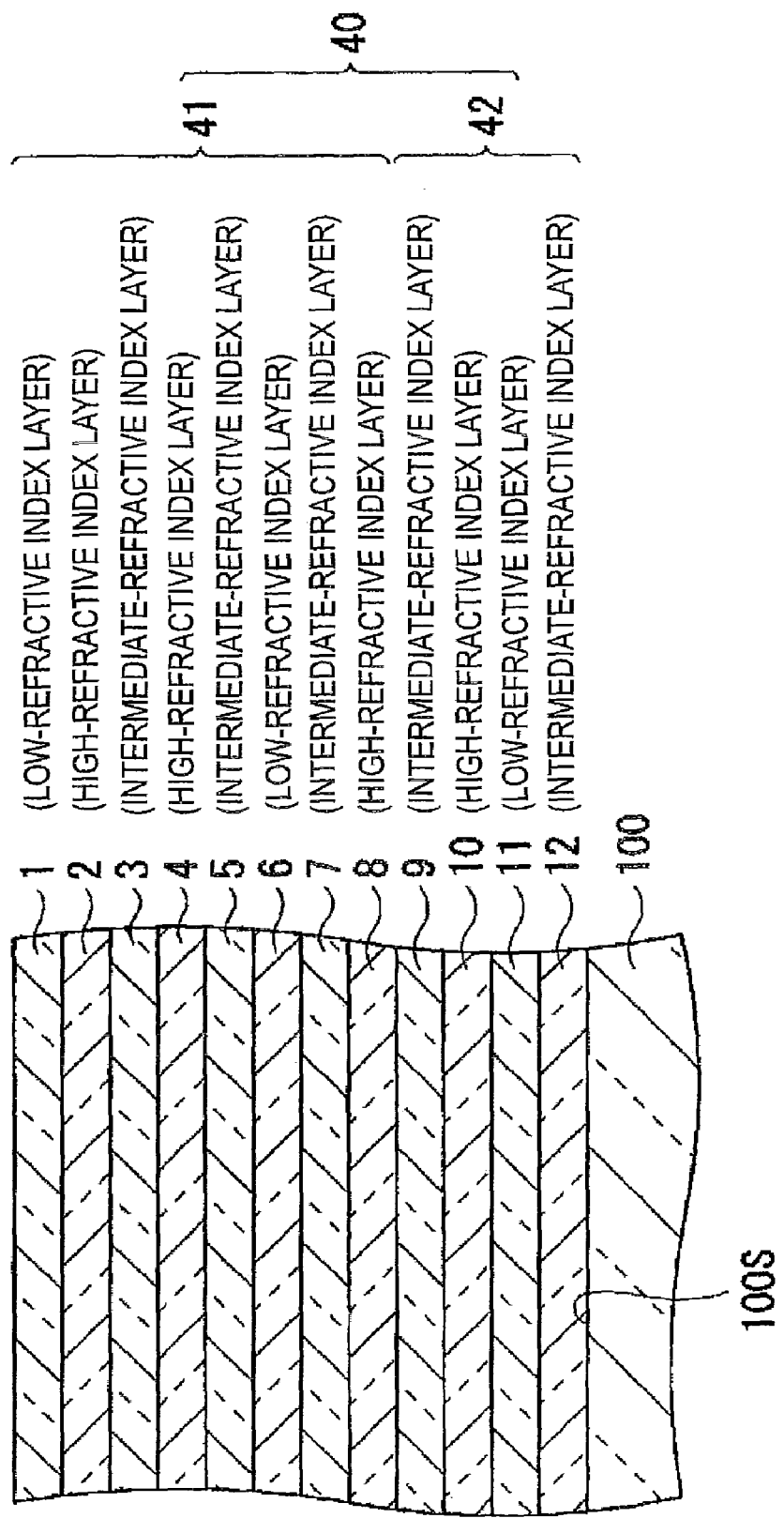
FIG. 3 is a cross-sectional view of a reflection reducing film according to a third embodiment of the invention.

FIG. 3 is a schematic cross-sectional view showing the configuration of a reflection reducing film 40 according to a third embodiment of the invention. The reflection reducing film 40 of FIG. 3 corresponds to third numerical examples (Tables 13 to 16 and FIGS. 24A to 27B) to be described later.

The reflection reducing film 40 is a multilayer film composed of total 12 layers provided on a surface 100S of an optical substrate 100 and first to twelfth layers 1 to 12 are sequentially laminated from the opposite side to the optical substrate 100. Among them, the first to eighth layers 1 to 8 serve as a reflection reducing layer 41 and the ninth to twelfth layers 9 to 12 serve as a buffer layer 42. The reflection reducing layer 41 has the same configuration as the reflection reducing layer 21. In the following explanation for the reflection reducing film 40, constituent elements which are substantially different from in the reflection reducing film 40 according to the first embodiment will be described and a description for the same constituent elements will be arbitrarily omitted.

For an optical substrate 100, a transparent material having a refractive index equal to or higher than 1.40 and equal to or lower than 1.58 at the d-line can be preferably used. Examples of the transparent material include LF1 (SUMITA Optical glass, Inc.), BK7 (SUMITA Optical glass, Inc.), FK-5 (SUMITA Optical glass, Inc.), quartz (silica) glass ($SiO_2$), fluorite ($CaF_2$) and the like. Particularly, the fluorite is known as an optical material with small color distribution, and when the optical substrate 100 is a lens, small chromatic aberration is caused.

A buffer layer 42 has a 4-layer structure and a ninth layer 9 coming into contact with an eighth layer 8 of a reflection reducing layer 41 is made of the above-described intermediate-refractive index material. As well as the ninth layer 9, a twelfth layer 12 is also preferably made of the above-described intermediate-refractive index material. In addition, a tenth layer 10 is preferably made of the above-described high-refractive index material and an eleventh layer 11 is preferably made of the above-described low-refractive index material. As the intermediate-refractive index material for the buffer layer 42, $Al_2O_3$ or the like having a refractive index equal to or higher than 1.62 and equal to or lower than 1.65 at the d-line is particularly preferably used. In addition, as the high-refractive index material for the buffer layer 42, the substance H4 (Merck & Co., Inc.) or the like having a refractive index equal to or higher than 2.08 and equal to or lower than 2.11 at the d-line is particularly preferably used. Moreover, as the low-refractive index material for the buffer layer 42, $MgF_2$ or the like having a refractive index equal to or higher than 1.37 and equal to or lower than 1.40 at the d-line is particularly preferably used. In order to obtain a higher mechanical strength, the substance L5 (Merck & Co., Inc.) is preferably employed as the low-refractive index material.

According to the reflection reducing film 40 of this embodiment, the first to twelfth layers 1 to 12 each having a refractive index in a predetermined range are sequentially laminated from the air-side on the optical substrate 100 having a refractive index equal to or higher than 1.40 and equal to or lower than 1.58 at the d-line and thus the same advantages as in the reflection reducing film 20 of the first embodiment are obtained.

Modified Example of Third Embodiment

Figure 4:
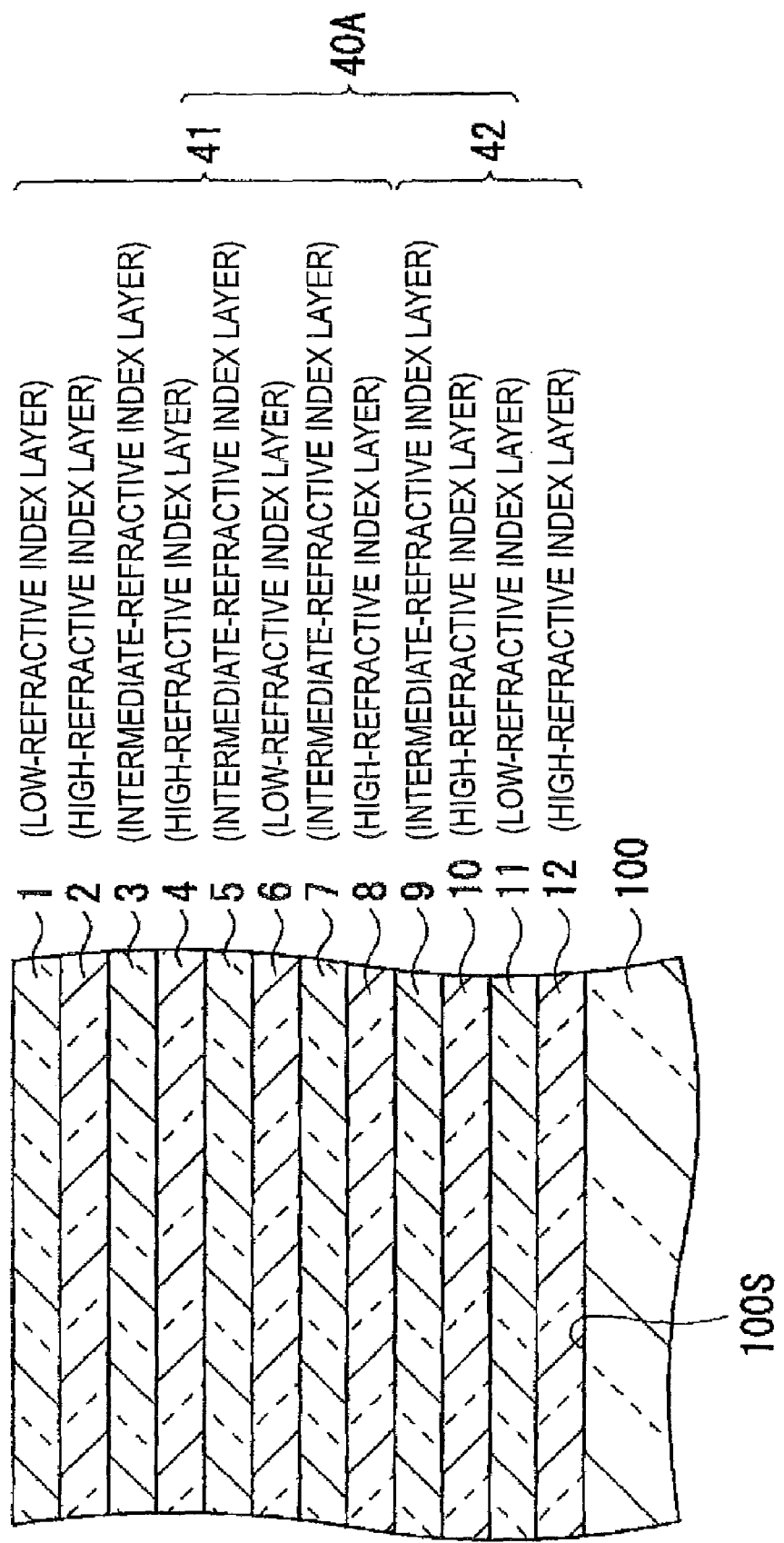
FIG. 4 is a cross-sectional view of a reflection reducing film according to a modified example of FIG. 3.

FIG. 4 is a schematic cross-sectional view showing the configuration of a reflection reducing film 40A according to a modified example of this embodiment. The reflection reducing film 40A of FIG. 4 corresponds to a fourth numerical example (Table 17 and FIGS. 28A and 28B) to be described later.

In the above embodiment, the twelfth layer 12 of the buffer layer 42 having the 4-layer structure, which is positioned closest to the optical substrate 100, is made of the intermediate-refractive index material, but may be made of the high-refractive index material. In this case, the twelfth layer 12 may be made of a material having a refractive index lower than that of the material for the tenth layer 10, particularly, $Y_2O_3$ having a refractive index equal to or higher than 1.80 and equal to or lower than 1.82 at the d-line. In this case, the same advantages as in the reflection reducing film 20 of the first embodiment are obtained.

Fourth Embodiment

Figure 5:
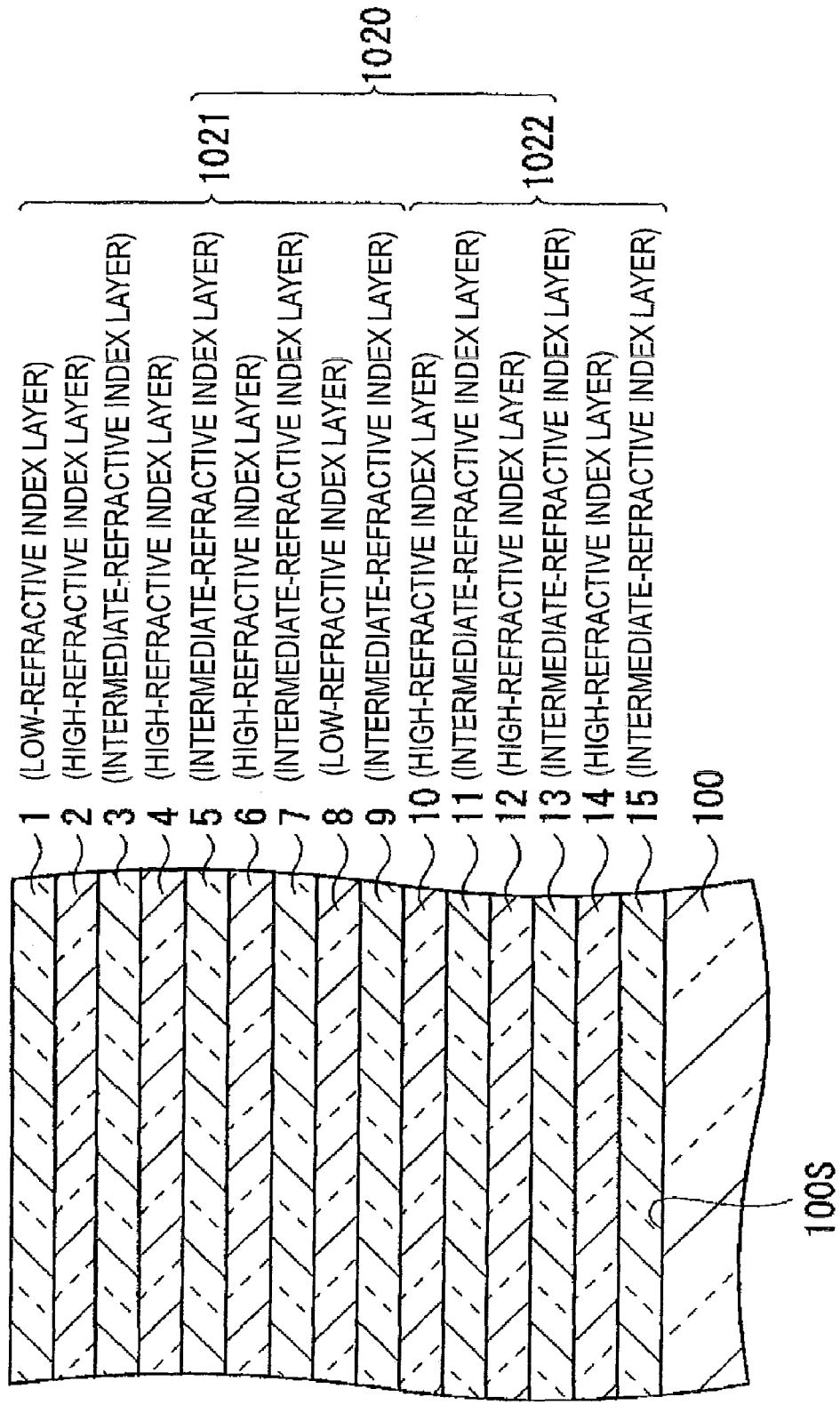
FIG. 5 is a cross-sectional view of a reflection reducing film according to a fourth embodiment of the invention.

FIG. 5 is a schematic cross-sectional view showing the configuration of a reflection reducing film 1020 according to a fourth embodiment of the invention. The reflection reducing film 1020 of FIG. 5 corresponds to fifth numerical examples (Tables 18 to 20 and FIGS. 29A to 31B) to be described later.

The reflection reducing film 1020 is a multilayer film composed of total 15 layers provided on a surface 100S of an optical substrate 100 and first to fifteenth layers 1 to 15 are sequentially laminated from the opposite side to the optical substrate 100. Among them, the first to ninth layers 1 to 9 serve as a reflection reducing layer 1021 and the tenth to fifteenth layers 10 to 15 serve as a buffer layer 1022. The buffer layer 1022 is provided to come into close contact with both of the optical substrate 100 and the reflection reducing layer 1021. Accordingly, a sufficient peeling strength is maintained between the reflection reducing film 1020 and the optical substrate 100. The buffer layer 1022 functions to moderate a sudden change in refractive index between the optical substrate 100 and the reflection reducing layer 1021 so as to reduce the reflection on the surface 100S. Herein, the surface 100S is a flat surface, but is not limited to this and may be a curved surface. That is, using a lens having a spherical surface or an aspherical surface as the optical substrate 100, the reflection reducing film 1020 may be provided on the spherical surface or the aspherical surface.

The optical substrate 100 is made of a transparent material such as glass or a crystalline material. Specifically, a material having a refractive index equal to or higher than 1.84 and equal to or lower than 2.20 at the d-line (wavelength $\lambda=587.56$ nm) is preferably used. Examples of the transparent material include S-LAH79 (OHARA INC.), S-NPH2 (OHARA INC.), LASF-N17 (SUMITA Optical glass, Inc.) and the like.

The first layer 1 and the eighth layer 8 of the reflection reducing layer 1021 are low-refractive index layers made of a low-refractive index material having a refractive index equal to or higher than 1.35 and equal to or lower than 1.50 at the d-line (wavelength λ=587.56 nm). Herein, as the low-refractive index material, for example, magnesium fluoride ($MgF_2$), $SiO_2$, aluminum fluoride ($AlF_3$) and mixtures and compounds thereof can be used. Particularly, the first layer 1 and the eighth layer 8 are preferably made of a low-refractive index material (for example, $MgF_2$) having a refractive index equal to or higher than 1.37 and equal to or lower than 1.40 at the d-line. In addition, in order to obtain a higher mechanical strength, a substance L5 (Merck & Co., Inc.) including $SiO_2$ as a main component is preferably employed. The substance L5 (Merck & Co., Inc.) includes a minute amount of aluminum oxide ($Al_2O_3$) in addition to $SiO_2$ and has a refractive index equal to or higher than 1.46 and equal to or lower than 1.48 at the d-line.

The third layer 3, the fifth layer 5, the seventh layer 7 and the ninth layer 9 of the reflection reducing layer 1021 are intermediate-refractive index layers made of an intermediate-refractive index material having a refractive index equal to or higher than 1.55 and equal to or lower than 1.85 at the d-line. Herein, as the intermediate-refractive index material, for example, aluminum oxide ($Al_2O_3$), praseodymium aluminate ($PrAlO_3$), lanthanum aluminate ($La_{2X}Al_{2Y}O_{3(X+Y)}$), germanium oxide ($GeO_2$), yttrium oxide ($Y_2O_3$) and mixtures and compounds thereof can be used. Particularly, the third layer 3, the fifth layer 5, the seventh layer 7 and the ninth layer 9 are preferably made of an intermediate-refractive index material (for example, $Al_2O_3$) having a refractive index equal to or higher than 1.62 and equal to or lower than 1.65 at the d-line.

Moreover, the second layer 2, the fourth layer 4 and the sixth layer 6 of the reflection reducing layer 1021 are high-refractive index layers made of a high-refractive index material having a refractive index higher than that of an intermediate-refractive index material in the range of 1.70 to 2.50 at the d-line. Herein, as the high-refractive index material, for example, lanthanum titanate ($LaTiO_3$), zirconium oxide ($ZrO_2$), titanium oxide ($TiO_2$), tantalum oxide ($Ta_2O_5$), niobium oxide ($Nb_2O_5$), hafnium oxide ($HfO_2$), cerium oxide ($CeO_2$) and mixtures and compounds thereof can be used. Particularly, the second layer 2, the fourth layer 4 and the sixth layer 6 may be made of a high-refractive index material (for example, the substance H4 (Merck & Co., Inc.) including $LaTiO_3$ as a main component) having a refractive index equal to or higher than 2.08 and equal to or lower than 2.11 at the d-line.

The first to ninth layers 1 to 9 are preferably configured to satisfy the following conditional expressions (11) to (19). λ0 is a center wavelength (unit: nm), N1 to N9 are refractive indices of the first to ninth layers 1 to 9 at the center wavelength λ0 and d1 to d9 are physical thicknesses (unit: nm) of the first to ninth layers 1 to 9.

$$0.24\times\lambda 0 \leq N1\times d1 \leq 0.27\times\lambda 0 \tag{11}$$

$$0.16\times\lambda 0 \leq N2\times d2 \leq 0.19\times\lambda 0 \tag{12}$$

$$0.03\times\lambda 0 \leq N3\times d3 \leq 0.05\times\lambda 0 \tag{13}$$

$$0.20\times\lambda 0 \leq N4\times d4 \leq 0.25\times\lambda 0 \tag{14}$$

$$0.48\times\lambda 0 \leq N5\times d5 \leq 0.51\times\lambda 0 \tag{15}$$

$$0.48\times\lambda 0 \leq N6\times d6 \leq 0.51\times\lambda 0 \tag{16}$$

$$0.29\times\lambda 0 \leq N7\times d7 \leq 0.33\times\lambda 0 \tag{17}$$

$$0.09\times\lambda 0 \leq N8\times d8 \leq 0.13\times\lambda 0 \tag{18}$$

$$0.34\times\lambda 0 \leq N9\times d9 \leq 0.47\times\lambda 0 \tag{19}$$

The buffer layer 1022 has a 6-layer structure depending on the refractive index of the optical substrate 100 to reduce reflection light generated between the optical substrate 100 and the reflection reducing layer 1021. Herein, the eleventh layer 11, the thirteenth layer 13 and the fifteenth layer 15 are preferably made of the above-described intermediate-refractive index material, and the tenth layer 10, the twelfth layer 12 and the fourteenth layer 14 are preferably made of the above-described high-refractive index material. As the intermediate-refractive index material for the buffer layer 1022, $Al_2O_3$ or the like having a refractive index equal to or higher than 1.62 and equal to or lower than 1.65 at the d-line is particularly preferably used. In addition, as the high-refractive index material for the buffer layer 1022, the substance H4 (Merck & Co., Inc.) or the like having a refractive index equal to or higher than 2.08 and equal to or lower than 2.11 at the d-line is particularly preferably used.

According to the reflection reducing film 1020 of this embodiment, the first to fifteenth layers 1 to 15 each having a refractive index in a predetermined range are sequentially laminated from the air-side on the optical substrate 100 having a refractive index equal to or higher than 1.84 and equal to or lower than 2.20 at the d-line and thus a reflectance for normal incident light and oblique incident light can be sufficiently reduced in a wide wavelength band from a visible region to a near-infrared region. Particularly, the optical film thicknesses N×d can be optimized by satisfying the conditional expressions (11) to (19) and thus the above advantages can be enhanced. Accordingly, when the reflection reducing film and the optical member of the invention are applied to an optical system of an image pickup apparatus such as a broadcasting camera, the occurrence of flare and ghost can be suppressed and a more excellent chromaticity balance can be obtained. Moreover, as being able to cope with both of the visible region and the near-infrared region, it is preferably used for an optical system of a day and night vision camera.

Fifth Embodiment

Figure 6:
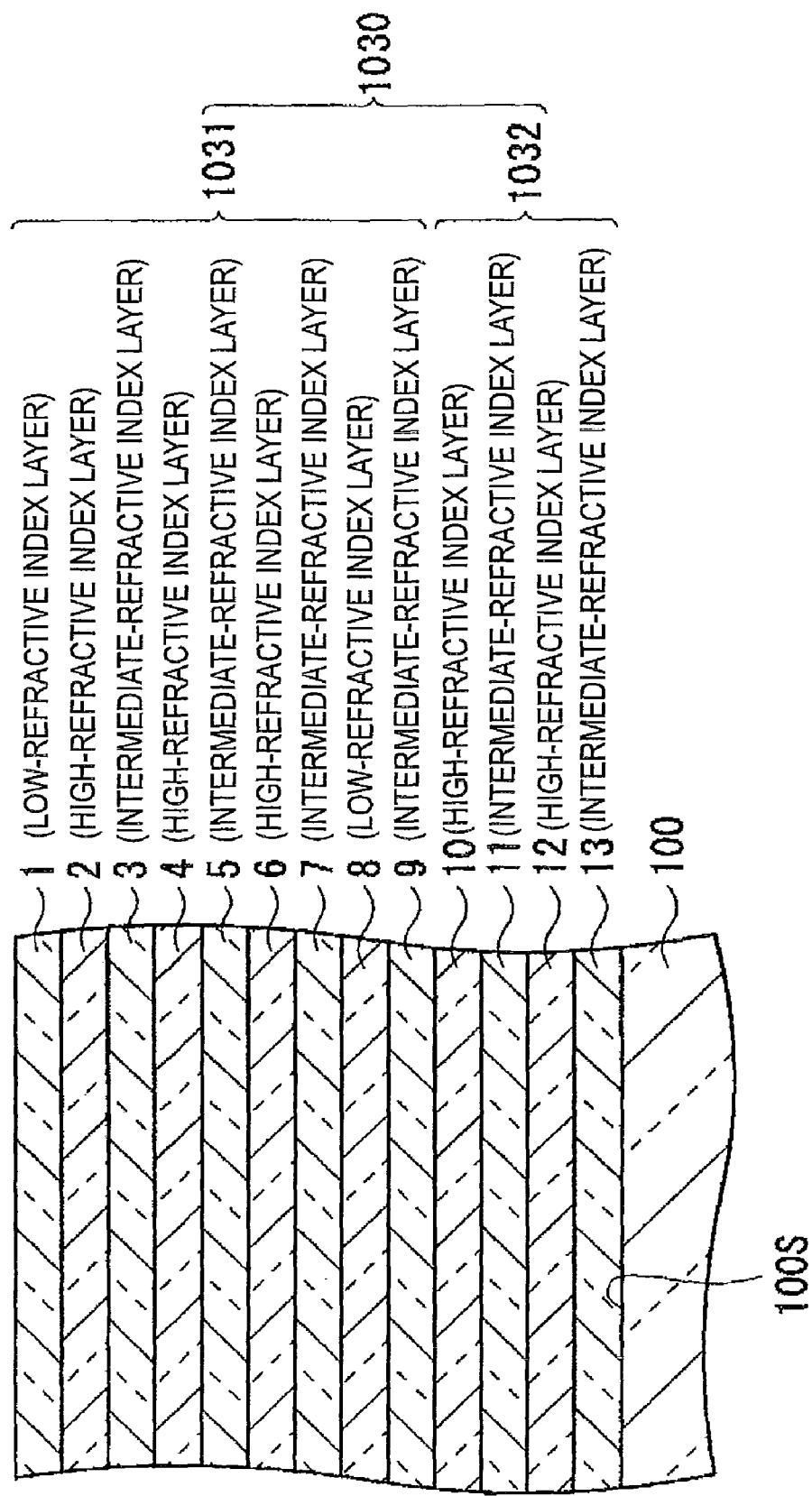
FIG. 6 is a cross-sectional view of a reflection reducing film according to a fifth embodiment of the invention.

FIG. 6 is a schematic cross-sectional view showing the configuration of a reflection reducing film 1030 according to a fifth embodiment of the invention. The reflection reducing film 1030 of FIG. 6 corresponds to sixth numerical examples (Tables 21 to 24 and FIGS. 32A to 35B) to be described later.

The reflection reducing film 1030 is a multilayer film composed of total 13 layers provided on a surface 100S of an optical substrate 100 and first to thirteenth layers 1 to 13 are sequentially laminated from the opposite side to the optical substrate 100. Among them, the first to ninth layers 1 to 9 serve as a reflection reducing layer 1031 and the tenth to thirteenth layers 10 to 13 serve as a buffer layer 1032. The reflection reducing layer 1031 has the same configuration as the reflection reducing layer 1021. Like in the case of the reflection reducing film 1020 according to the fourth embodiment, the buffer layer 1032 is provided to come into contact with the optical substrate 100 and the reflection reducing layer 1031 and maintains a sufficient peeling strength. In the following explanation for the reflection reducing film 1030, constituent elements which are substantially different from in the reflection reducing film 1020 according to the fourth embodiment will be described and a description for the same constituent elements will be arbitrarily omitted.

For the optical substrate 100, a transparent material having a refractive index equal to or higher than 1.71 and equal to or lower than 1.89 at the d-line can be preferably used. Examples of the transparent material include S-TIH53 (OHARA INC.), SFL6 (SHOTT), SF14 (SUMITA Optical glass, Inc.), S-TIH1 (OHARA INC.) and the like.

The buffer layer 1032 has a 4-layer structure depending on the refractive index of the optical substrate 100 to reduce reflection light generated between the optical substrate 100 and the reflection reducing layer 1031. Herein, the eleventh layer 11 and the thirteenth layer 13 are preferably made of the above-described intermediate-refractive index material, and the tenth layer 10 and the twelfth layer 12 are preferably made of the above-described high-refractive index material. As the intermediate-refractive index material for the buffer layer 1032, $Al_2O_3$ or the like having a refractive index equal to or higher than 1.62 and equal to or lower than 1.65 at the d-line is particularly preferably used. In addition, as the high-refractive index material for the buffer layer 1032, the substance H4 (Merck & Co., Inc.) or the like having a refractive index equal to or higher than 2.08 and equal to or lower than 2.11 at the d-line is particularly preferably used.

According to the reflection reducing film 1030 of this embodiment, the first to thirteenth layers 1 to 13 each having a refractive index in a predetermined range are sequentially laminated from the air-side on the optical substrate 100 having a refractive index equal to or higher than 1.71 and equal to or lower than 1.89 at the d-line and thus the same advantages as in the reflection reducing film 1020 of the fourth embodiment are obtained.

Sixth Embodiment

Figure 7:
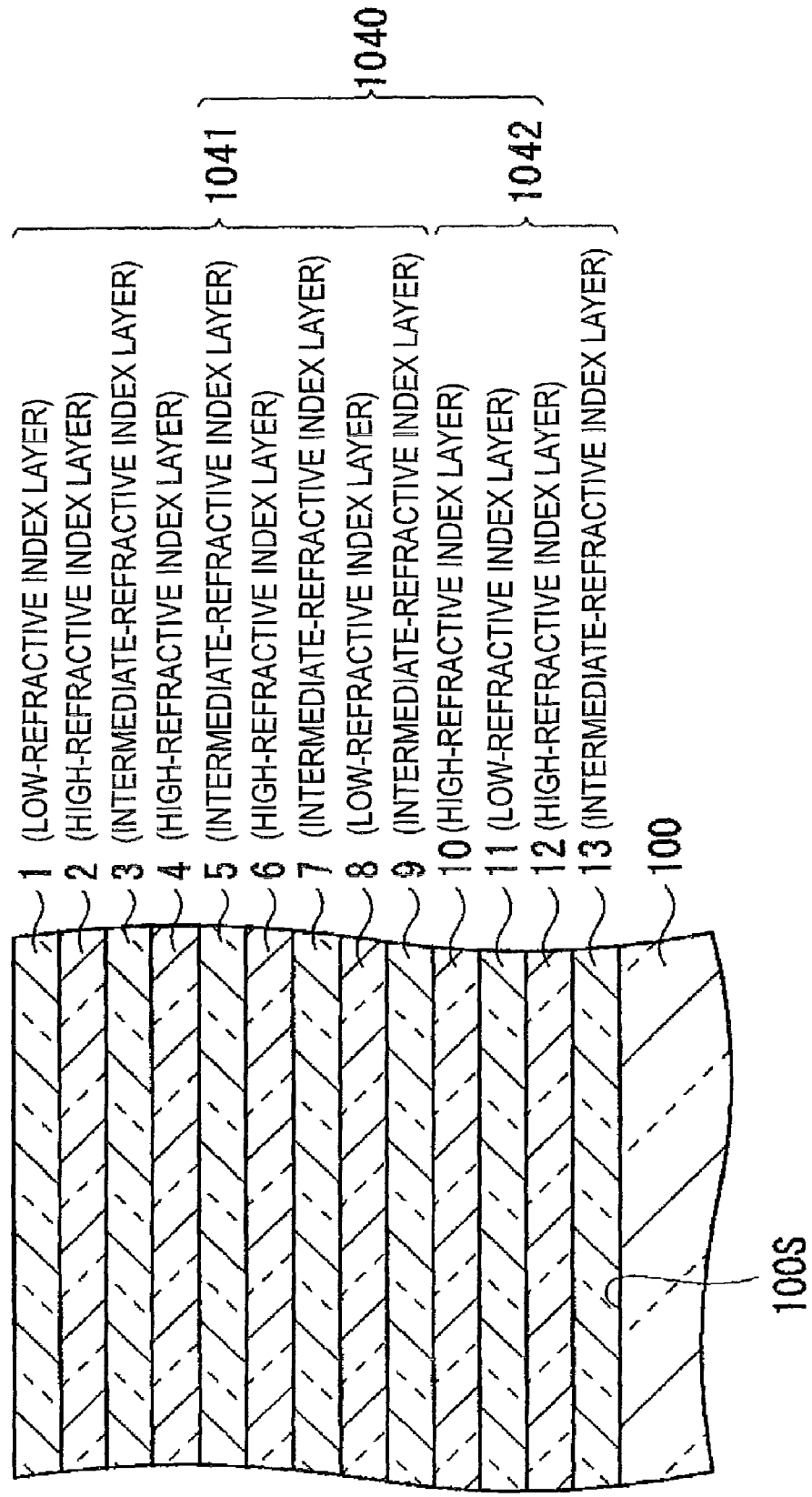
FIG. 7 is a cross-sectional view of a reflection reducing film according to a sixth embodiment of the invention.

FIG. 7 is a schematic cross-sectional view showing the configuration of a reflection reducing film 1040 according to a sixth embodiment of the invention. The reflection reducing film 1040 of FIG. 7 corresponds to seventh numerical examples (Tables 25 to 27 and FIGS. 36A to 38B) to be described later.

The reflection reducing film 1040 is a multilayer film composed of total 13 layers provided on a surface 100S of an optical substrate 100 and first to thirteenth layers 1 to 13 are sequentially laminated from the opposite side to the optical substrate 100. Among them, the first to ninth layers 1 to 9 serve as a reflection reducing layer 1041 and the tenth to thirteenth layers 10 to 13 serve as a buffer layer 1042. The reflection reducing layer 1041 has the same configuration as the reflection reducing layer 1021. Like in the case of the reflection reducing film 1020 according to the fourth embodiment, the buffer layer 1042 is provided to come into contact with the optical substrate 100 and the reflection reducing layer 1041 and maintains a sufficient peeling strength. In the following explanation for the reflection reducing film 1040, constituent elements which are substantially different from in the reflection reducing film 1020 according to the fourth embodiment will be described and a description for the same constituent elements will be arbitrarily omitted.

For the optical substrate 100, a transparent material having a refractive index equal to or higher than 1.51 and equal to or lower than 1.72 at the d-line can be preferably used. Examples of the transparent material include BASF-2 (SUMITA Optical glass, Inc.), F-3 (SUMITA Optical glass, Inc.), S-TIM8 (OHARA INC.), LF1 (SUMITA Optical glass, Inc.), BK7 (SUMITA Optical glass, Inc.) and the like.

The buffer layer 1042 has a 4-layer structure depending on the refractive index of the optical substrate 100 to reduce reflection light generated between the optical substrate 100 and the reflection reducing layer 1041. Herein, the thirteenth layer 13 is preferably made of the above-described intermediate-refractive index material, the tenth layer 10 and the twelfth layer 12 are preferably made of the above-described high-refractive index material and the eleventh layer 11 is preferably made of the above-described low-refractive index material. As the intermediate-refractive index material for the buffer layer 1042, $Al_2O_3$ or the like having a refractive index equal to or higher than 1.62 and equal to or lower than 1.65 at the d-line is particularly preferably used. In addition, as the high-refractive index material for the buffer layer 1042, the substance H4 (Merck & Co., Inc.) or the like having a refractive index equal to or higher than 2.08 and equal to or lower than 2.11 at the d-line is particularly preferably used. Further, as the low-refractive index material for the buffer layer 1042, $MgF_2$ or the like having a refractive index equal to or higher than 1.37 and equal to or lower than 1.40 at the d-line is particularly preferably used.

According to the reflection reducing film 1040 of this embodiment, the first to thirteenth layers 1 to 13 each having a refractive index in a predetermined range are sequentially laminated from the air-side on the optical substrate 100 having a refractive index equal to or higher than 1.51 and equal to or lower than 1.72 at the d-line and thus the same advantages as in the reflection reducing film 1020 of the fourth embodiment are obtained.

Seventh Embodiment

Figure 8:
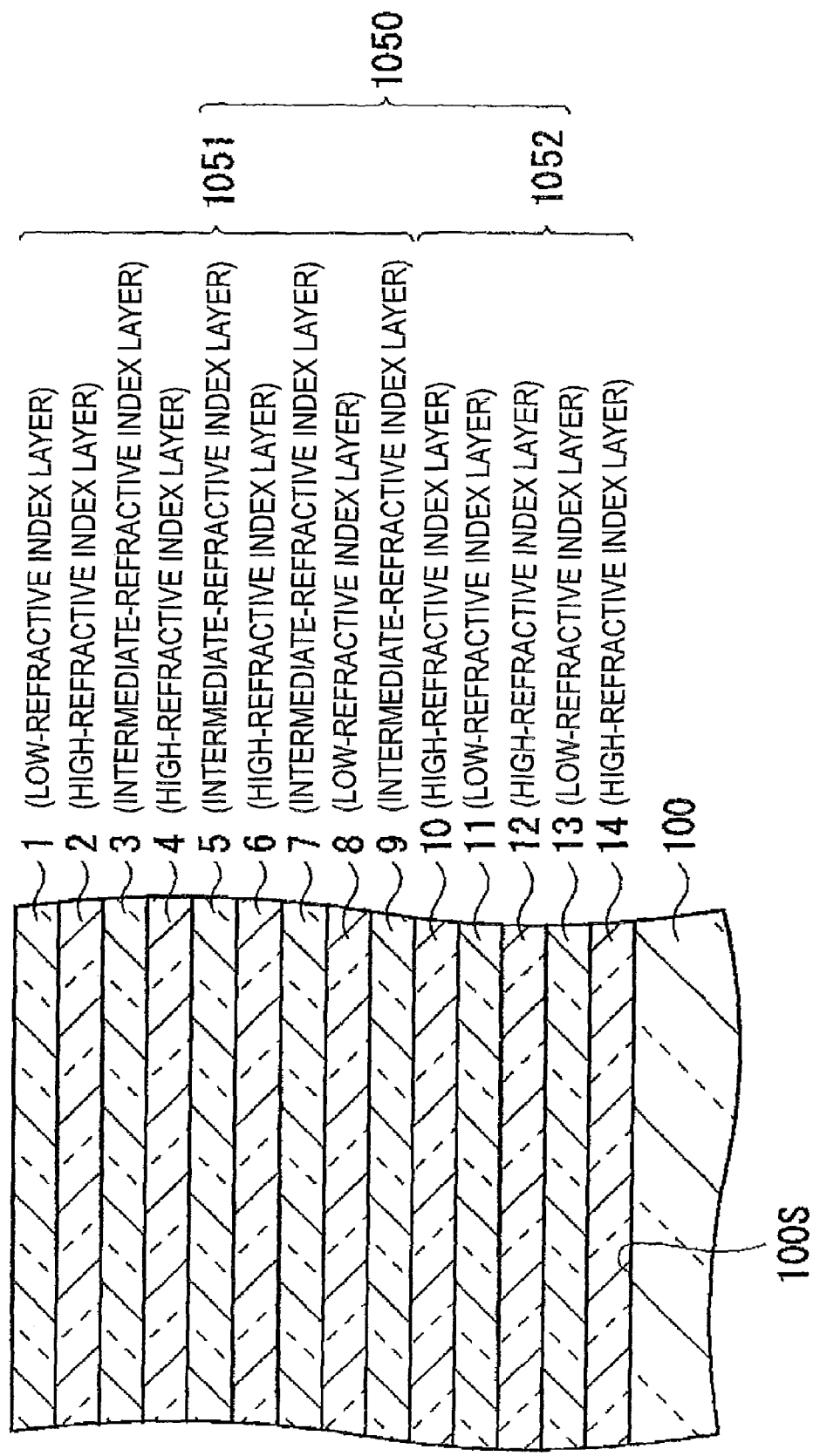
FIG. 8 is a cross-sectional view of a reflection reducing film according to a seventh embodiment of the invention.

FIG. 8 is a schematic cross-sectional view showing the configuration of a reflection reducing film 1050 according to a seventh embodiment of the invention. The reflection reducing film 1050 of FIG. 8 corresponds to an eighth numerical example (Table 28 and FIGS. 39A and 39B) to be described later.

The reflection reducing film 1050 is a multilayer film composed of total 14 layers provided on a surface 100S of an optical substrate 100 and first to fourteenth layers 1 to 14 are sequentially laminated from the opposite side to the optical substrate 100. Among them, the first to ninth layers 1 to 9 serve as a reflection reducing layer 1051 and the tenth to thirteenth layers 10 to 14 serve as a buffer layer 1052. The reflection reducing layer 1051 has the same configuration as the reflection reducing layer 1021. Like in the case of the reflection reducing film 1020 according to the fourth embodiment, the buffer layer 1052 is provided to come into contact with the optical substrate 100 and the reflection reducing layer 1051 and maintains a sufficient peeling strength. In the following explanation for the reflection reducing film 1050, constituent elements which are substantially different from in the reflection reducing film 1020 according to the fourth embodiment will be described and a description for the same constituent elements will be arbitrarily omitted.

For the optical substrate 100, a transparent material having a refractive index equal to or higher than 1.57 and equal to or lower than 1.62 at the d-line can be preferably used. Examples of the transparent material include F-3 (SUMITA Optical glass, Inc.), S-TIM8 (OHARA INC.), LF1 (SUMITA Optical glass, Inc.) and the like.

The buffer layer 1052 has a 5-layer structure depending on the refractive index of the optical substrate 100 to reduce reflection light generated between the optical substrate 100 and the reflection reducing layer 1051. Herein, the tenth layer 10, the twelfth layer 12 and the fourteenth layer 14 are preferably made of the above-described high-refractive index material, and the eleventh layer 11 and the thirteenth layer 13 are preferably made of the above-described low-refractive index material. As the high-refractive index material for the buffer layer 1052, the substance H4 (Merck & Co., Inc.) or the like having a refractive index equal to or higher than 2.08 and equal to or lower than 2.11 at the d-line is particularly preferably used. In addition, as the low-refractive index material for the buffer layer 1052, $MgF_2$ or the like having a refractive index equal to or higher than 1.37 and equal to or lower than 1.40 at the d-line is particularly preferably used.

According to the reflection reducing film 1050 of this embodiment, the first to fourteenth layers 1 to 14 each having a refractive index in a predetermined range are sequentially laminated from the air-side on the optical substrate 100 having a refractive index equal to or higher than 1.57 and equal to or lower than 1.62 at the d-line and thus the same advantages as in the reflection reducing film 1020 of the fourth embodiment are obtained.

Eighth Embodiment

Figure 9:
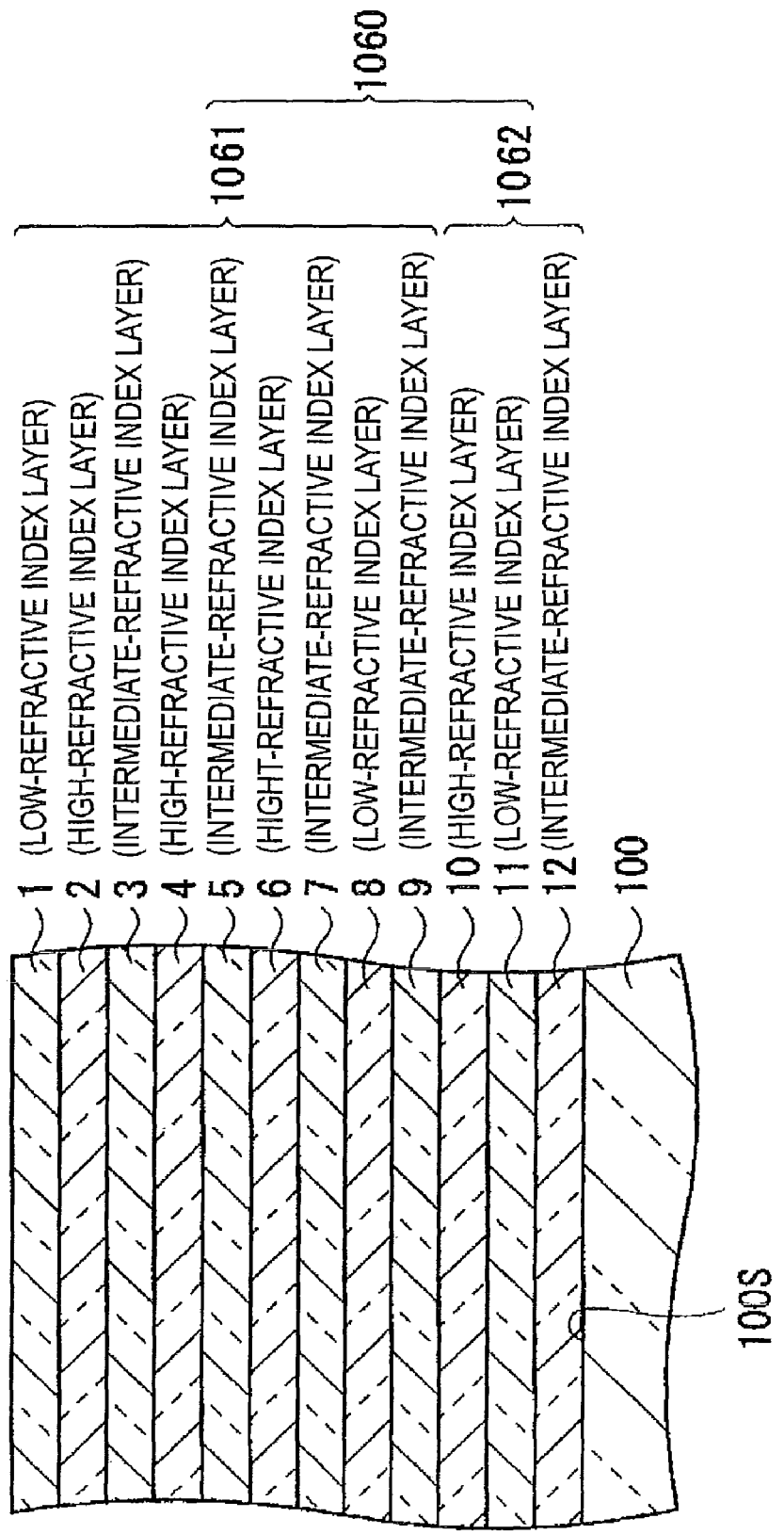
FIG. 9 is a cross-sectional view of a reflection reducing film according to an eighth embodiment of the invention.

FIG. 9 is a schematic cross-sectional view showing the configuration of a reflection reducing film 1060 according to an eighth embodiment of the invention. The reflection reducing film 1060 of FIG. 9 corresponds to ninth numerical examples (Tables 29 to 32 and FIGS. 40A to 43B) to be described later. The reflection reducing film 1060 is a multi-layer film composed of total 12 layers provided on a surface 100S of an optical substrate 100 and first to twelfth layers 1 to 12 are sequentially laminated from the opposite side to the optical substrate 100. Among them, the first to ninth layers 1 to 9 serve as a reflection reducing layer 1061 and the tenth to twelfth layers 10 to 12 serve as a buffer layer 1062. The reflection reducing layer 1061 has the same configuration as the reflection reducing layer 1021. Like in the case of the reflection reducing film 1020 according to the fourth embodiment, the buffer layer 1062 is provided to come into contact with the optical substrate 100 and the reflection reducing layer 1061 and maintains a sufficient peeling strength. In the following explanation for the reflection reducing film 1060, constituent elements which are substantially different from in the reflection reducing film 1020 according to the fourth embodiment will be described and a description for the same constituent elements will be arbitrarily omitted.

For the optical substrate 100, a transparent material having a refractive index equal to or higher than 1.40 and equal to or lower than 1.58 at the d-line can be preferably used. Examples of the transparent material include LF1 (SUMITA Optical glass, Inc.), BK7 (SUMITA Optical glass, Inc.), K-PFK85 (SUMITA Optical glass, Inc.), quartz (silica) glass ($SiO_2$), fluorite ($CaF_2$) and the like.

The buffer layer 1062 has a 3-layer structure depending on the refractive index of the optical substrate 100 to reduce reflection light generated between the optical substrate 100 and the reflection reducing layer 1061. Herein, the tenth layer 10 is preferably made of the above-described high-refractive index material, the eleventh layer 11 is preferably made of the above-described low-refractive index material and the twelfth layer 12 is preferably made of the above-described intermediate-refractive index material. As the high-refractive index material for the buffer layer 1062, the substance H4 (Merck & Co., Inc.) or the like having a refractive index equal to or higher than 2.08 and equal to or lower than 2.11 at the d-line is particularly preferably used. In addition, as the low-refractive index material for the buffer layer 1062, $MgF_2$ or the like having a refractive index equal to or higher than 1.37 and equal to or lower than 1.40 at the d-line is particularly preferably used. Further, as the intermediate-refractive index material for the buffer layer 1062, $Al_2O_3$ having a refractive index equal to or higher than 1.62 and equal to or lower than 1.65 at the d-line is particularly preferably used.

According to the reflection reducing film 1060 of this embodiment, the first to twelfth layers 1 to 12 each having a refractive index in a predetermined range are sequentially laminated from the air-side on the optical substrate 100 having a refractive index equal to or higher than 1.40 and equal to or lower than 1.58 at the d-line and thus the same advantages as in the reflection reducing film 1020 of the fourth embodiment are obtained.

Modified Example of Eighth Embodiment

Figure 10:
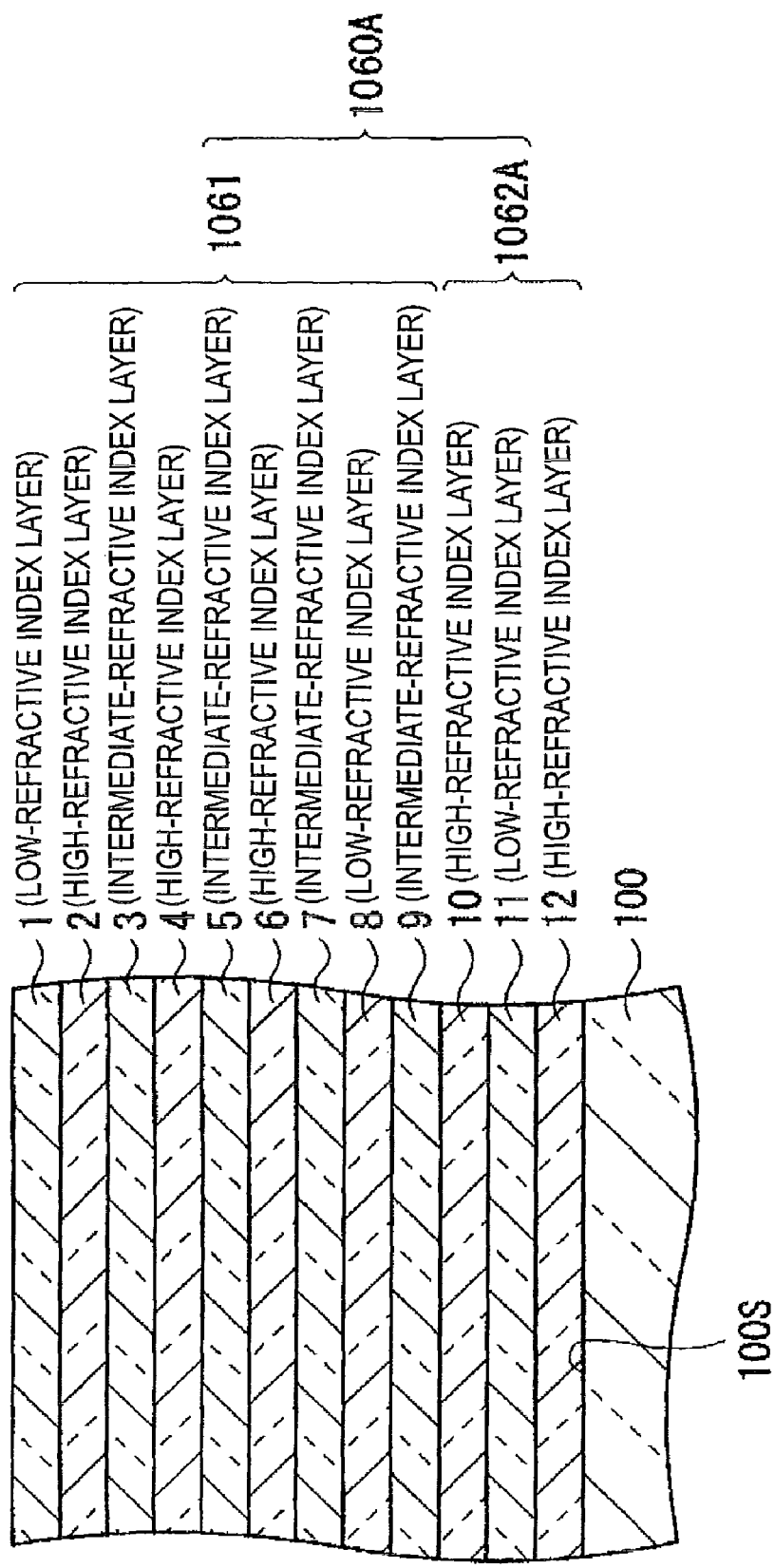
FIG. 10 is a cross-sectional view of a reflection reducing film according to a modified example of FIG. 9.

FIG. 10 is a schematic cross-sectional view showing the configuration of a reflection reducing film 1060A according to a modified example of this embodiment. The reflection reducing film 1060A of FIG. 10 corresponds to a tenth numerical example (Table 33 and FIGS. 44A and 44B) to be described later.

In the above embodiment, the twelfth layer 12 of the buffer layer 1062 having the 3-layer structure, which is positioned closest to the optical substrate 100, is made of the intermediate-refractive index material. However, the twelfth layer 12 may be made of the high-refractive index material as in a buffer layer 1062A of this modified example. In this case, the twelfth layer 12 may be made of a material having a refractive index lower than that of the material for the tenth layer 10, particularly, $Y_2O_3$ having a refractive index equal to or higher than 1.80 and equal to or lower than 1.82 at the d-line. In this case, the same advantages as in the reflection reducing film 1020 of the fourth embodiment are obtained.

Ninth Embodiment

Figure 11:
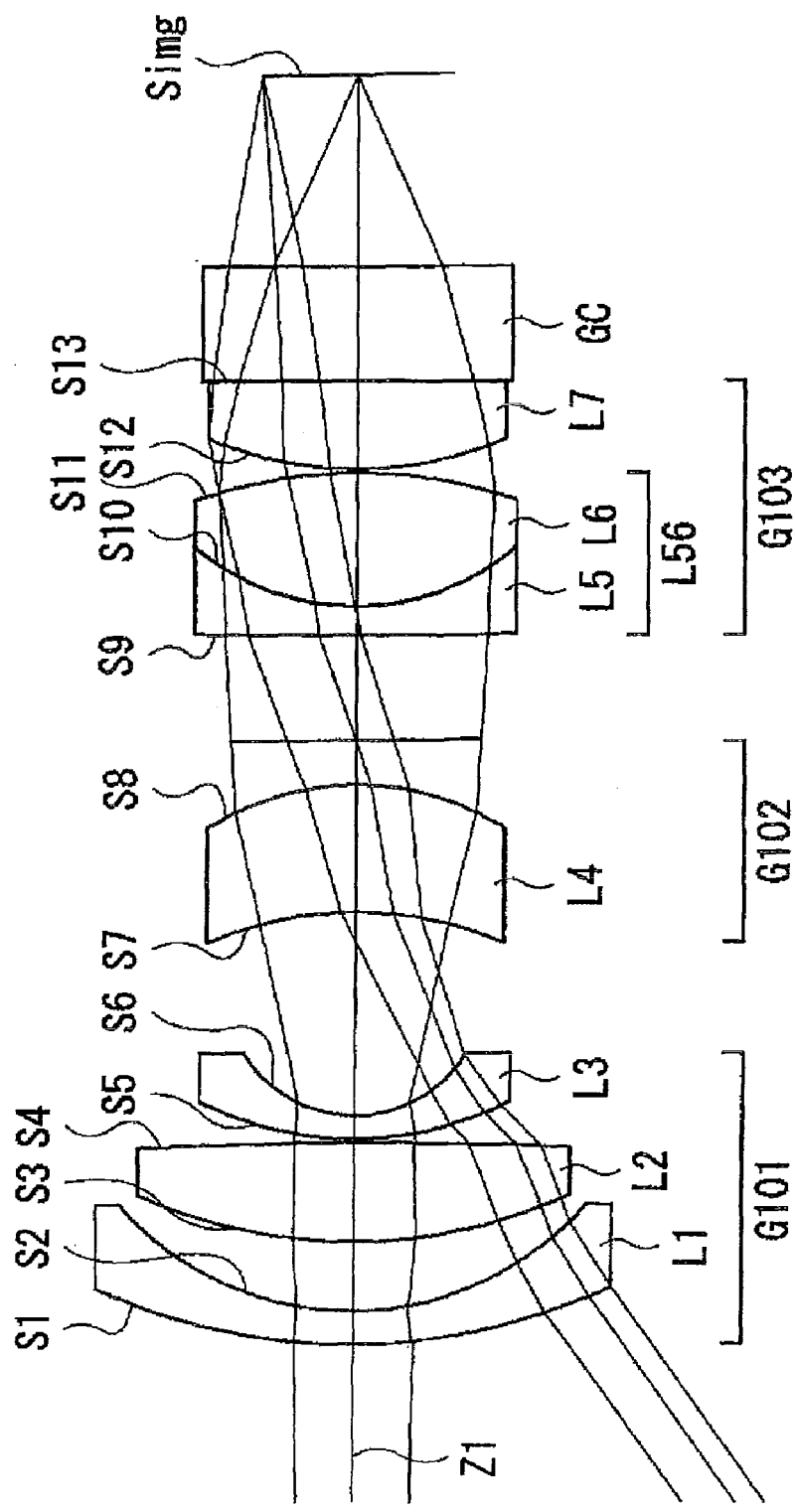
FIG. 11 is a cross-sectional view of a retrofocus lens according to a ninth embodiment of the invention.

FIG. 11 shows an example of the configuration of a retro-focus lens according to a ninth embodiment of the invention.

In FIG. 11, reference sign Li (i=1 to 8) denotes an i-th constituent element where a constituent element positioned closest to an object side is denoted by 1 and the number increases toward an image side (imaging side). Reference sign Si (i=1 to 13) denotes an i-th face where a face of the constituent element positioned closest to the object side is denoted by 1 and the number increases toward the image side (imaging side).

The retrofocus lens is an optical system mounted on an image pickup apparatus such as a closed circuit television (CCTV) camera which is used for, for example, outdoor monitoring or security, and first to third lens groups G101 to G103 are arranged along an optical axis Z1 in order from the object side. Herein, for example, the first lens group G101 has a negative refractive power, and the second lens group G102 and the third lens group G103 have a positive refractive power. The first lens group G101 and the second lens group G102 exhibits a negative refractive power as a whole. Although not shown in the drawing, a diaphragm is provided between the first lens group G101 and the second lens group G102 to restrict the transmission of peripheral luminous flux and an aperture diaphragm is provided between the second lens group G102 and the third lens group G103.

The first lens group G101 in order from the object side, includes a negative meniscus lens L1 having a convex surface directed toward the object side, a lens L2 having a biconvex shape and a meniscus lens L3 having a convex surface directed toward the object side. The second lens group G102 includes a positive meniscus lens L4 having a convex surface directed toward the image side. The third lens group G103 in order from the object side, includes a cemented lens L56 having a negative lens L5 and a positive lens L6 and a positive lens L7 having a convex surface directed toward the object side.

An imaging face (image pickup face) Simg of the retrofocus lens is provided with, for example, an image pickup element such as a charge-coupled device (CCD) (not shown). A variety of optical components GC are arranged between the third lens group G103 and the imaging face Simg in accordance with the configuration of the camera on which the optical components are mounted. As the optical components GC, for example, flat plate-shaped members such as various kinds of optical filters and cover glass for protecting the imaging face are used.

All the faces S1 to S13 (except for the cemented face) of the lenses L1 to L7 of the retrofocus lens having the above configuration, or an arbitrary face Si among the faces are/is provided with any of the reflection reducing films 20, 30, 40, 40A, 1020, 1030, 1040, 1050, 1060 and 1060A according to the first to eighth embodiments. Accordingly, in the retrofocus lens, the occurrence of flare and ghost can be suppressed and a more excellent chromaticity balance can be obtained. Moreover, in the first to third embodiments, as being able to cope with both of the visible region and the near-infrared region, it is possible to cope with day-night photographing.

Tenth Embodiment

Figure 12:
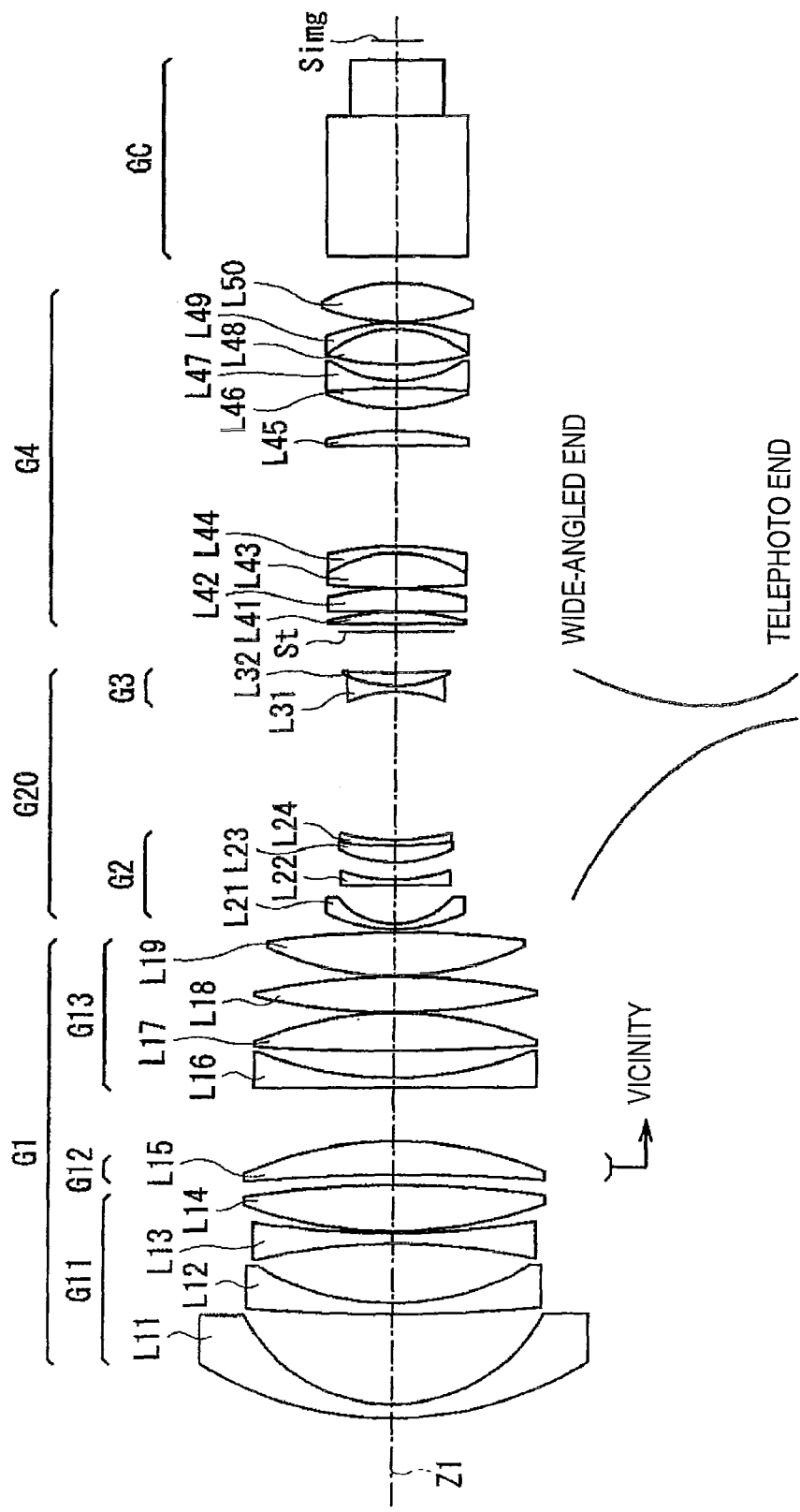
FIG. 12 is a cross-sectional view of a wide angle system zoom lens according to a tenth embodiment of the invention.

FIG. 12 shows an example of the configuration of a wide angle system zoom lens according to a tenth embodiment of the invention.

The wide angle system zoom lens is used by being mounted on a camera for, for example, e-cinema or HDTV. The wide angle system zoom lens in order from the object side, includes a focus group G1, a variable power group G20, an aperture diaphragm St and a relay lens group G4 along an optical axis Z1. The variable power group G20 in order from the object side, includes a first moving group G2 and a second moving group G3. An imaging face (image pickup face) Simg of the wide angle system zoom lens is provided with, for example, an image pickup element (not shown). A variety of optical members may be arranged between the relay lens group G4 and the imaging face in accordance with the configuration of the camera on which the lenses are mounted. In the configuration example of FIG. 12, a color separation optical system GC composed of a color separation prism and the like is disposed.

The wide angle system zoom lens varies power by moving the variable power group G20 on an optical axis. Specifically, power is varied by moving the first moving group G2 on the optical axis and focal shift correction accompanied with the power variation is performed by moving the second moving group G3 on the optical axis. The first moving group G2 and the second moving group G3 are moved so as to draw a trajectory shown by a full line in FIG. 12 while varying power from a wide angle end to a telephoto end. Focus adjustment is performed by moving some of lens groups of the focus group G1 on the optical axis. The relay lens group G4 is always fixed upon varying power and focusing.

The focus group G1 has a positive refractive power as a whole. The focus group G1 in order from the object side, includes a first lens group G11 having, for example, a negative refractive power as a whole and fixed upon focusing, a second lens group G12 having a positive refractive power as a whole and a third lens group G13 having, for example, a positive refractive power as a whole and fixed upon focusing. All the faces of lenses L11 to L19 (to be described later) of the focus group G1, or an arbitrary face among the faces are/is provided with any of the reflection reducing films 20, 30, 40, 40A, 1020, 1030, 1040, 1050, 1060 and 1060A according to the first to eighth embodiments.

The first lens group G11 is configured so that plural negative lenses are disposed on the front side and a positive lens is disposed closest to the imaging face. Specifically, the first lens group G11 is composed of, for examples, four lenses L11 to L14, and the lenses L11 to L13 are negative lenses and the lens L14 is a positive lens. In the first lens group G11, the lenses L11 and L12 are negative meniscus lenses each having a convex surface directed toward the object side. The lens L13 is, for example, a biconcave lens. The lens L14 is, for example, a biconvex lens.

The second lens group G12 includes at least one lens and is composed of only a positive lens. The second lens group G12 has a positive refractive power to be moved to an imaging face side upon focusing from infinity to a short-distance object (vicinity). The wide angle system zoom lens is an inner focus type lens in which some of the internal groups in the focus group G1 are moved. Specifically, the second lens group G12 includes, for example, one positive lens L15. The positive lens L15 is, for example, a positive meniscus lens having a concave surface directed toward the object side.

The third lens group G13 in order from the object side, includes a negative lens and plural positive lenses, and the last face thereof as a convex face faces the image face. Specifically, the third lens group G13 has, for example, one negative lens L16 and three positive lenses L17 to L19. The negative lens L16 is, for example, a negative meniscus lens having a convex surface directed toward the object side.

In the variable power group G20, the first moving group G2 has a negative refractive power as a whole. Specifically, the first moving group G2 has, for example, four lenses L21 to L24. The lens L21 is, for example, a negative meniscus lens having a convex surface directed toward the object side. The lens L22 is, for example, a biconcave lens. The lenses L23 and L24 are, for example, cemented lenses.

The second moving group G3 has a positive or negative refractive power as a whole. Specifically, the second moving group G3 has, for example, two cemented lenses L31 and L32.

The relay lens group G4 has a positive refractive power as a whole. Specifically, the relay lens group G4 has, for example, 10 lenses L41 to L50. The relay lens group G4 is configured so that luminous flux runs substantially parallel between a front group composed of the lenses L41 to L44 and a rear group composed of the lenses L45 to L50.

Next, actions and effects of the wide angle system zoom lens configured as described above will be described.

In the wide angle system zoom lens, power is varied by moving the first moving group G2 of the variable power group G20 in an optical axis direction and focal shift correction accompanied with the power variation is performed by moving the second moving group G3 in the optical axis direction. Focus adjustment is performed by moving the second lens group G12 of the focus group G1 on the optical axis. The second lens group G12 has a positive refractive power to be moved to the imaging face side upon focusing from infinity to a short-distance object (vicinity).

The wide angle system zoom lens employs an inner focus configuration in which the focus group G1 is divided into the plural groups and only the second lens group G12 among the groups is moved. Accordingly, a change in field angle (breathing) upon focusing can be excellently maintained and a focus adjustment mechanism can be simplified. In addition, since the first lens group G11 as a forefront group is a fixed group, dust resistance and antifogging properties are easily ensured.

Further, all the faces (except for the cemented face) of the lenses L11 to L19 of the focus group G1, or some of the faces are provided with any of the reflection reducing films 20, 30, 40, 40A, 1020, 1030, 1040, 1050, 1060 and 1060A according to the first to eighth embodiments, and thus the occurrence of flare and ghost can be suppressed and a more excellent chromaticity balance can be obtained. Moreover, in the first to third embodiments, as being able to cope with both of the visible region and the near-infrared region, it is possible to cope with day-night photographing.

Generally, when a reflection reducing film is formed by a deposition method such as sputtering on a face with relatively high curvature which is, for example, the face of the lens L11 on the object side, a thickness of the film becomes thinner in a portion (peripheral portion) distant from the optical axis of the face than in a portion (center portion) close to the optical axis. Furthermore, in many cases, a relatively large angle is formed between light passing through the peripheral portion of the face and a normal line of the face. Accordingly, when a conventional reflection reducing film for reducing the reflection of visible light is formed on such a high-curvature face, a ratio of peripheral light intensity is reduced. However, since all the reflection reducing films 20, 30, 40 and 40A used in this embodiment can sufficiently reduce a reflectance for normal incident light and oblique incident light in a wide wavelength band from a visible region to a near-infrared region, the reduction of the ratio of peripheral light intensity can be sufficiently suppressed.

Eleventh Embodiment

Figure 13:
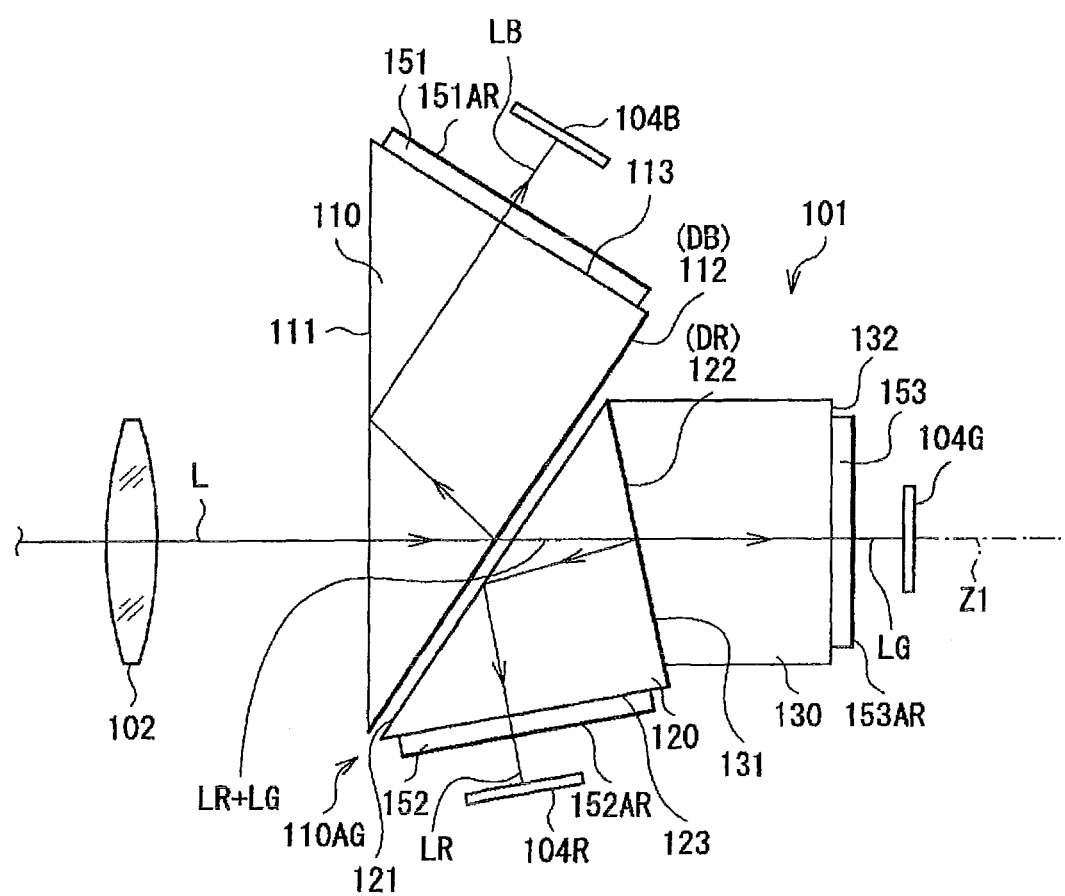
FIG. 13 is a cross-sectional view of a color separation optical system according to an eleventh embodiment of the invention.
Figure 14A:
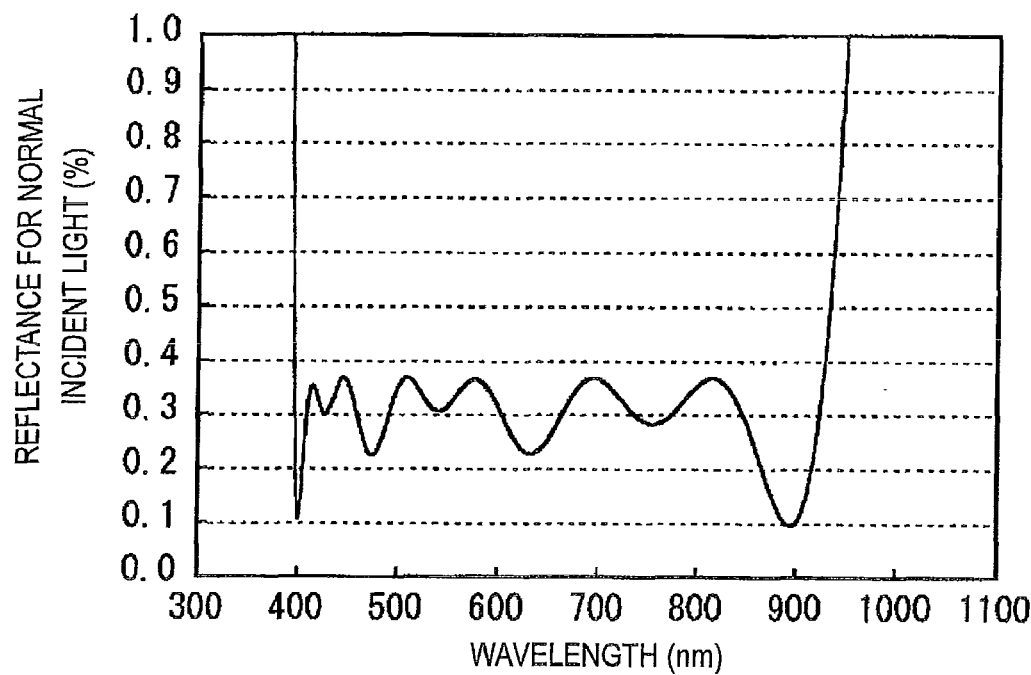
FIGS. 14A and 14B are reflectance distribution graphs of Example 1-1 corresponding to the reflection reducing film shown in FIG. 1.
Figure 14B:
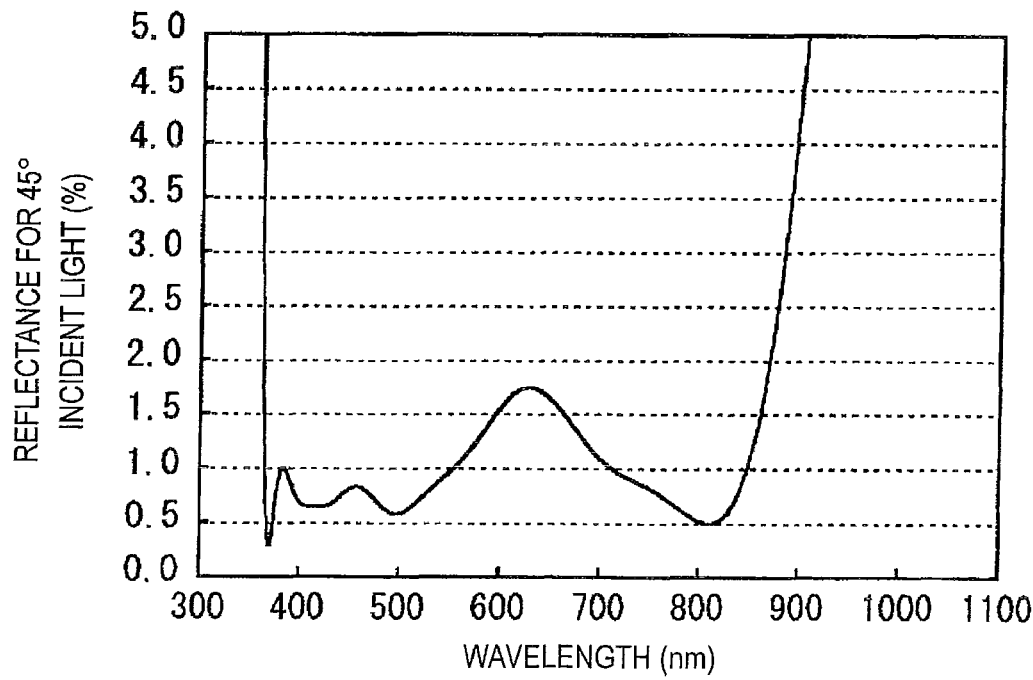
Figure 15A:
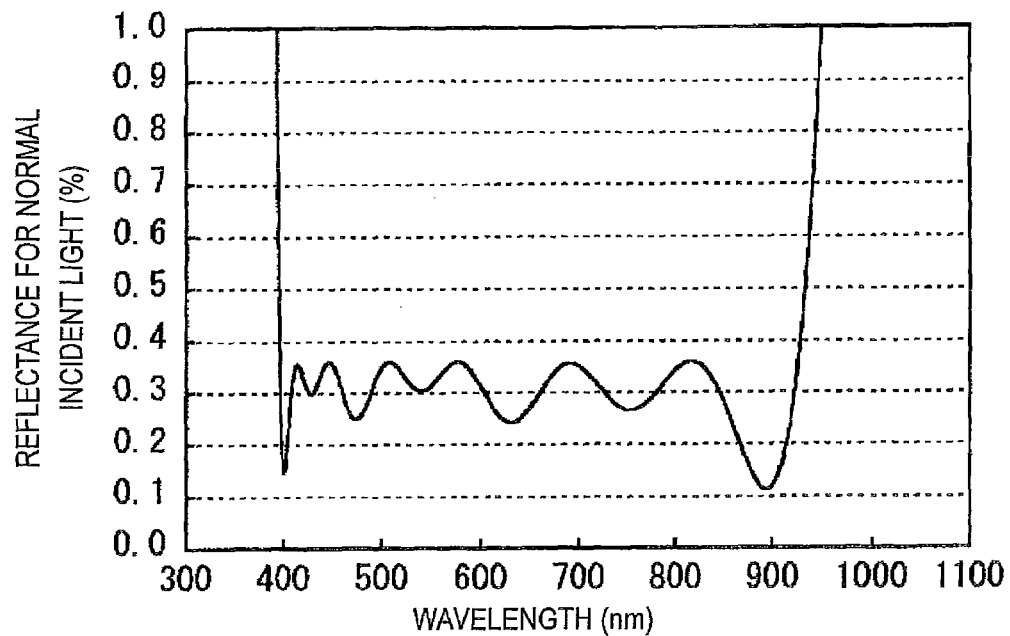
FIGS. 15A and 15B are reflectance distribution graphs of Example 1-2 corresponding to the reflection reducing film shown in FIG. 1.
Figure 15B:
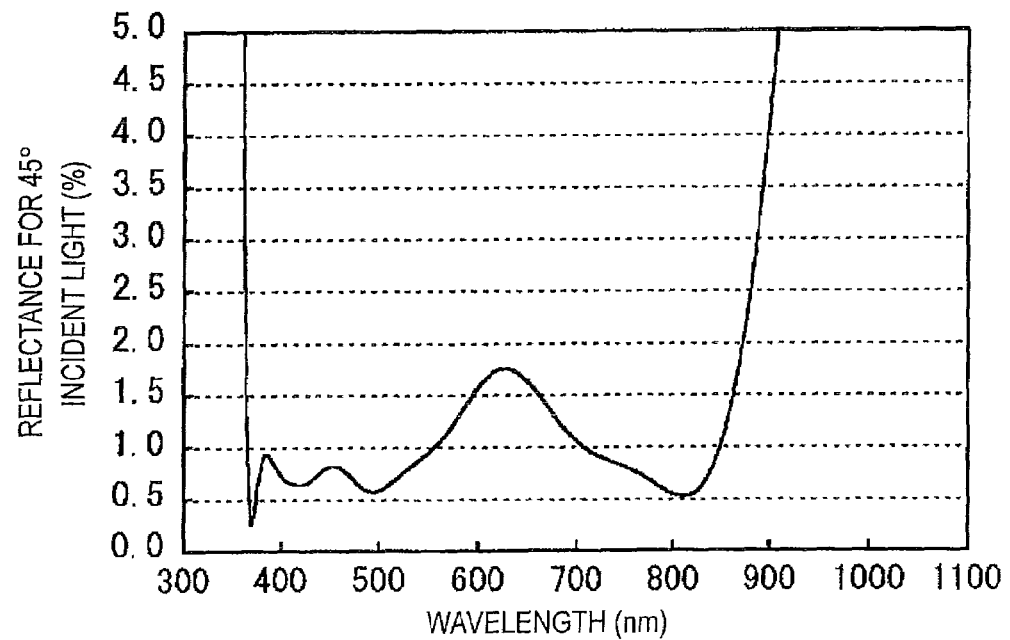
Figure 16A:
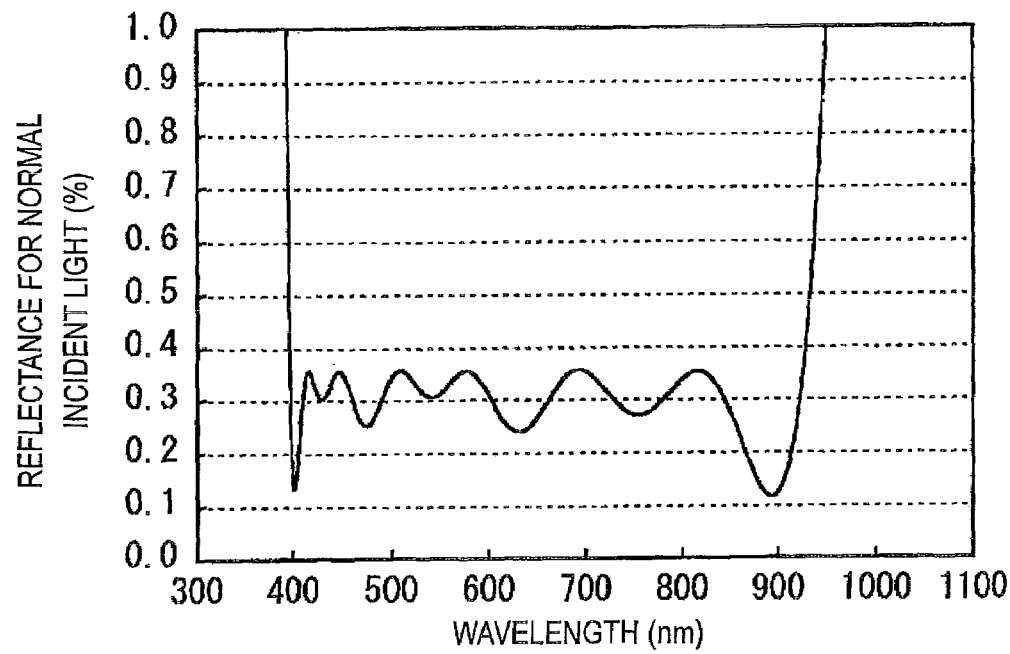
FIGS. 16A and 16B are reflectance distribution graphs of Example 1-3 corresponding to the reflection reducing film shown in FIG. 1.
Figure 16B:
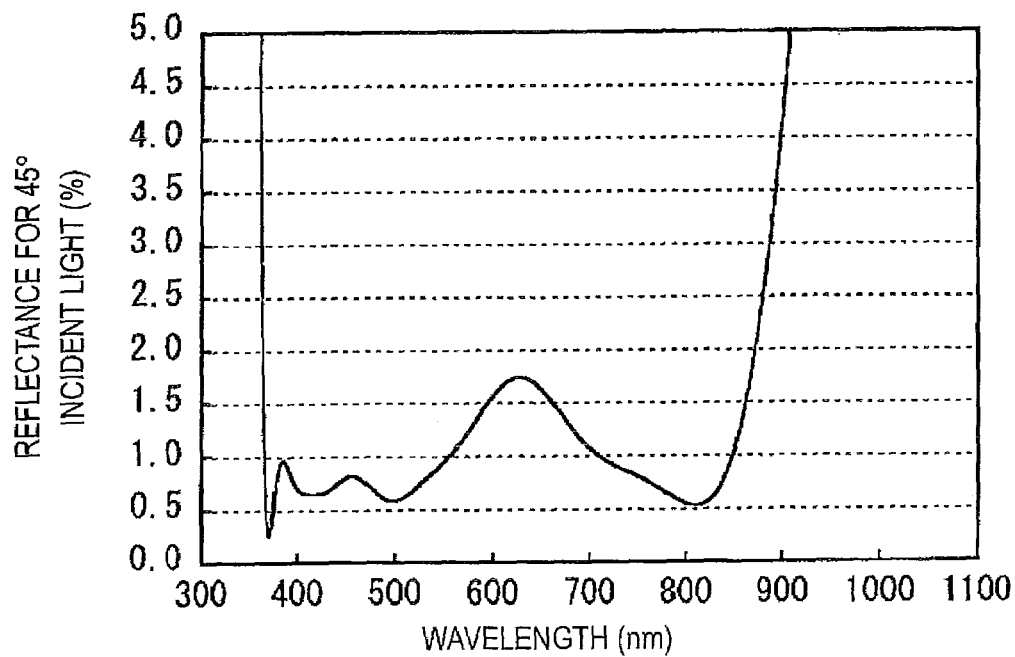
Figure 17A:
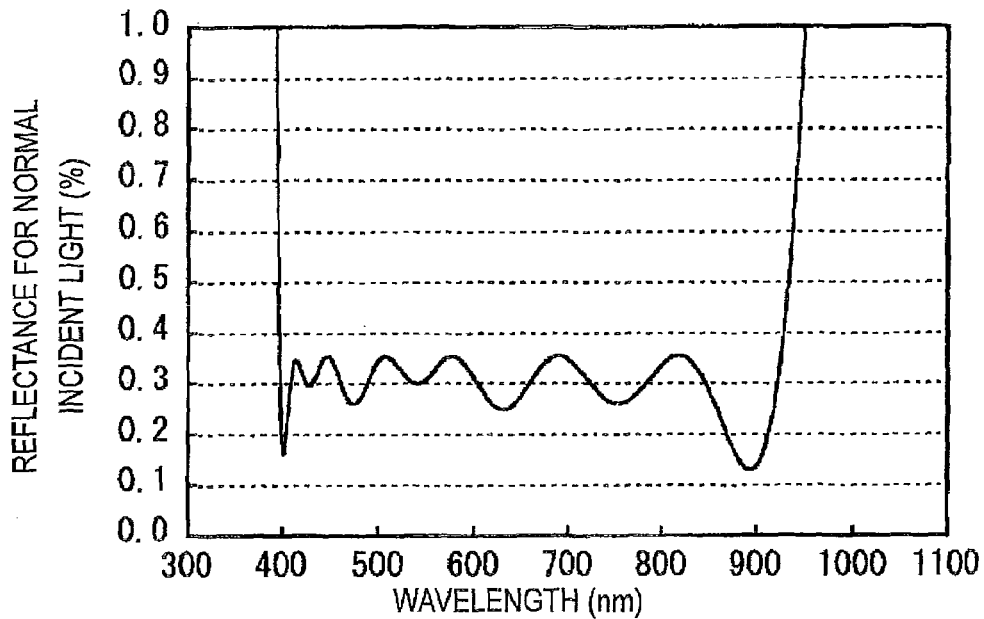
FIGS. 17A and 17B are reflectance distribution graphs of Example 1-4 corresponding to the reflection reducing film shown in FIG. 1.
Figure 17B:
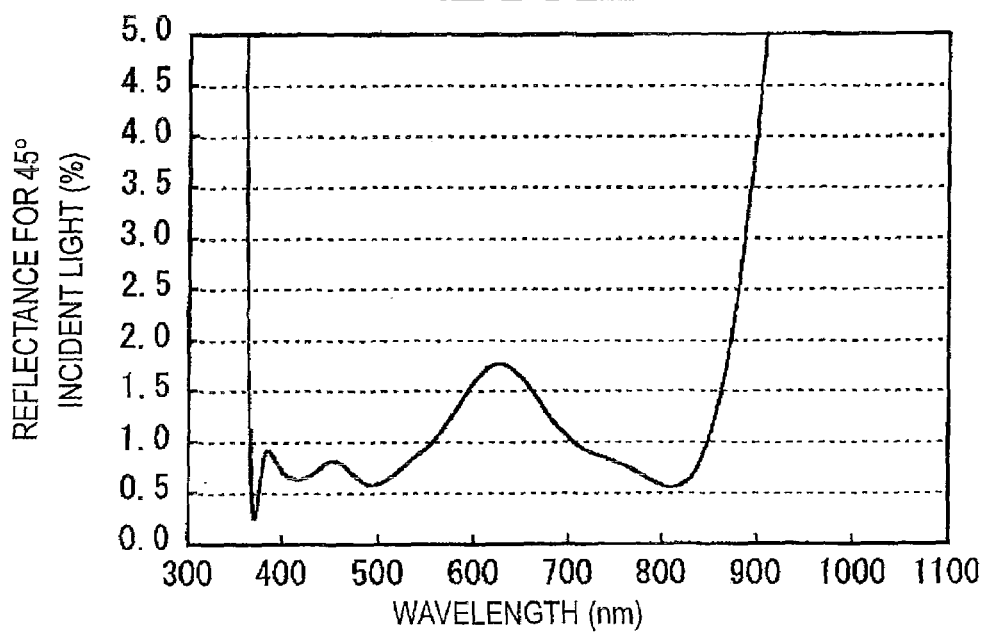
Figure 18A:
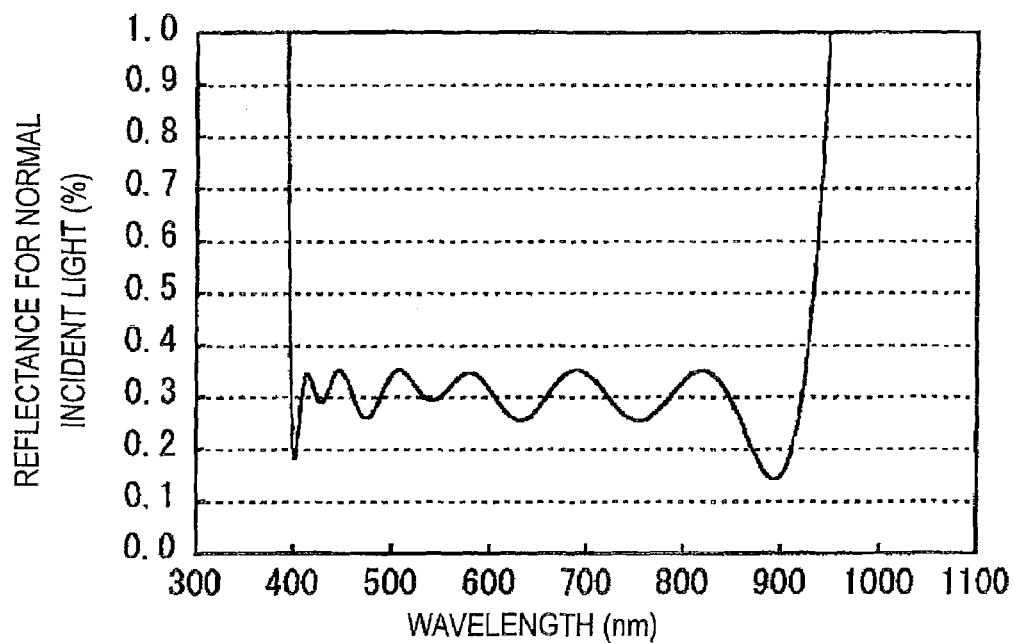
FIGS. 18A and 18B are reflectance distribution graphs of Example 1-5 corresponding to the reflection reducing film shown in FIG. 1.
Figure 18B:
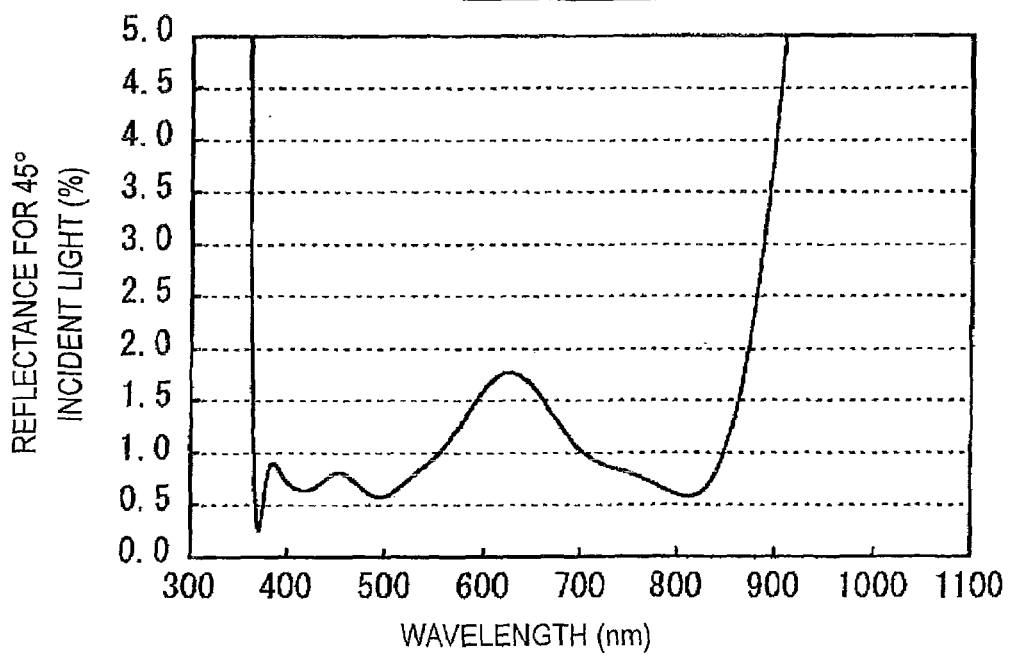
Figure 20A:
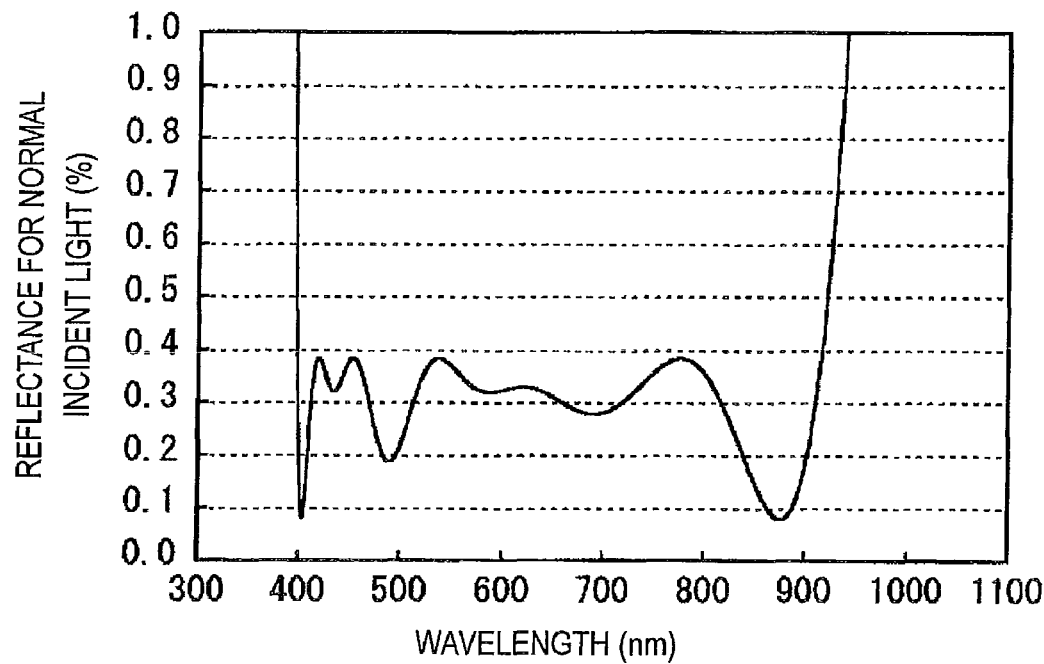
FIGS. 20A and 20B are reflectance distribution graphs of Example 1-7 corresponding to the reflection reducing film shown in FIG. 1.
Figure 20B:
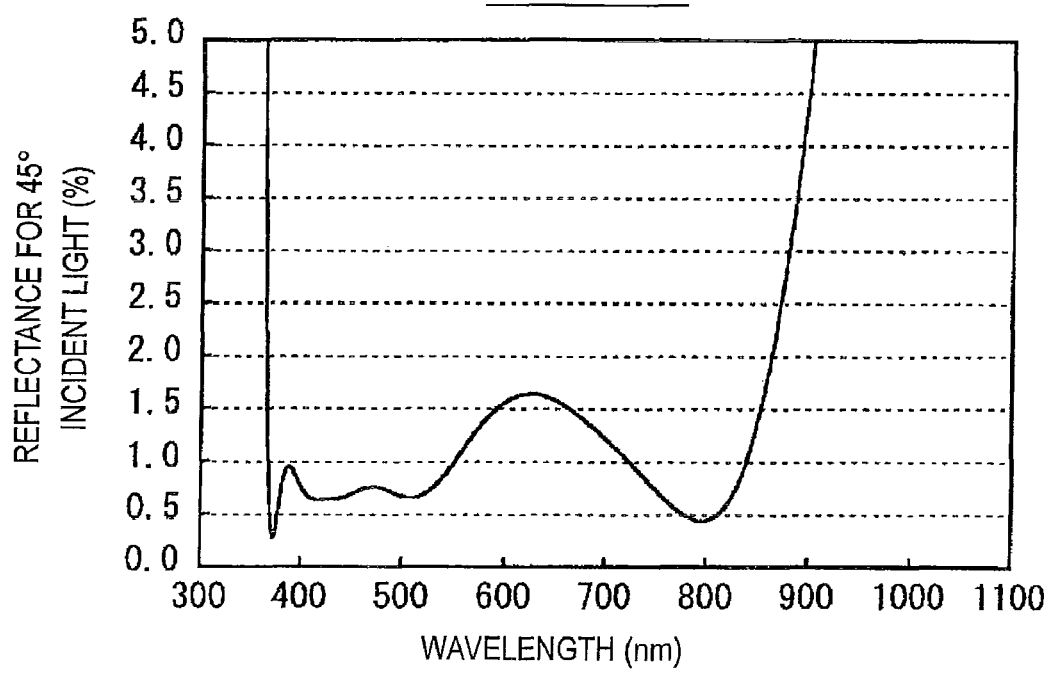

FIG. 13 shows the configuration of a main portion of an image pickup apparatus provided with a color separation optical system 101 according to an eleventh embodiment of the invention. The image pickup apparatus is used as, for example, an image pickup portion of a television camera. The color separation optical system 101 separates incident light L via a photographing lens 102 into three color light components, that is, blue light LB, red light LR and green light LG. Image pickup elements 104B, 104R and 104G for the respective color light, such as CCDs, are disposed at positions corresponding to the color lights separated by the color separation optical system 101, respectively. The color separation optical system 101 is sequentially provided with a first prism 110, a second prism 120 and a third prism 130 from a light incident side along an optical axis Z1. The color separation optical system 101 according to this embodiment is an example of the configuration for extracting the blue light LB, the red light LR and the green light LG by the first prism 110, the second prism 120 and the third prism 130, respectively. The color separation optical system 101 is referred to as the philips type in which the first prism 110 and the second prism 120 are disposed with an air interval 110AG interposed therebetween.

The first prism 110 has a first face 111, a second face 112 and a third face 113. The third face 113 of the first prism 110 is a light emitting face. The light emitting face is provided with a trimming filter 151. A light emitting face of the trimming filter 151 is provided with a reflection reducing film 151AR for preventing ghost and flare. The third face 113 of the first prism 110 may be provided with the reflection reducing film 151AR without providing the trimming filter 151.

The second face 112 of the first prism 110 is provided with a blue light reflection dichroic film DB as a first dichroic film. The blue light reflection dichroic film DB has a film configuration for reflecting the blue light LB as a first color light component and transmitting the green light LG and the red light LR.

The second prism 120 has a first face 121, a second face 122 and a third face 123. The third face 123 of the second prism 120 is a light emitting face. The light emitting face is provided with a trimming filter 152. A light emitting face of the trimming filter 152 is provided with a reflection reducing film 152AR for preventing ghost and flare. The third face 123 of the second prism 120 may be provided with the reflection reducing film 152AR without providing the trimming filter 152.

The second face 122 of the second prism 120 is provided with a red light reflection dichroic film DR as a second dichroic film. The red light reflection dichroic film DR has a film configuration for reflecting the red light LR as a second color light component and transmitting the green light LG.

The third prism 130 has a first face 131 and a second face 132. The third prism 130 is bonded to the second prism 120 via the red light reflection dichroic film DR. Specifically, the second face 122 of the second prism 120 and the first face 131 of the third prism 130 are bonded to each other via the red light reflection dichroic film DR. The second face 132 of the third prism 130 is a light emitting face. The emitting face is provided with a trimming filter 153. A light emitting face of the trimming filter 153 is provided with a reflection reducing film 153AR for preventing ghost and flare. The second face 132 of the third prism 130 may be provided with the reflection reducing film 153AR without providing the trimming filter 153.

Next, actions of the image pickup apparatus according to this embodiment, particularly, optical actions and effects of the color separation optical system 101 will be described.

In the image pickup apparatus, subject light from a subject (not shown) irradiated by a light source (not shown) is incident on the color separation optical system 101 via the photographing lens 102. The color separation optical system 101 separates the incident light L into the three color light components, that is, the blue light LB, the red light LR and the green light LG. Specifically, first, the blue light LB among the incident light L is reflected by the blue light reflection dichroic film DB to be extracted as the first color light component from the first prism 110. In addition, the red light LR transmitted through the blue light reflection dichroic film DB is reflected by the red light reflection dichroic film DR to be extracted as the second color light component from the second prism 120. Moreover, the green light LG transmitted through the blue light reflection dichroic film DB and the red light reflection dichroic film DR is extracted as the third color light component from the third prism 130. The color light separated by the color separation optical system 101 is incident on the image pickup elements 104B, 104R and 104G provided to correspond to the color light. The image pickup elements 104B, 104R and 104G output electric signals as image pickup signals in accordance with the incident color light.

In this embodiment, the light emitting faces of the first to third prisms 110, 120 and 130 are provided with the reflection reducing films 151AR, 152AR and 153AR, respectively. If any of the reflection reducing films 20, 30, 40, 40A, 1020, 1030, 1040, 1050, 1060 and 1060A according to the first to eighth embodiments is applied as the reflection reducing films 151AR, 152AR and 153AR, the occurrence of flare and ghost can be suppressed and a more excellent chromaticity balance can be obtained. Moreover, in the first to third embodiments, as being able to cope with both of the visible region and the near-infrared region, it is possible to cope with day-night photographing.

EXAMPLES

Next, specific numerical examples of a reflection reducing film according to this embodiment will be described.

First Numerical Examples

First numerical examples (Examples 1-1 to 1-7) are shown in Tables 3 to 9 and FIGS. 14A to 20B. Herein, Tables 3 to 9 show basic data of Examples 1-1 to 1-7 corresponding to the reflection reducing film 20 shown in FIG. 1. FIGS. 14A to 20B show reflectance distributions of Examples 1-1 to 1-7. Among them, FIGS. 14A, 15A, 16A, 17A, 18A, 19A and 20A show the reflectance distributions of normal incident light of the examples, and FIGS. 14B, 15B, 16B, 17B, 18B, 19B and 20B show the reflectance distributions of oblique incident light (45° incident light) of the examples.

TABLE 3

EXAMPLE 1-1

CENTER WAVELENGTH λ = 600 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | S-LAH79 | 2.0033 | — | — | |
| 13th LAYER | Al$_2$O$_3$ | 1.6376 | 19.274 | 31.563 | (0.053 λ) |
| 12th LAYER | SUB-H4 | 2.0927 | 33.480 | 70.064 | (0.117 λ) |
| 11th LAYER | Al$_2$O$_3$ | 1.6376 | 45.174 | 73.977 | (0.123 λ) |
| 10th LAYER | SUB-H4 | 2.0927 | 32.425 | 67.856 | (0.113 λ) |
| 9th LAYER | Al$_2$O$_3$ | 1.6376 | 32.975 | 54.000 | (0.090 λ) |
| 8th LAYER | SUB-H4 | 2.0927 | 148.564 | 310.900 | (0.518 λ) |
| 7th LAYER | Al$_2$O$_3$ | 1.6376 | 83.943 | 137.465 | (0.229 λ) |
| 6th LAYER | MgF$_2$ | 1.3855 | 105.161 | 145.701 | (0.243 λ) |
| 5th LAYER | Al$_2$O$_3$ | 1.6376 | 83.988 | 137.539 | (0.229 λ) |
| 4th LAYER | SUB-H4 | 2.0927 | 74.435 | 155.770 | (0.260 λ) |
| 3rd LAYER | Al$_2$O$_3$ | 1.6376 | 16.403 | 26.862 | (0.045 λ) |
| 2nd LAYER | SUB-H4 | 2.0927 | 35.493 | 74.276 | (0.124 λ) |
| 1st LAYER | MgF$_2$ | 1.3855 | 105.429 | 146.072 | (0.243 λ) |
| AIR | — | — | — | — | |

TABLE 4

EXAMPLE 1-2

CENTER WAVELENGTH λ = 600 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | S-NPH2 | 1.9229 | — | — | |
| 13th LAYER | Al$_2$O$_3$ | 1.6376 | 26.380 | 43.200 | (0.072 λ) |
| 12th LAYER | SUB-H4 | 2.0927 | 24.935 | 52.181 | (0.087 λ) |
| 11th LAYER | Al$_2$O$_3$ | 1.6376 | 57.820 | 94.686 | (0.158 λ) |
| 10th LAYER | SUB-H4 | 2.0927 | 27.345 | 57.225 | (0.095 λ) |
| 9th LAYER | Al$_2$O$_3$ | 1.6376 | 35.886 | 58.767 | (0.098 λ) |
| 8th LAYER | SUB-H4 | 2.0927 | 146.696 | 306.991 | (0.512 λ) |
| 7th LAYER | Al$_2$O$_3$ | 1.6376 | 84.152 | 137.807 | (0.230 λ) |
| 6th LAYER | MgF$_2$ | 1.3855 | 104.493 | 144.775 | (0.241 λ) |
| 5th LAYER | Al$_2$O$_3$ | 1.6376 | 84.010 | 137.575 | (0.229 λ) |
| 4th LAYER | SUB-H4 | 2.0927 | 75.130 | 157.225 | (0.262 λ) |
| 3rd LAYER | Al$_2$O$_3$ | 1.6376 | 16.215 | 26.554 | (0.044 λ) |
| 2nd LAYER | SUB-H4 | 2.0927 | 35.310 | 73.893 | (0.123 λ) |
| 1st LAYER | MgF$_2$ | 1.3855 | 105.475 | 146.136 | (0.244 λ) |
| AIR | — | — | — | — | |

TABLE 5

EXAMPLE 1-3

CENTER WAVELENGTH λ = 600 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | LASF-N17 | 1.8830 | — | — | |
| 13th LAYER | Al$_2$O$_3$ | 1.6376 | 26.733 | 43.778 | (0.073 λ) |

TABLE 5-continued

EXAMPLE 1-3

|  | CONSTITUENT MATERIAL | REFRACTIVE INDEX N | PHISICAL THICKNESS d | CENTER WAVELENGTH $\lambda$ = 600 nm OPTICAL FILM THICKNESS INDEX N × d | |
|---|---|---|---|---|---|
| 12th LAYER | SUB-H4 | 2.0927 | 22.084 | 46.215 | (0.077 $\lambda$) |
| 11th LAYER | Al$_2$O$_3$ | 1.6376 | 57.556 | 94.254 | (0.157 $\lambda$) |
| 10th LAYER | SUB-H4 | 2.0927 | 26.895 | 56.283 | (0.094 $\lambda$) |
| 9th LAYER | Al$_2$O$_3$ | 1.6376 | 35.686 | 58.439 | (0.097 $\lambda$) |
| 8th LAYER | SUB-H4 | 2.0927 | 146.650 | 306.894 | (0.511 $\lambda$) |
| 7th LAYER | Al$_2$O$_3$ | 1.6376 | 84.188 | 137.866 | (0.230 $\lambda$) |
| 6th LAYER | MgF$_2$ | 1.3855 | 104.424 | 144.679 | (0.241 $\lambda$) |
| 5th LAYER | Al$_2$O$_3$ | 1.6376 | 84.145 | 137.796 | (0.230 $\lambda$) |
| 4th LAYER | SUB-H4 | 2.0927 | 74.870 | 156.680 | (0.261 $\lambda$) |
| 3rd LAYER | Al$_2$O$_3$ | 1.6376 | 16.273 | 26.649 | (0.044 $\lambda$) |
| 2nd LAYER | SUB-H4 | 2.0927 | 35.419 | 74.121 | (0.124 $\lambda$) |
| 1st LAYER | MgF$_2$ | 1.3855 | 105.531 | 146.213 | (0.244 $\lambda$) |
| AIR | — | — | — | — | |

TABLE 6

EXAMPLE 1-4

|  | CONSTITUENT MATERIAL | REFRACTIVE INDEX N | PHISICAL THICKNESS d | CENTER WAVELENGTH $\lambda$ = 600 nm OPTICAL FILM THICKNESS INDEX N × d | |
|---|---|---|---|---|---|
| OPTICAL SUBSTRATE | S-TIH53 | 1.8467 | — | — | |
| 13th LAYER | Al$_2$O$_3$ | 1.6376 | 32.134 | 52.623 | (0.088 $\lambda$) |
| 12th LAYER | SUB-H4 | 2.0927 | 17.794 | 37.238 | (0.062 $\lambda$) |
| 11th LAYER | Al$_2$O$_3$ | 1.6376 | 67.441 | 110.441 | (0.184 $\lambda$) |
| 10th LAYER | SUB-H4 | 2.0927 | 23.661 | 49.515 | (0.083 $\lambda$) |
| 9th LAYER | Al$_2$O$_3$ | 1.6376 | 37.193 | 60.907 | (0.102 $\lambda$) |
| 8th LAYER | SUB-H4 | 2.0927 | 145.177 | 303.812 | (0.506 $\lambda$) |
| 7th LAYER | Al$_2$O$_3$ | 1.6376 | 84.133 | 137.776 | (0.230 $\lambda$) |
| 6th LAYER | MgF$_2$ | 1.3855 | 104.419 | 144.673 | (0.241 $\lambda$) |
| 5th LAYER | Al$_2$O$_3$ | 1.6376 | 83.869 | 137.344 | (0.229 $\lambda$) |
| 4th LAYER | SUB-H4 | 2.0927 | 75.899 | 158.834 | (0.265 $\lambda$) |
| 3rd LAYER | Al$_2$O$_3$ | 1.6376 | 15.945 | 26.112 | (0.044 $\lambda$) |
| 2nd LAYER | SUB-H4 | 2.0927 | 35.147 | 73.552 | (0.123 $\lambda$) |
| 1st LAYER | MgF$_2$ | 1.3855 | 105.346 | 145.957 | (0.243 $\lambda$) |
| AIR | — | — | — | — | |

TABLE 7

EXAMPLE 1-5

|  | CONSTITUENT MATERIAL | REFRACTIVE INDEX N | PHISICAL THICKNESS d | CENTER WAVELENGTH $\lambda$ = 600 nm OPTICAL FILM THICKNESS INDEX N × d | |
|---|---|---|---|---|---|
| OPTICAL SUBSTRATE | SFL6 | 1.8052 | — | — | |
| 13th LAYER | Al$_2$O$_3$ | 1.6376 | 36.834 | 60.319 | (0.101 $\lambda$) |
| 12th LAYER | SUB-H4 | 2.0927 | 13.488 | 28.226 | (0.047 $\lambda$) |
| 11th LAYER | Al$_2$O$_3$ | 1.6376 | 76.009 | 124.472 | (0.207 $\lambda$) |
| 10th LAYER | SUB-H4 | 2.0927 | 21.075 | 44.104 | (0.074 $\lambda$) |
| 9th LAYER | Al$_2$O$_3$ | 1.6376 | 37.882 | 62.036 | (0.103 $\lambda$) |
| 8th LAYER | SUB-H4 | 2.0927 | 143.869 | 301.075 | (0.502 $\lambda$) |
| 7th LAYER | Al$_2$O$_3$ | 1.6376 | 83.987 | 137.537 | (0.229 $\lambda$) |
| 6th LAYER | MgF$_2$ | 1.3855 | 104.522 | 144.815 | (0.241 $\lambda$) |
| 5th LAYER | Al$_2$O$_3$ | 1.6376 | 83.722 | 137.103 | (0.229 $\lambda$) |
| 4th LAYER | SUB-H4 | 2.0927 | 75.890 | 158.815 | (0.265 $\lambda$) |
| 3rd LAYER | Al$_2$O$_3$ | 1.6376 | 15.898 | 26.035 | (0.043 $\lambda$) |
| 2nd LAYER | SUB-H4 | 2.0927 | 35.158 | 73.575 | (0.123 $\lambda$) |
| 1st LAYER | MgF$_2$ | 1.3855 | 105.288 | 145.877 | (0.243 $\lambda$) |
| AIR | — | — | — | — | |

TABLE 8

EXAMPLE 1-6

|  | CONSTITUENT MATERIAL | REFRACTIVE INDEX N | PHISICAL THICKNESS d | CENTER WAVELENGTH λ = 600 nm OPTICAL FILM THICKNESS INDEX N × d | |
|---|---|---|---|---|---|
| OPTICAL SUBSTRATE | SF14 | 1.7618 | — | — | |
| 13th LAYER | Al$_2$O$_3$ | 1.6376 | 39.343 | 64.428 | (0.107 λ) |
| 12th LAYER | SUB-H4 | 2.0927 | 11.250 | 23.543 | (0.039 λ) |
| 11th LAYER | Al$_2$O$_3$ | 1.6376 | 76.342 | 125.018 | (0.208 λ) |
| 10th LAYER | SUB-H4 | 2.0927 | 21.121 | 44.200 | (0.074 λ) |
| 9th LAYER | Al$_2$O$_3$ | 1.6376 | 36.944 | 60.499 | (0.101 λ) |
| 8th LAYER | SUB-H4 | 2.0927 | 144.071 | 301.497 | (0.502 λ) |
| 7th LAYER | Al$_2$O$_3$ | 1.6376 | 83.894 | 137.385 | (0.229 λ) |
| 6th LAYER | MgF$_2$ | 1.3855 | 104.707 | 145.072 | (0.242 λ) |
| 5th LAYER | Al$_2$O$_3$ | 1.6376 | 83.606 | 136.913 | (0.228 λ) |
| 4th LAYER | SUB-H4 | 2.0927 | 76.428 | 159.941 | (0.267 λ) |
| 3rd LAYER | Al$_2$O$_3$ | 1.6376 | 15.858 | 25.969 | (0.043 λ) |
| 2nd LAYER | SUB-H4 | 2.0927 | 34.966 | 73.173 | (0.122 λ) |
| 1st LAYER | MgF$_2$ | 1.3855 | 105.207 | 145.764 | (0.243 λ) |
| AIR | — | — | — | — | |

TABLE 9

EXAMPLE 1-7

|  | CONSTITUENT MATERIAL | REFRACTIVE INDEX N | PHISICAL THICKNESS d | CENTER WAVELENGTH λ = 600 nm OPTICAL FILM THICKNESS INDEX N × d | |
|---|---|---|---|---|---|
| OPTICAL SUBSTRATE | S-TIH1 | 1.7174 | — | — | |
| 13th LAYER | Al$_2$O$_3$ | 1.6376 | 37.962 | 62.167 | (0.104 λ) |
| 12th LAYER | SUB-H4 | 2.0927 | 11.250 | 23.543 | (0.039 λ) |
| 11th LAYER | Al$_2$O$_3$ | 1.6376 | 69.000 | 112.994 | (0.188 λ) |
| 10th LAYER | SUB-H4 | 2.0927 | 23.575 | 49.335 | (0.082 λ) |
| 9th LAYER | Al$_2$O$_3$ | 1.6376 | 34.877 | 57.115 | (0.095 λ) |
| 8th LAYER | SUB-H4 | 2.0927 | 146.288 | 306.137 | (0.510 λ) |
| 7th LAYER | Al$_2$O$_3$ | 1.6376 | 84.162 | 137.824 | (0.230 λ) |
| 6th LAYER | MgF$_2$ | 1.3855 | 107.013 | 148.287 | (0.247 λ) |
| 5th LAYER | Al$_2$O$_3$ | 1.6376 | 82.925 | 135.798 | (0.226 λ) |
| 4th LAYER | SUB-H4 | 2.0927 | 75.602 | 158.212 | (0.264 λ) |
| 3rd LAYER | Al$_2$O$_3$ | 1.6376 | 16.204 | 26.536 | (0.044 λ) |
| 2nd LAYER | SUB-H4 | 2.0927 | 35.338 | 73.952 | (0.123 λ) |
| 1st LAYER | MgF$_2$ | 1.3855 | 105.512 | 146.187 | (0.244 λ) |
| AIR | — | — | — | — | |

Tables 3 to 9 show constituent material for layers, refractive indices N at the d-line, physical thicknesses d (unit: nm) and optical film thicknesses N×d (unit: nm). Examples 1-1 to 1-7 have the same configuration, except that the constituent materials of the optical substrates are different from each other. "SUB-H4" in the column of constituent material is a substance H4 (Merck & Co., Inc.) including LaTiO$_3$ as a main component. All the center wavelengths λ0 shown in the column of optical film thickness N×d are 600 nm. As is obvious from the respective tables, the refractive indices N and the optical film thicknesses N×d of the first to eighth layers corresponding to a reflection reducing layer satisfy all the above-described conditional expressions (1) to (8). Regarding the ninth to thirteenth layers corresponding to a buffer layer, the ninth layer coming into contact with the reflection reducing layer is made of an intermediate-refractive index material in all the examples.

In FIGS. 14A, 15A, 16A, 17A, 18A, 19A and 20A, a vertical axis indicates a reflectance (%) for normal incident light and a horizontal axis indicates a wavelength λ (nm) upon measurement. As is obvious from the respective drawings, a reflectance is lower than 0.4% in a wavelength band of about 400 to 900 nm and excellent reflection characteristics are obtained. In FIGS. 14B, 15B, 16B, 17B, 18B, 19B and 20B, a vertical axis indicates a reflectance (%) for 45° incident light and a horizontal axis indicates a wavelength λ (nm) upon measurement. As is obvious from the respective drawings, a reflectance is lower than 2.0% in a wavelength band of about 400 to 900 nm and thus excellent reflection characteristics are obtained even for oblique incident light. Furthermore, since the buffer layer includes the ninth layer made of the intermediate-refractive index material and provided so as to come into contact with the eighth layer of the reflection reducing layer, the buffer layer excellently maintains the adhesion to the optical substrate and the reflection reducing layer and a high peeling strength ensured is confirmed.

Second Numerical Examples

Figure 21A:
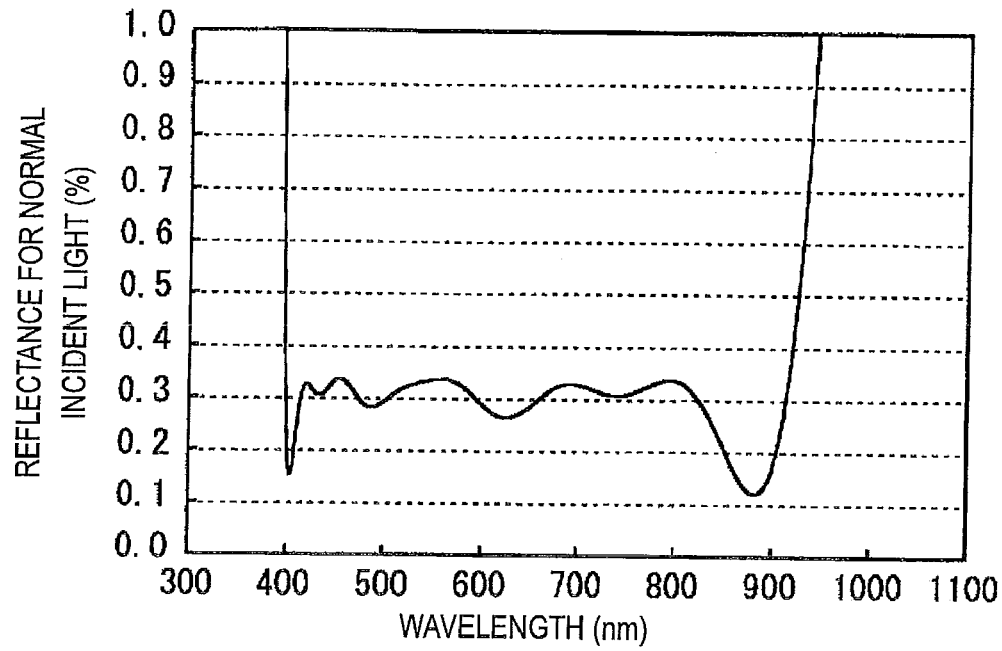
FIGS. 21A and 21B are reflectance distribution graphs of Example 2-1 corresponding to the reflection reducing film shown in FIG. 2.
Figure 21B:
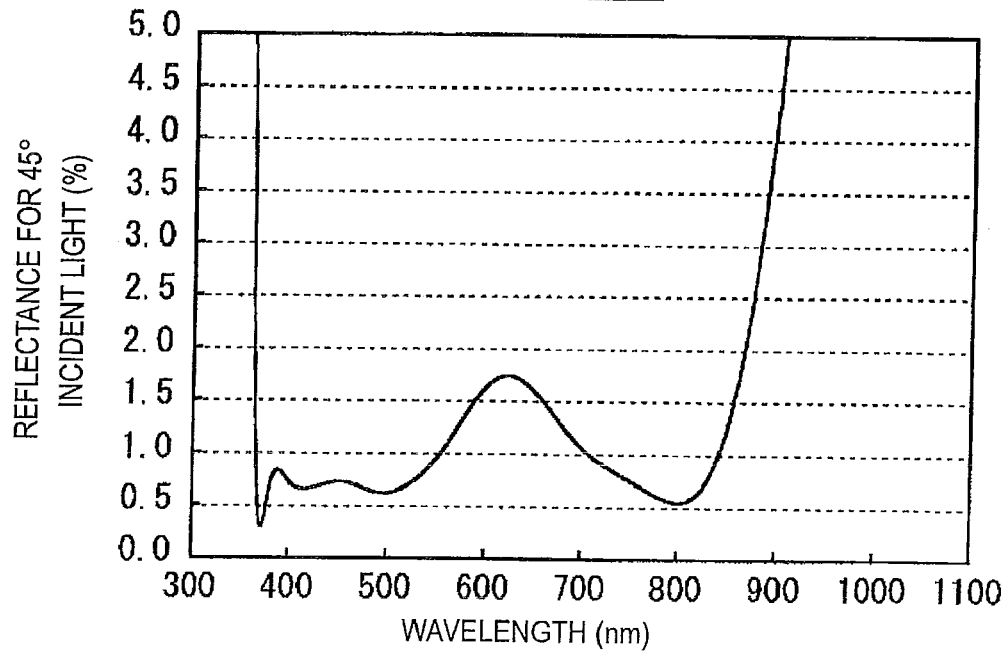
Figure 22A:
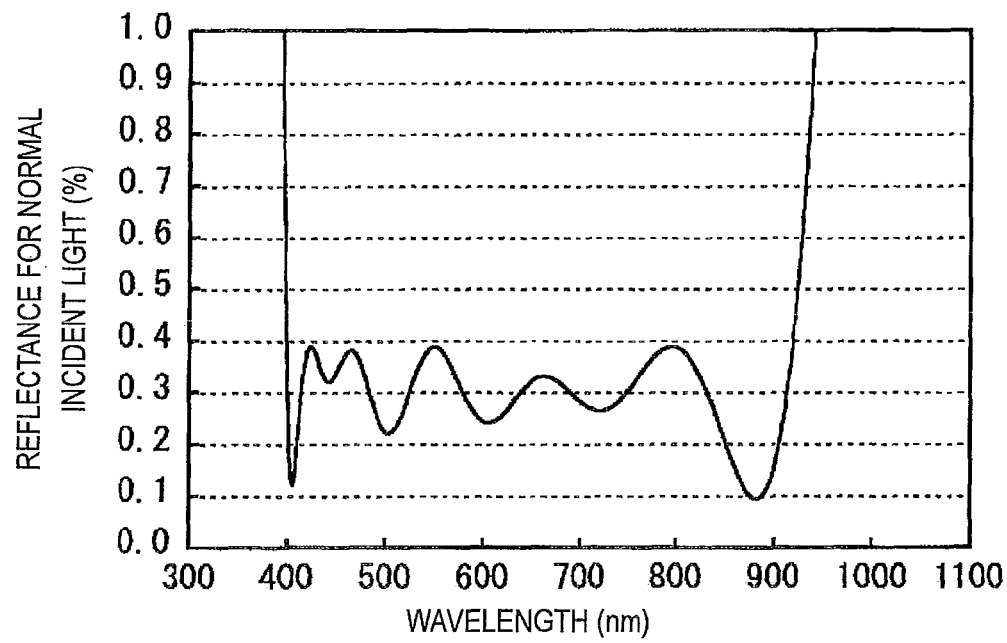
FIGS. 22A and 22B are reflectance distribution graphs of Example 2-2 corresponding to the reflection reducing film shown in FIG. 2.
Figure 22B:
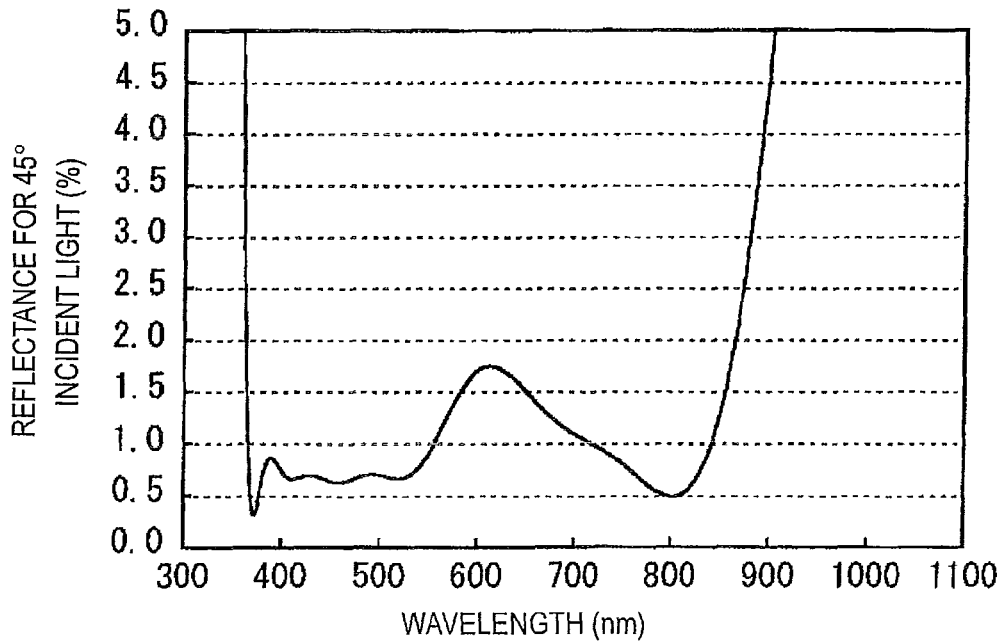
Figure 23A:
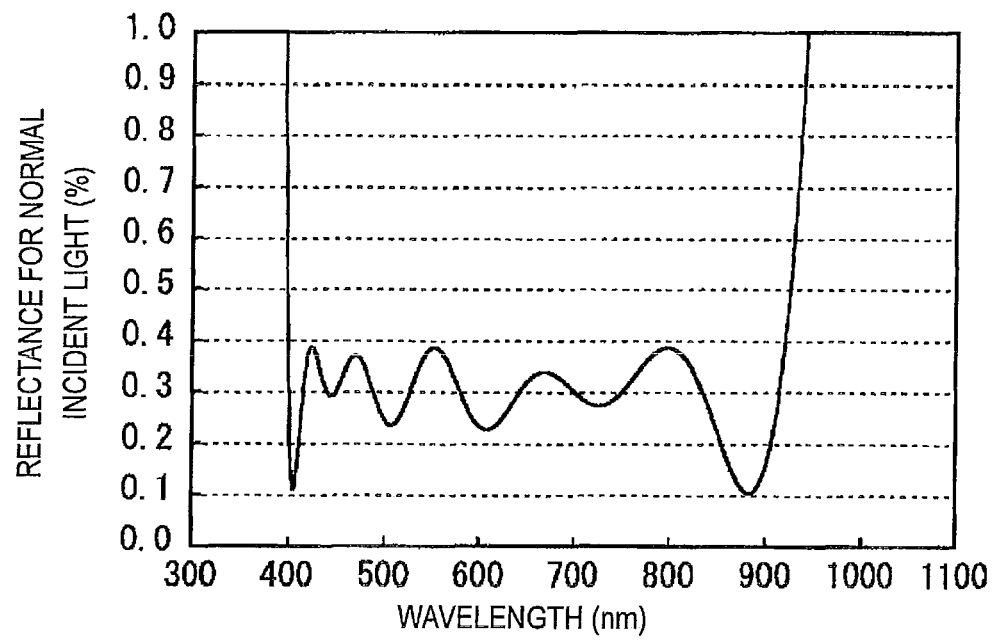
FIGS. 23A and 23B are reflectance distribution graphs of Example 2-3 corresponding to the reflection reducing film shown in FIG. 2.
Figure 23B:
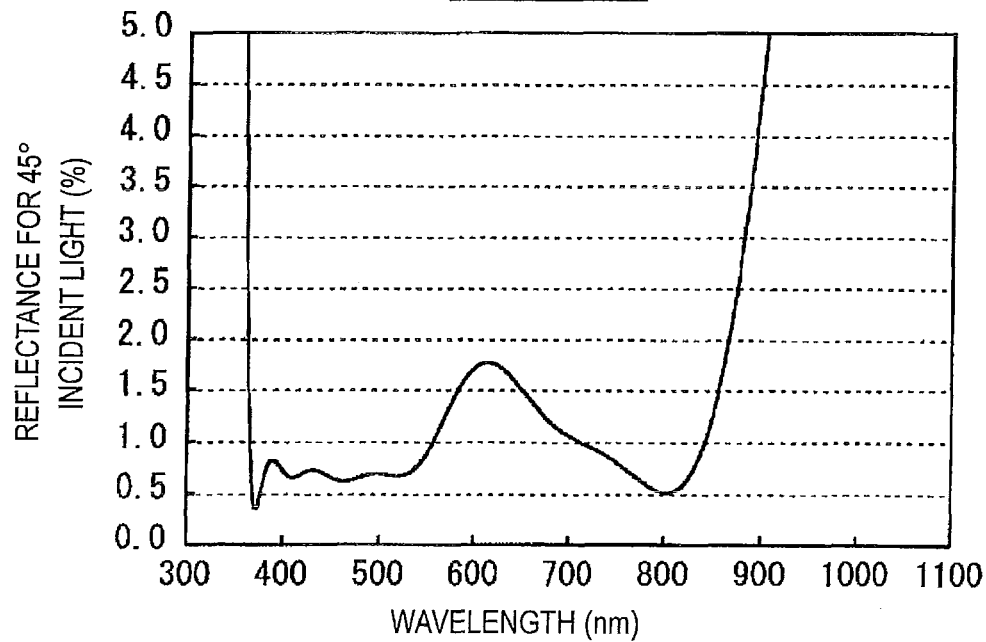
Figure 24A:
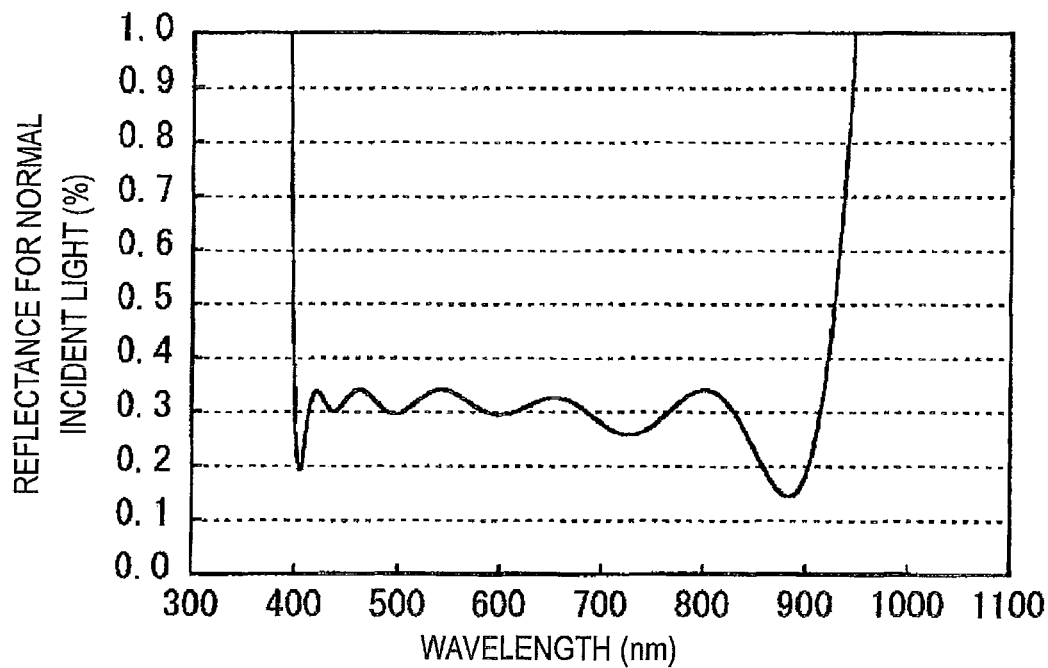
FIGS. 24A and 24B are reflectance distribution graphs of Example 3-1 corresponding to the reflection reducing film shown in FIG. 3.
Figure 24B:
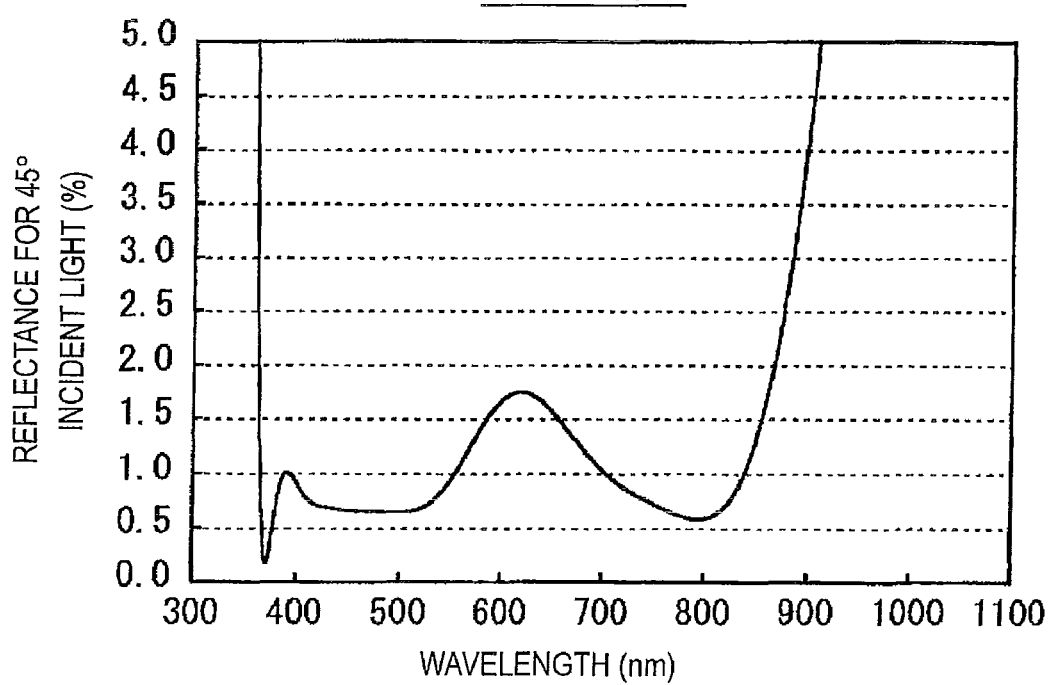
Figure 25A:
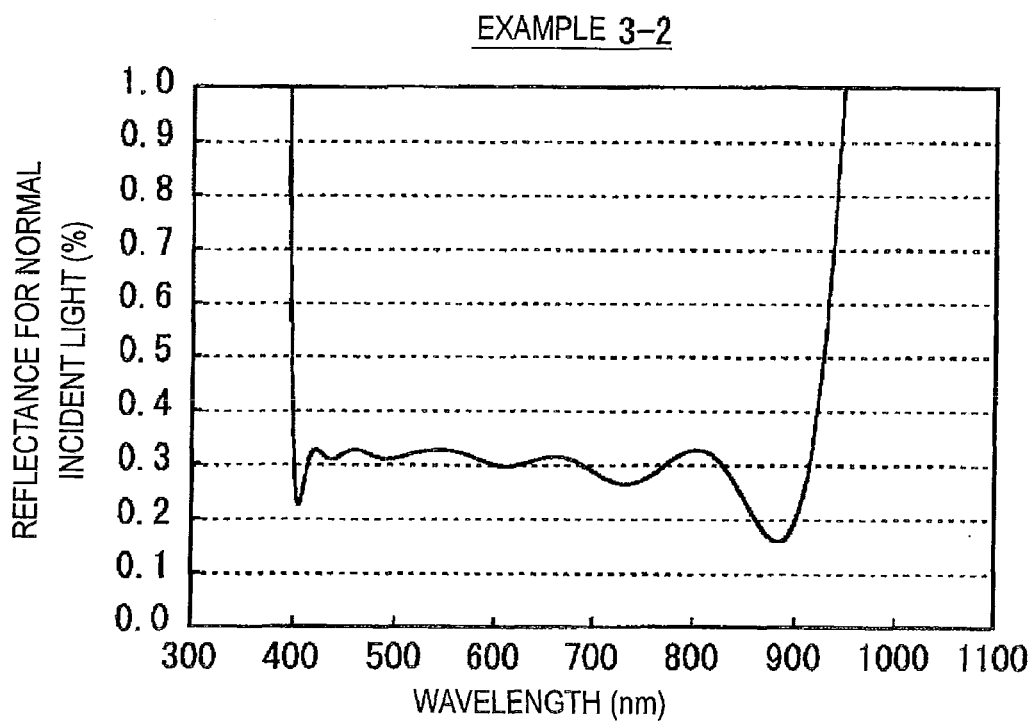
FIGS. 25A and 25B are reflectance distribution graphs of Example 3-2 corresponding to the reflection reducing film shown in FIG. 3.
Figure 25B:
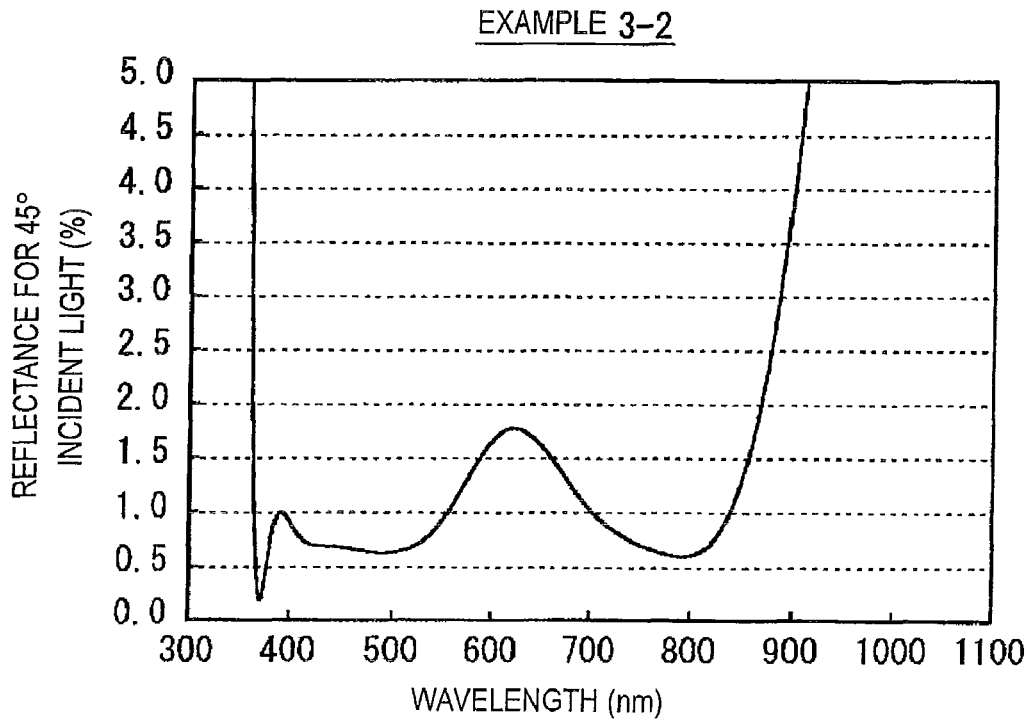
Figure 26A:
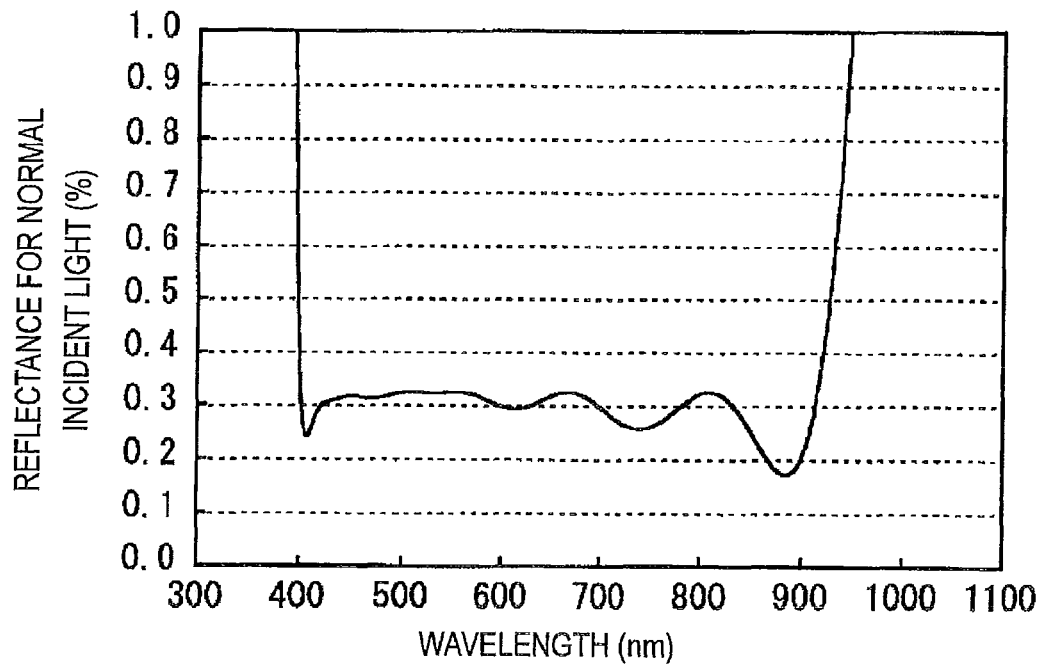
FIGS. 26A and 26B are reflectance distribution graphs of Example 3-3 corresponding to the reflection reducing film shown in FIG. 3.
Figure 26B:
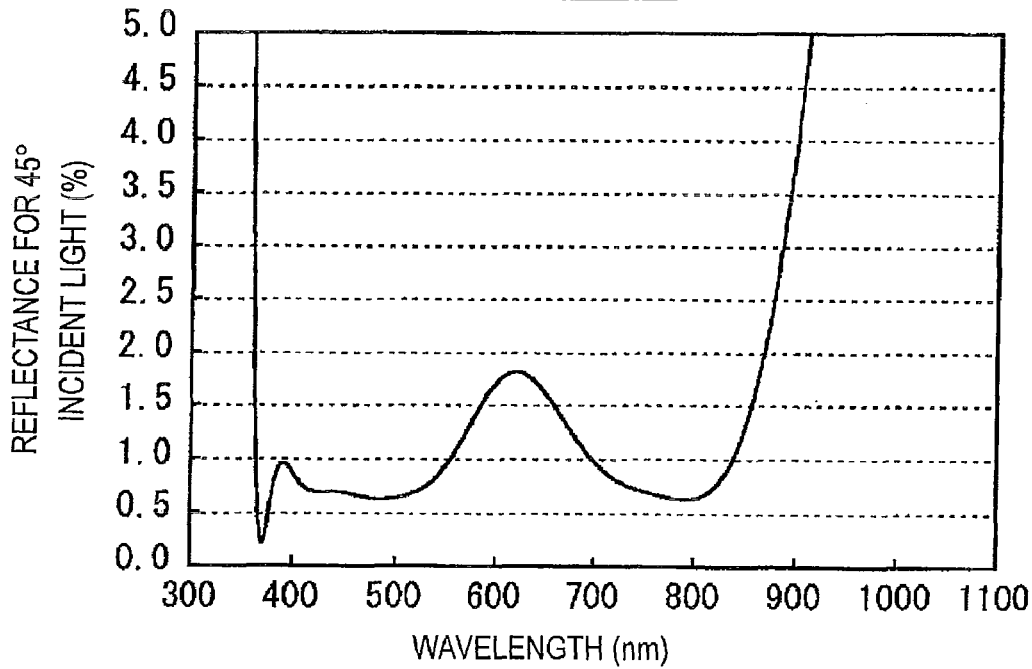
Figure 27A:
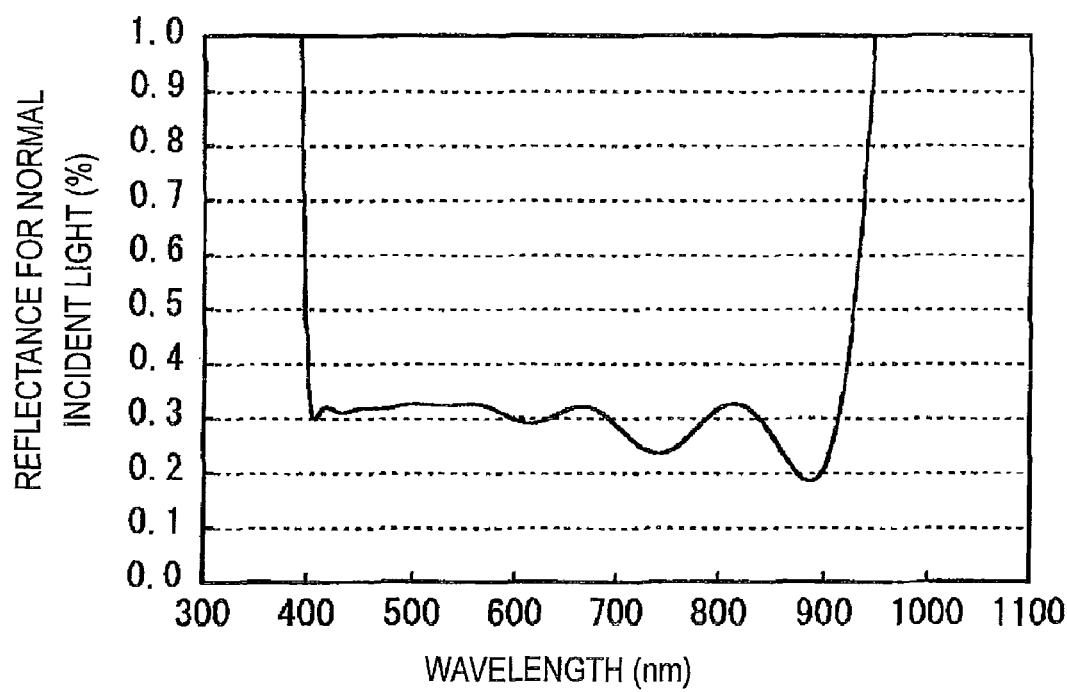
FIGS. 27A and 27B are reflectance distribution graphs of Example 3-4 corresponding to the reflection reducing film shown in FIG. 3.
Figure 27B:
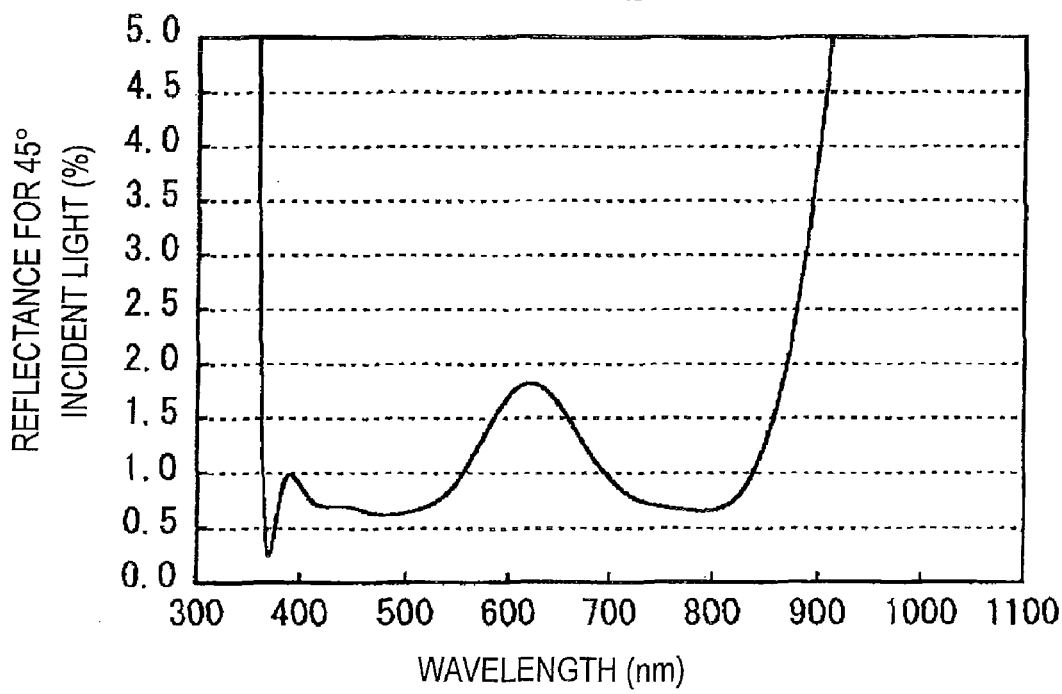

Second numerical examples (Examples 2-1 to 2-3) are shown in Tables 10 to 12 and FIGS. 21A to 23B. Herein, Tables 10 to 12 show basic data of Examples 2-1 to 2-3 corresponding to the reflection reducing film 30 shown in FIG. 2. FIGS. 21A to 23B show reflectance distributions of Examples 2-1 to 2-3. Among them, FIGS. 21A, 22A and 23A show the reflectance distributions of normal incident light of the examples, and FIGS. 21B, 22B and 23B show the reflectance distributions of oblique incident light (45° incident light) of the examples.

TABLE 10

EXAMPLE 2-1

CENTER WAVELENGTH λ = 600 nm

|  | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | BASF-2 | 1.6645 | — | — | |
| 11th LAYER | Al$_2$O$_3$ | 1.6376 | 180.000 | 294.768 | (0.491 λ) |
| 10th LAYER | SUB-H4 | 2.0927 | 16.275 | 34.059 | (0.057 λ) |
| 9th LAYER | Al$_2$O$_3$ | 1.6376 | 33.786 | 55.328 | (0.092 λ) |
| 8th LAYER | SUB-H4 | 2.0927 | 139.097 | 291.088 | (0.485 λ) |
| 7th LAYER | Al$_2$O$_3$ | 1.6376 | 83.770 | 137.182 | (0.229 λ) |
| 6th LAYER | MgF$_2$ | 1.3855 | 101.615 | 140.788 | (0.235 λ) |
| 5th LAYER | Al$_2$O$_3$ | 1.6376 | 83.945 | 137.468 | (0.229 λ) |
| 4th LAYER | SUB-H4 | 2.0927 | 76.226 | 159.518 | (0.266 λ) |
| 3rd LAYER | Al$_2$O$_3$ | 1.6376 | 15.719 | 25.741 | (0.043 λ) |
| 2nd LAYER | SUB-H4 | 2.0927 | 34.950 | 73.140 | (0.122 λ) |
| 1st LAYER | MgF$_2$ | 1.3855 | 104.954 | 145.414 | (0.242 λ) |
| AIR | — | — | — | — | |

TABLE 11

EXAMPLE 2-2

CENTER WAVELENGTH λ = 600 nm

|  | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | F-3 | 1.6129 | — | — | |
| 11th LAYER | Al$_2$O$_3$ | 1.6376 | 71.632 | 117.305 | (0.196 λ) |
| 10th LAYER | SUB-H4 | 2.0927 | 15.604 | 32.654 | (0.054 λ) |
| 9th LAYER | Al$_2$O$_3$ | 1.6376 | 32.150 | 52.649 | (0.088 λ) |
| 8th LAYER | SUB-H4 | 2.0927 | 137.363 | 287.460 | (0.479 λ) |
| 7th LAYER | Al$_2$O$_3$ | 1.6376 | 83.553 | 136.826 | (0.228 λ) |
| 6th LAYER | MgF$_2$ | 1.3855 | 102.687 | 142.273 | (0.237 λ) |
| 5th LAYER | Al$_2$O$_3$ | 1.6376 | 83.287 | 136.391 | (0.227 λ) |
| 4th LAYER | SUB-H4 | 2.0927 | 76.999 | 161.136 | (0.269 λ) |
| 3rd LAYER | Al$_2$O$_3$ | 1.6376 | 15.223 | 24.929 | (0.042 λ) |
| 2nd LAYER | SUB-H4 | 2.0927 | 34.902 | 73.039 | (0.122 λ) |
| 1st LAYER | MgF$_2$ | 1.3855 | 104.883 | 145.315 | (0.242 λ) |
| AIR | — | — | — | — | |

TABLE 12

EXAMPLE 2-3

CENTER WAVELENGTH λ = 600 nm

|  | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | LF1 | 1.5731 | — | — | |
| 11th LAYER | Al$_2$O$_3$ | 1.6376 | 61.577 | 100.838 | (0.168 λ) |
| 10th LAYER | SUB-H4 | 2.0927 | 13.586 | 28.431 | (0.047 λ) |
| 9th LAYER | Al$_2$O$_3$ | 1.6376 | 29.806 | 48.810 | (0.081 λ) |
| 8th LAYER | SUB-H4 | 2.0927 | 134.331 | 281.114 | (0.469 λ) |
| 7th LAYER | Al$_2$O$_3$ | 1.6376 | 83.343 | 136.482 | (0.227 λ) |
| 6th LAYER | MgF$_2$ | 1.3855 | 100.888 | 139.780 | (0.233 λ) |
| 5th LAYER | Al$_2$O$_3$ | 1.6376 | 83.843 | 137.301 | (0.229 λ) |
| 4th LAYER | SUB-H4 | 2.0927 | 76.115 | 159.286 | (0.265 λ) |
| 3rd LAYER | Al$_2$O$_3$ | 1.6376 | 15.422 | 25.255 | (0.042 λ) |
| 2nd LAYER | SUB-H4 | 2.0927 | 35.090 | 73.433 | (0.122 λ) |
| 1st LAYER | MgF$_2$ | 1.3855 | 104.766 | 145.153 | (0.242 λ) |
| AIR | — | — | — | — | |

Tables 10 to 12 show the same items as in the above Tables 3 to 9. Examples 2-1 to 2-3 have the same configuration, except that the constituent materials of the optical substrates are different from each other. As is obvious from the respective tables, the refractive indices N and the optical film thicknesses N×d of the first to eighth layers corresponding to a reflection reducing layer satisfy all the above-described conditional expressions (1) to (8). Regarding the ninth to eleventh layers corresponding to a buffer layer, the ninth layer coming into contact with the reflection reducing layer is made of an intermediate-refractive index material in all the examples.

In FIGS. 21A, 22A and 23A, a vertical axis indicates a reflectance (%) for normal incident light and a horizontal axis indicates a wavelength λ (nm) upon measurement. As is obvious from the respective drawings, a reflectance is lower than 0.4% in a wavelength band of about 400 to 900 nm and excellent reflection characteristics are obtained. In FIGS. 21B, 22B and 23B, a vertical axis indicates a reflectance (%) for 45° incident light and a horizontal axis indicates a wavelength λ (nm) upon measurement. As is obvious from the respective drawings, a reflectance is lower than 2.0% in a wavelength band of about 400 to 900 nm and thus excellent reflection characteristics are obtained even for oblique incident light. Furthermore, since the buffer layer includes the ninth layer made of the intermediate-refractive index material and provided so as to come into contact with the eighth layer of the reflection reducing layer, the buffer layer excellently maintains the adhesion to the optical substrate and the reflection reducing layer and a high peeling strength ensured is confirmed.

Third Numerical Examples

Third numerical examples (Examples 3-1 to 3-4) are shown in Tables 13 to 16 and FIGS. 24A to 27B. Herein, Tables 13 to 16 show basic data of Examples 3-1 to 3-4 corresponding to the reflection reducing film 40 shown in FIG. 3. FIGS. 24A to 27B show reflectance distributions of Examples 3-1 to 3-4. Among them, FIGS. 24A, 25A, 26A and 27A show the reflectance distributions of normal incident light of the examples, and FIGS. 24B, 25B, 26B and 27B show the reflectance distributions of oblique incident light (45° incident light) of the examples.

TABLE 13

EXAMPLE 3-1

| | CONSTITUENT MATERIAL | REFRACTIVE INDEX N | PHISICAL THICKNESS d | CENTER WAVELENGTH λ = 600 nm OPTICAL FILM THICKNESS INDEX N × d | |
|---|---|---|---|---|---|
| OPTICAL SUBSTRATE | BK-7 | 1.5163 | — | — | |
| 12th LAYER | $Al_2O_3$ | 1.6376 | 35.792 | 58.613 | (0.098 λ) |
| 11th LAYER | $MgF_2$ | 1.3855 | 32.858 | 45.525 | (0.076 λ) |
| 10th LAYER | SUB-H4 | 2.0927 | 19.772 | 41.377 | (0.069 λ) |
| 9th LAYER | $Al_2O_3$ | 1.6376 | 43.253 | 70.831 | (0.118 λ) |
| 8th LAYER | SUB-H4 | 2.0927 | 138.155 | 289.117 | (0.482 λ) |
| 7th LAYER | $Al_2O_3$ | 1.6376 | 82.859 | 135.690 | (0.226 λ) |
| 6th LAYER | $MgF_2$ | 1.3855 | 105.878 | 146.694 | (0.244 λ) |
| 5th LAYER | $Al_2O_3$ | 1.6376 | 82.534 | 135.158 | (0.225 λ) |
| 4th LAYER | SUB-H4 | 2.0927 | 77.579 | 162.350 | (0.271 λ) |
| 3rd LAYER | $Al_2O_3$ | 1.6376 | 15.395 | 25.211 | (0.042 λ) |
| 2nd LAYER | SUB-H4 | 2.0927 | 34.399 | 71.987 | (0.120 λ) |
| 1st LAYER | $MgF_2$ | 1.3855 | 104.916 | 145.361 | (0.242 λ) |
| AIR | — | — | — | — | |

TABLE 14

EXAMPLE 3-2

| | CONSTITUENT MATERIAL | REFRACTIVE INDEX N | PHISICAL THICKNESS d | CENTER WAVELENGTH λ = 600 nm OPTICAL FILM THICKNESS INDEX N × d | |
|---|---|---|---|---|---|
| OPTICAL SUBSTRATE | FK-5 | 1.4875 | — | — | |
| 12th LAYER | $Al_2O_3$ | 1.6376 | 31.191 | 51.078 | (0.085 λ) |
| 11th LAYER | $MgF_2$ | 1.3855 | 36.945 | 51.187 | (0.085 λ) |
| 10th LAYER | SUB-H4 | 2.0927 | 18.700 | 39.133 | (0.065 λ) |
| 9th LAYER | $Al_2O_3$ | 1.6376 | 44.484 | 72.847 | (0.121 λ) |
| 8th LAYER | SUB-H4 | 2.0927 | 137.023 | 286.748 | (0.478 λ) |
| 7th LAYER | $Al_2O_3$ | 1.6376 | 82.159 | 134.544 | (0.224 λ) |
| 6th LAYER | $MgF_2$ | 1.3855 | 107.327 | 148.702 | (0.248 λ) |
| 5th LAYER | $Al_2O_3$ | 1.6376 | 81.802 | 133.959 | (0.223 λ) |
| 4th LAYER | SUB-H4 | 2.0927 | 78.849 | 165.007 | (0.275 λ) |
| 3rd LAYER | $Al_2O_3$ | 1.6376 | 15.003 | 24.569 | (0.041 λ) |
| 2nd LAYER | SUB-H4 | 2.0927 | 33.939 | 71.024 | (0.118 λ) |
| 1st LAYER | $MgF_2$ | 1.3855 | 104.642 | 144.981 | (0.242 λ) |
| AIR | — | — | — | — | |

TABLE 15

EXAMPLE 3-3

CENTER WAVELENGTH λ = 600 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | SiO₂ | 1.4585 | — | — | |
| 12th LAYER | Al₂O₃ | 1.6376 | 26.468 | 43.344 | (0.072 λ) |
| 11th LAYER | MgF₂ | 1.3855 | 40.800 | 56.528 | (0.094 λ) |
| 10th LAYER | SUB-H4 | 2.0927 | 17.236 | 36.070 | (0.060 λ) |
| 9th LAYER | Al₂O₃ | 1.6376 | 45.390 | 74.331 | (0.124 λ) |
| 8th LAYER | SUB-H4 | 2.0927 | 135.245 | 283.027 | (0.472 λ) |
| 7th LAYER | Al₂O₃ | 1.6376 | 81.662 | 133.730 | (0.223 λ) |
| 6th LAYER | MgF₂ | 1.3855 | 106.990 | 148.235 | (0.247 λ) |
| 5th LAYER | Al₂O₃ | 1.6376 | 81.550 | 133.546 | (0.223 λ) |
| 4th LAYER | SUB-H4 | 2.0927 | 78.697 | 164.689 | (0.274 λ) |
| 3rd LAYER | Al₂O₃ | 1.6376 | 15.011 | 24.582 | (0.041 λ) |
| 2nd LAYER | SUB-H4 | 2.0927 | 33.793 | 70.719 | (0.118 λ) |
| 1st LAYER | MgF₂ | 1.3855 | 104.360 | 144.591 | (0.241 λ) |
| AIR | — | — | — | — | |

TABLE 16

EXAMPLE 3-4

CENTER WAVELENGTH λ = 600 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | CaF₂ | 1.4339 | — | — | |
| 12th LAYER | Al₂O₃ | 1.6376 | 23.045 | 37.738 | (0.063 λ) |
| 11th LAYER | MgF₂ | 1.3855 | 45.600 | 63.179 | (0.105 λ) |
| 10th LAYER | SUB-H4 | 2.0927 | 16.080 | 33.651 | (0.056 λ) |
| 9th LAYER | Al₂O₃ | 1.6376 | 47.182 | 77.265 | (0.129 λ) |
| 8th LAYER | SUB-H4 | 2.0927 | 134.402 | 281.263 | (0.469 λ) |
| 7th LAYER | Al₂O₃ | 1.6376 | 81.030 | 132.695 | (0.221 λ) |
| 6th LAYER | MgF₂ | 1.3855 | 108.961 | 150.965 | (0.252 λ) |
| 5th LAYER | Al₂O₃ | 1.6376 | 80.973 | 132.601 | (0.221 λ) |
| 4th LAYER | SUB-H4 | 2.0927 | 78.006 | 163.243 | (0.272 λ) |
| 3rd LAYER | Al₂O₃ | 1.6376 | 15.048 | 24.643 | (0.041 λ) |
| 2nd LAYER | SUB-H4 | 2.0927 | 33.975 | 71.099 | (0.118 λ) |
| 1st LAYER | MgF₂ | 1.3855 | 104.538 | 144.837 | (0.241 λ) |
| AIR | — | — | — | — | |

Tables 13 to 16 show the same items as in the above Tables 3 to 9. Examples 3-1 to 3-4 have the same configuration, except that the constituent materials of the optical substrates are different from each other. As is obvious from the respective tables, the refractive indices N and the optical film thicknesses N×d of the first to eighth layers corresponding to a reflection reducing layer satisfy all the above-described conditional expressions (1) to (8). Regarding the ninth to twelfth layers corresponding to a buffer layer, the ninth layer coming into contact with the reflection reducing layer is made of an intermediate-refractive index material in all the examples.

In FIGS. 24A, 25A, 26A and 27A a vertical axis indicates a reflectance (%) for normal incident light and a horizontal axis indicates a wavelength λ (nm) upon measurement. As is obvious from the respective drawings, a reflectance is lower than 0.4% in a wavelength band of about 400 to 900 nm and excellent reflection characteristics are obtained. In FIGS. 24B, 25B, 26B and 27B, a vertical axis indicates a reflectance (%) for 45° incident light and a horizontal axis indicates a wavelength λ (nm) upon measurement. As is obvious from the respective drawings, a reflectance is lower than 2.0% in a wavelength band of about 400 to 900 nm and thus excellent reflection characteristics are obtained even for oblique incident light. Furthermore, since the buffer layer includes the ninth layer made of the intermediate-refractive index material and provided so as to come into contact with the eighth layer of the reflection reducing layer, the buffer layer excellently maintains the adhesion to the optical substrate and the reflection reducing layer and a high peeling strength ensured is confirmed.

Fourth Numerical Examples

Figure 28A:
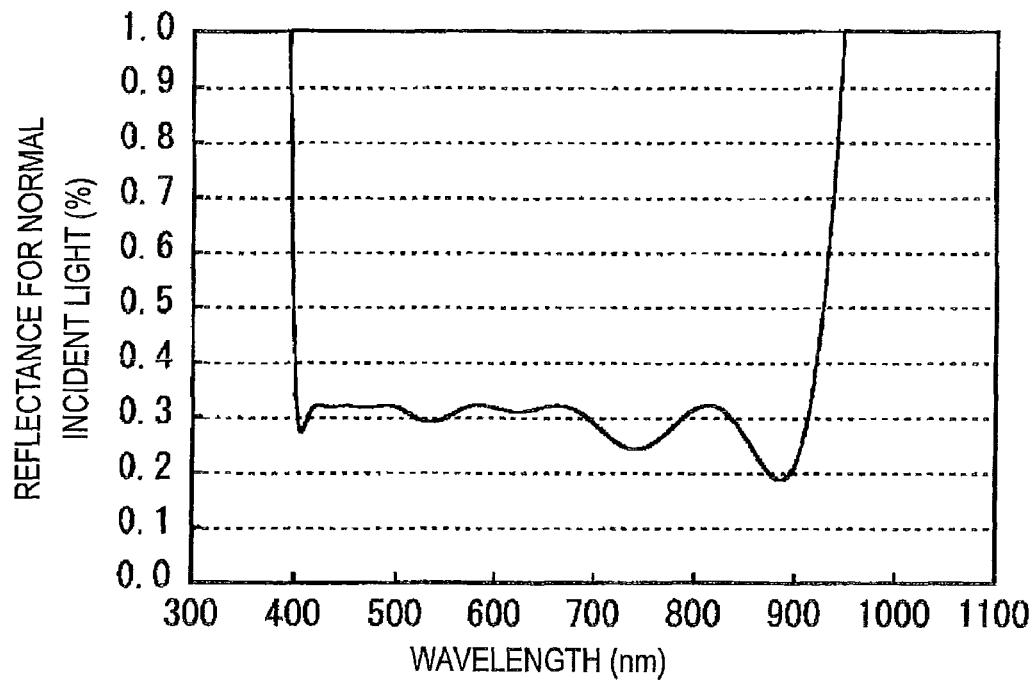
FIGS. 28A and 28B are reflectance distribution graphs of Example 4-1 corresponding to the reflection reducing film shown in FIG. 4.
Figure 28B:
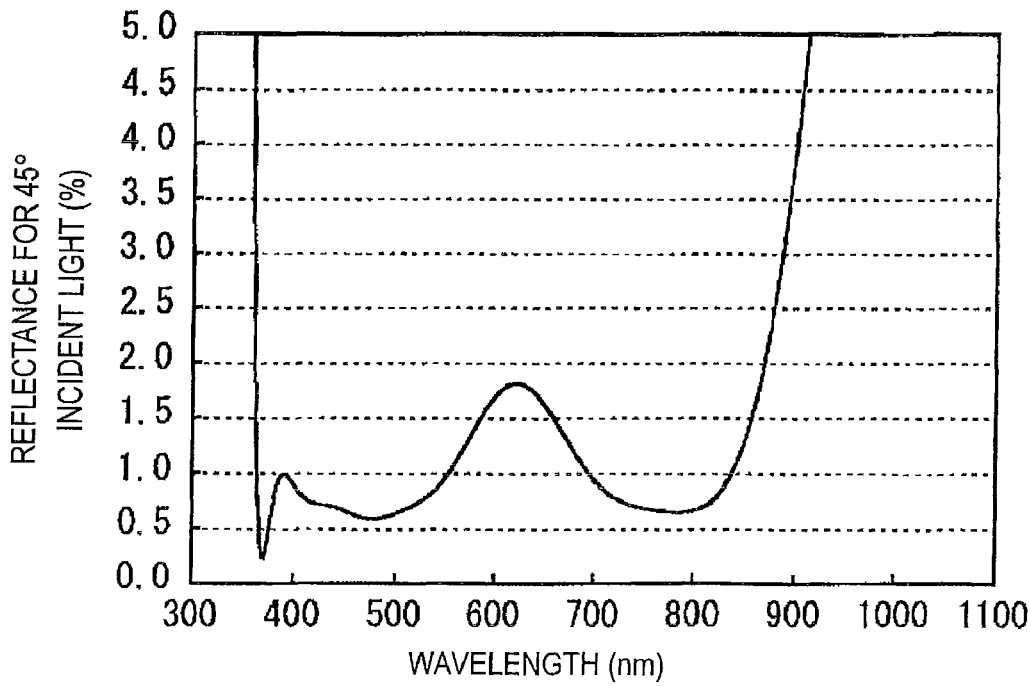

Fourth numerical example (Examples 4-1) is shown in Table 17 and FIGS. 28A and 28B. Herein, Table 17 shows basic data of Example 4-1 corresponding to the reflection reducing film 40A shown in FIG. 4. FIGS. 28A and 28B shows reflectance distributions of Example 4-1. Among them, FIG. 28A shows the reflectance distributions of normal incident light of the examples; and FIG. 28B shows the reflectance distributions of oblique incident light (45° incident light) of the examples.

TABLE 17

EXAMPLE 4-1

| | CONSTITUENT MATERIAL | REFRACTIVE INDEX N | PHISICAL THICKNESS d | CENTER WAVELENGTH λ = 600 nm OPTICAL FILM THICKNESS INDEX N × d | |
|---|---|---|---|---|---|
| OPTICAL SUBSTRATE | CaF$_2$ | 1.4339 | — | — | |
| 12th LAYER | Y$_2$O$_3$ | 1.8098 | 12.375 | 22.396 | (0.037 λ) |
| 11th LAYER | MgF$_2$ | 1.3855 | 50.400 | 69.829 | (0.116 λ) |
| 10th LAYER | SUB-H4 | 2.0927 | 16.101 | 33.695 | (0.056 λ) |
| 9th LAYER | Al$_2$O$_3$ | 1.6376 | 47.268 | 77.406 | (0.129 λ) |
| 8th LAYER | SUB-H4 | 2.0927 | 134.740 | 281.970 | (0.470 λ) |
| 7th LAYER | Al$_2$O$_3$ | 1.6376 | 82.100 | 134.447 | (0.224 λ) |
| 6th LAYER | MgF$_2$ | 1.3855 | 105.916 | 146.747 | (0.245 λ) |
| 5th LAYER | Al$_2$O$_3$ | 1.6376 | 81.684 | 133.766 | (0.223 λ) |
| 4th LAYER | SUB-H4 | 2.0927 | 78.556 | 164.394 | (0.274 λ) |
| 3rd LAYER | Al$_2$O$_3$ | 1.6376 | 14.935 | 24.458 | (0.041 λ) |
| 2nd LAYER | SUB-H4 | 2.0927 | 34.017 | 71.187 | (0.119 λ) |
| 1st LAYER | MgF$_2$ | 1.3855 | 104.500 | 144.785 | (0.241 λ) |
| AIR | — | — | — | — | |

Table 17 shows the same items as in the above Tables 3 to 9. Example 4-1 has the same configuration, except that the constituent materials of the optical substrates are different from each other. As is obvious from the Table 17, the refractive indices N and the optical film thicknesses N×d of the first to eighth layers corresponding to a reflection reducing layer satisfy all the above-described conditional expressions (1) to (8). Regarding the ninth to twelfth layers corresponding to a buffer layer, the ninth layer coming into contact with the reflection reducing layer is made of an intermediate-refractive index material in all the examples.

In FIG. 28A a vertical axis indicates a reflectance (%) for normal incident light and a horizontal axis indicates a wavelength λ (nm) upon measurement. As is obvious from the drawing, a reflectance is lower than 0.4% in a wavelength band of about 400 to 900 nm and excellent reflection characteristics are obtained. In FIG. 28B, a vertical axis indicates a reflectance (%) for 45° incident light and a horizontal axis indicates a wavelength λ (nm) upon measurement. As is obvious from the drawing, a reflectance is lower than 2.0% in a wavelength band of about 400 to 900 nm and thus excellent reflection characteristics are obtained even for oblique incident light. Furthermore, since the buffer layer includes the ninth layer made of the intermediate-refractive index material and provided so as to come into contact with the eighth layer of the reflection reducing layer, the buffer layer excellently maintains the adhesion to the optical substrate and the reflection reducing layer and a high peeling strength ensured is confirmed.

As is obvious from the above basic data and reflectance distribution graphs, in Examples 1-1 to 4-1, stable low reflectance distribution is achieved from a visible region to a near-infrared region. That is, according to the reflection reducing film of the invention, it was confirmed that a reflectance was sufficiently reduced in a wavelength band wider than in conventional cases and distribution of the reflectance can be made sufficiently uniform.

In the embodiments, the multilayer structure in which the buffer layer is composed of the plural layers has been described, but the invention is not limited to this. That is, in the invention, a single-layer structure in which the buffer layer is made of the intermediate-refractive index material may be employed.

Fifth Numerical Examples

Figure 29A:
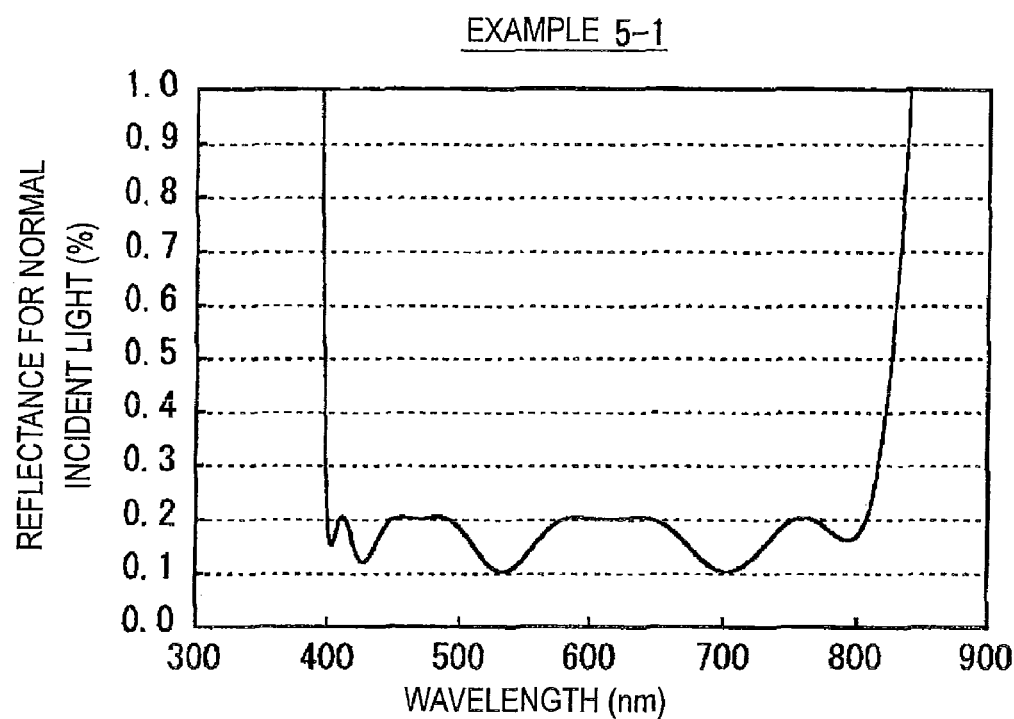
FIGS. 29A and 29B are reflectance distribution graphs of Example 5-1 corresponding to the reflection reducing film shown in FIG. 5.
Figure 29B:
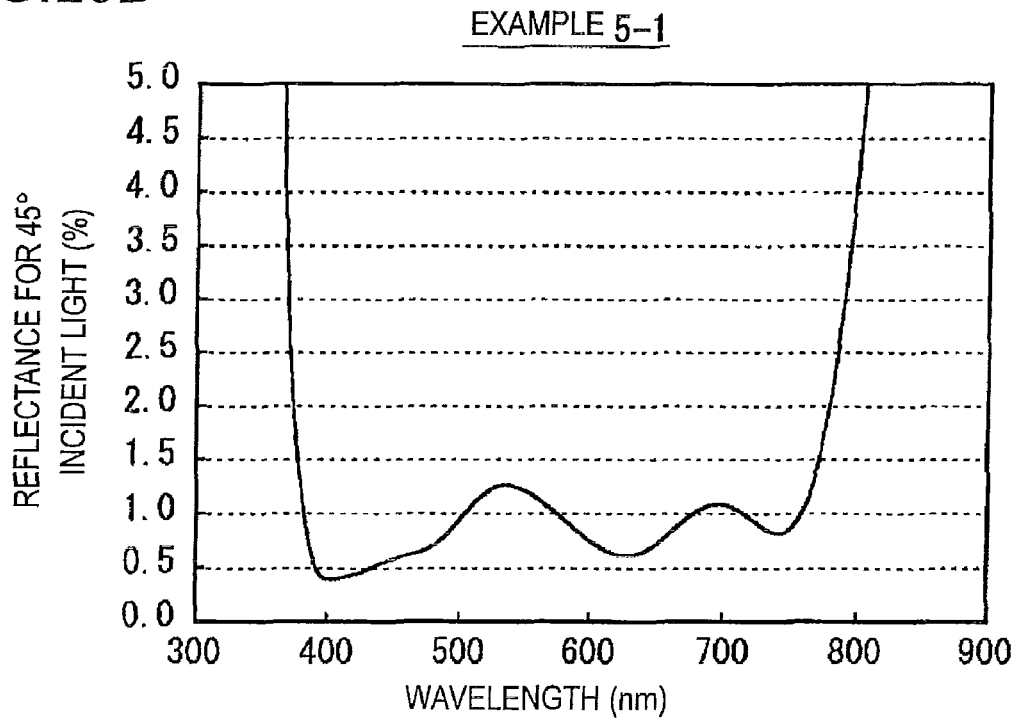
Figure 30A:
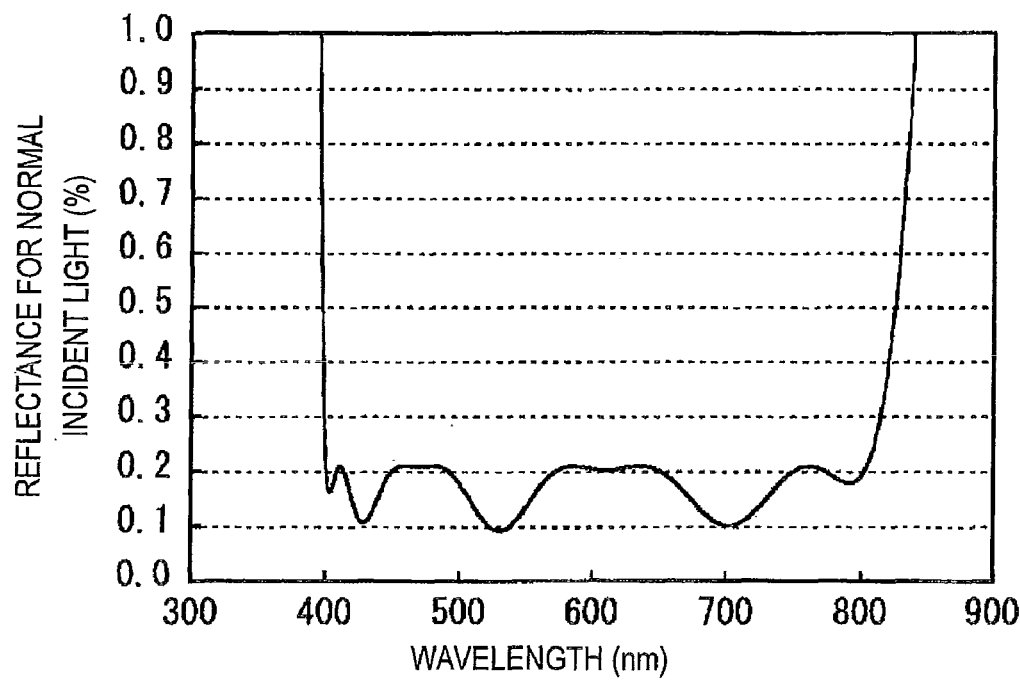
FIGS. 30A and 30B are reflectance distribution graphs of Example 5-2 corresponding to the reflection reducing film shown in FIG. 5.
Figure 30B:
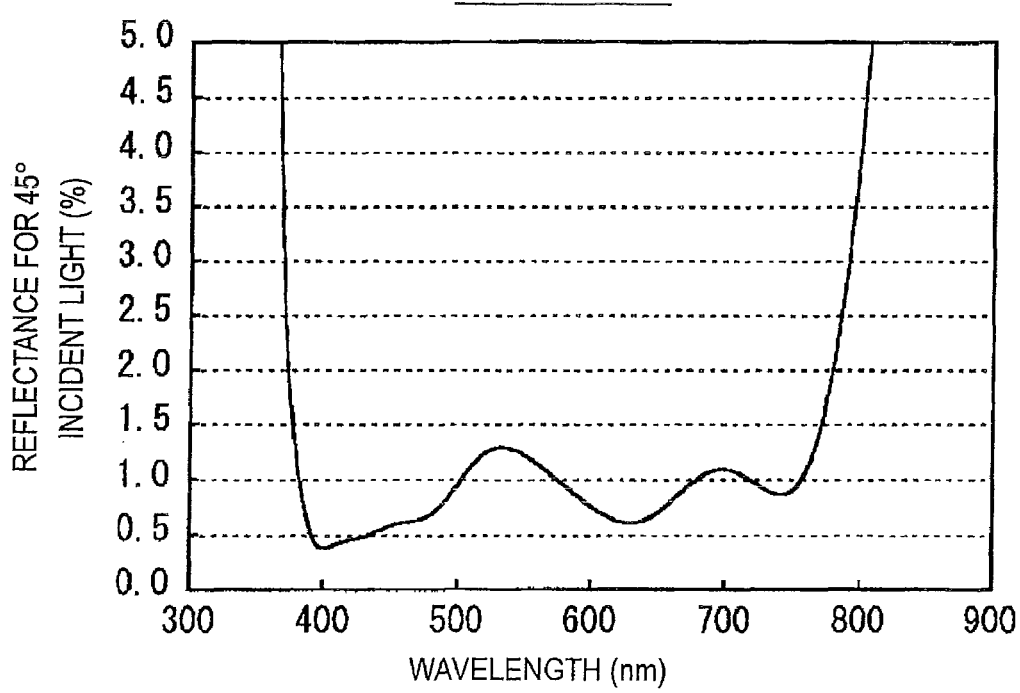
Figure 31A:
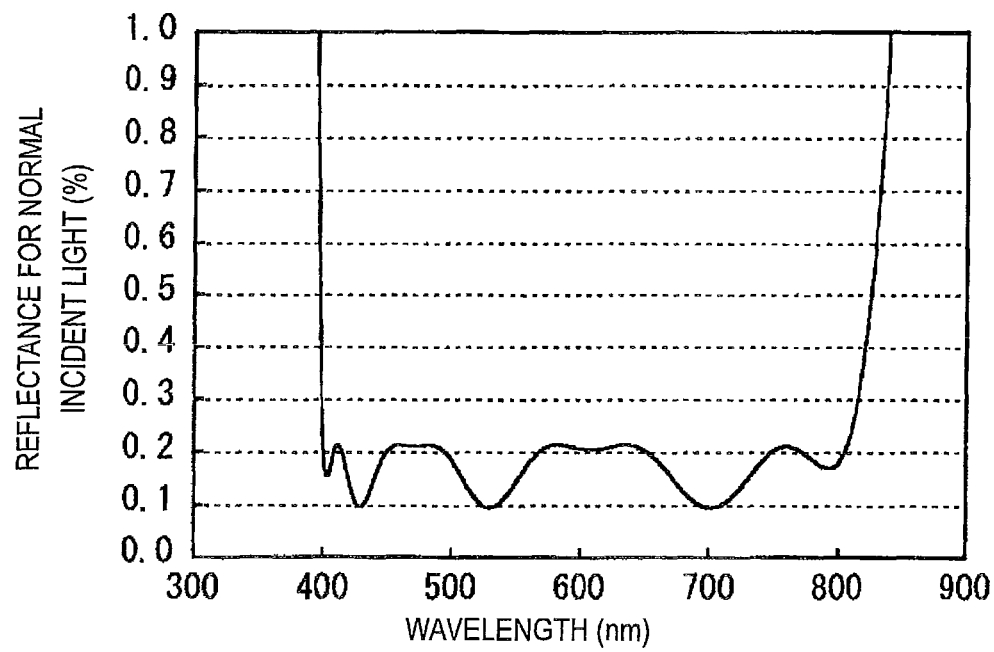
FIGS. 31A and 31B are reflectance distribution graphs of Example 5-3 corresponding to the reflection reducing film shown in FIG. 5.
Figure 31B:
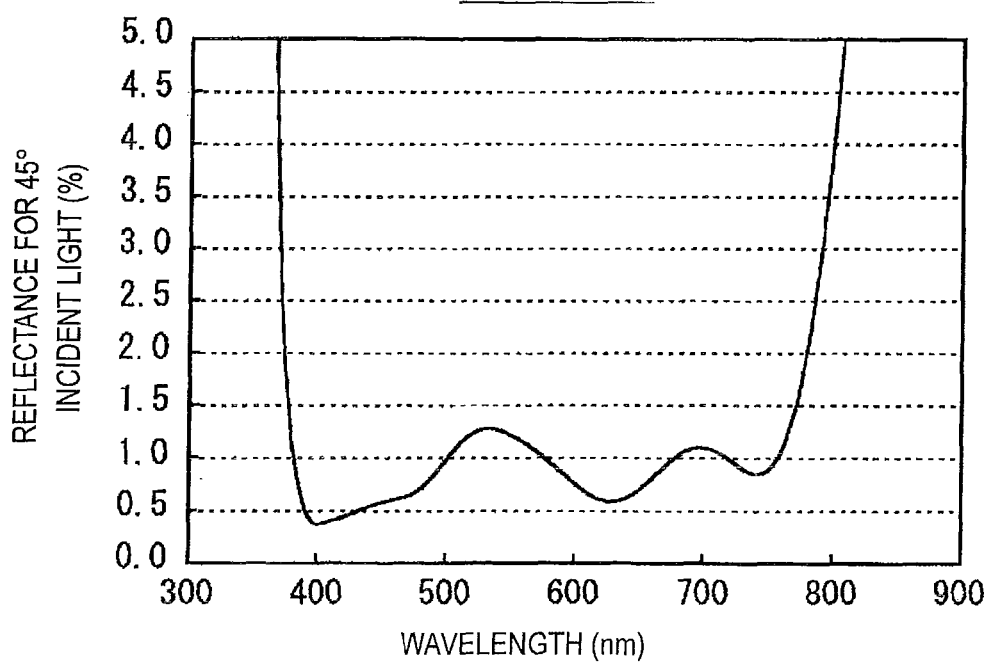
Figure 32A:
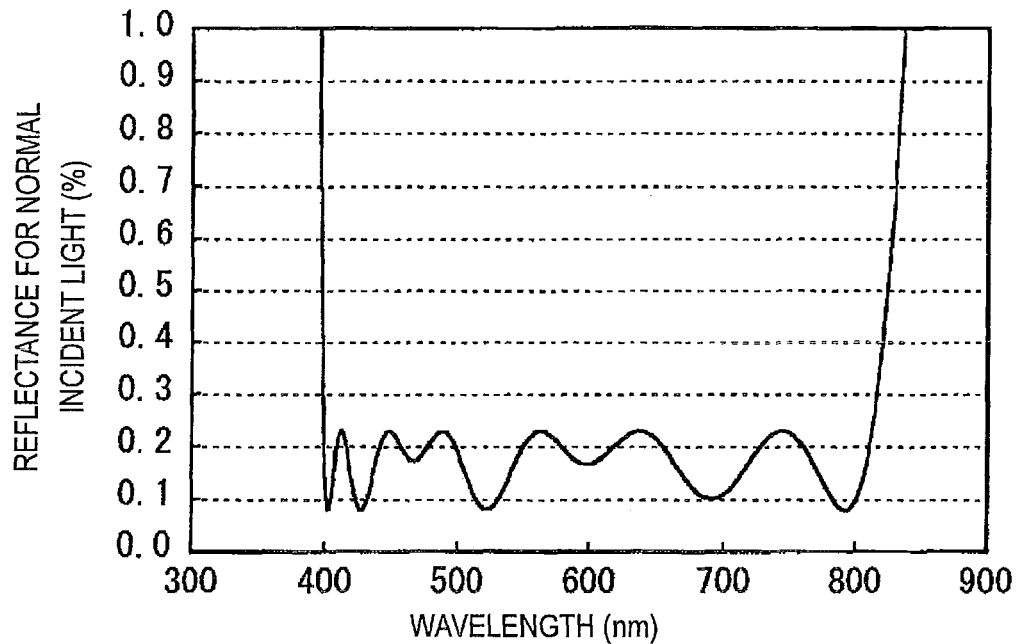
FIGS. 32A and 32B are reflectance distribution graphs of Example 6-1 corresponding to the reflection reducing film shown in FIG. 6.
Figure 32B:
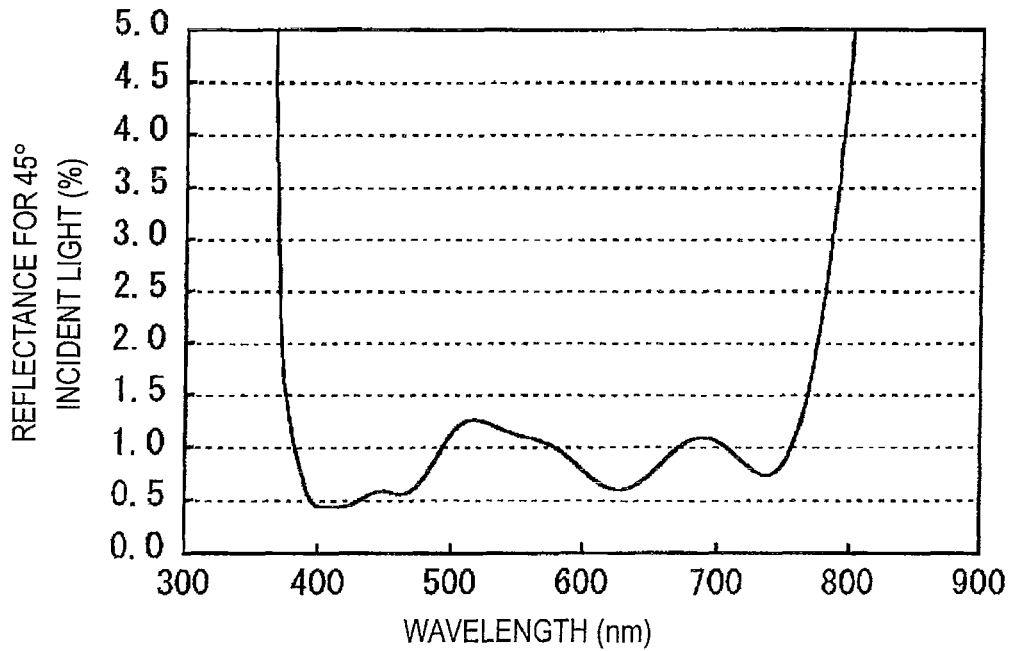
Figure 33A:
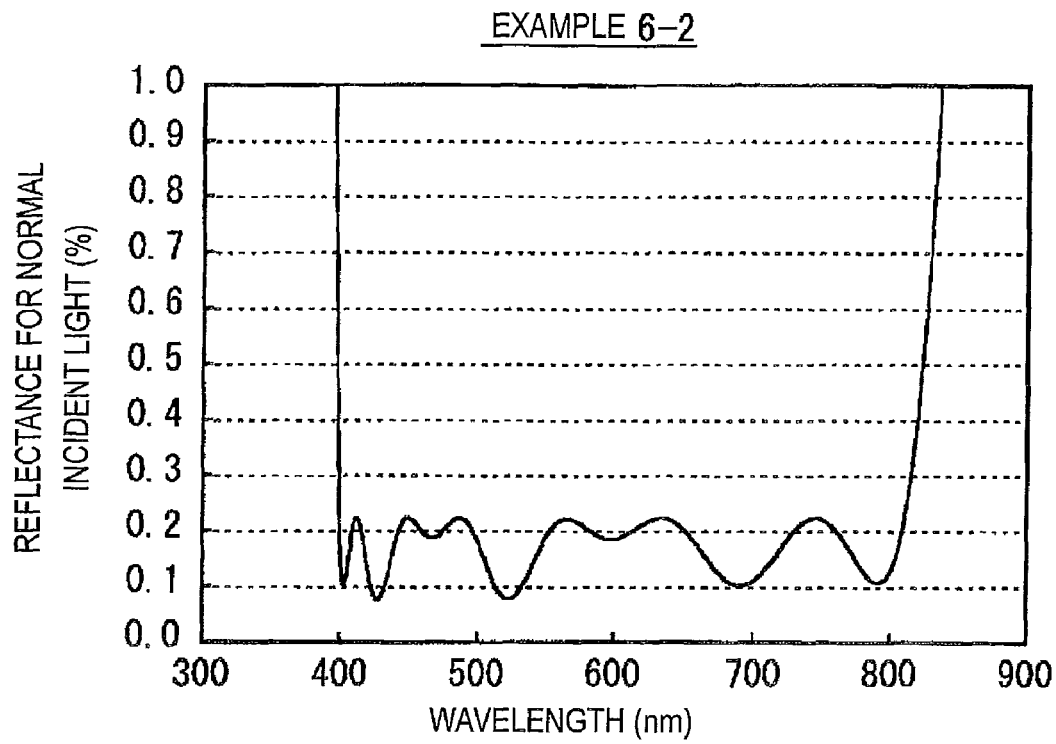
FIGS. 33A and 33B are reflectance distribution graphs of Example 6-2 corresponding to the reflection reducing film shown in FIG. 6.
Figure 33B:
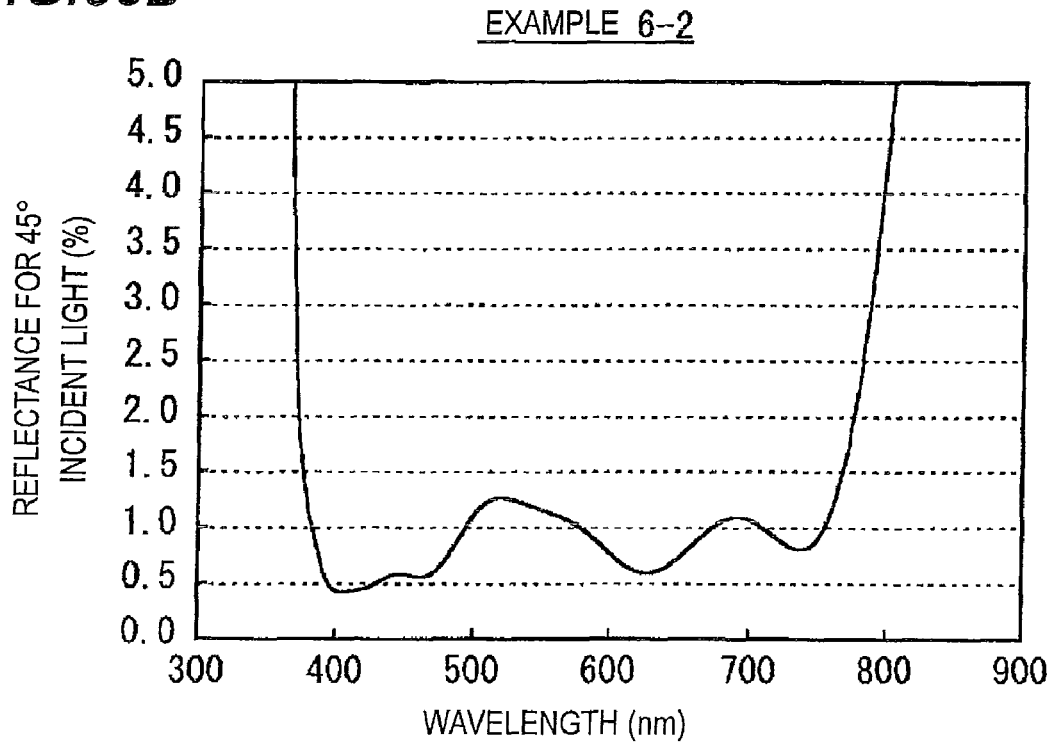
Figure 34A:
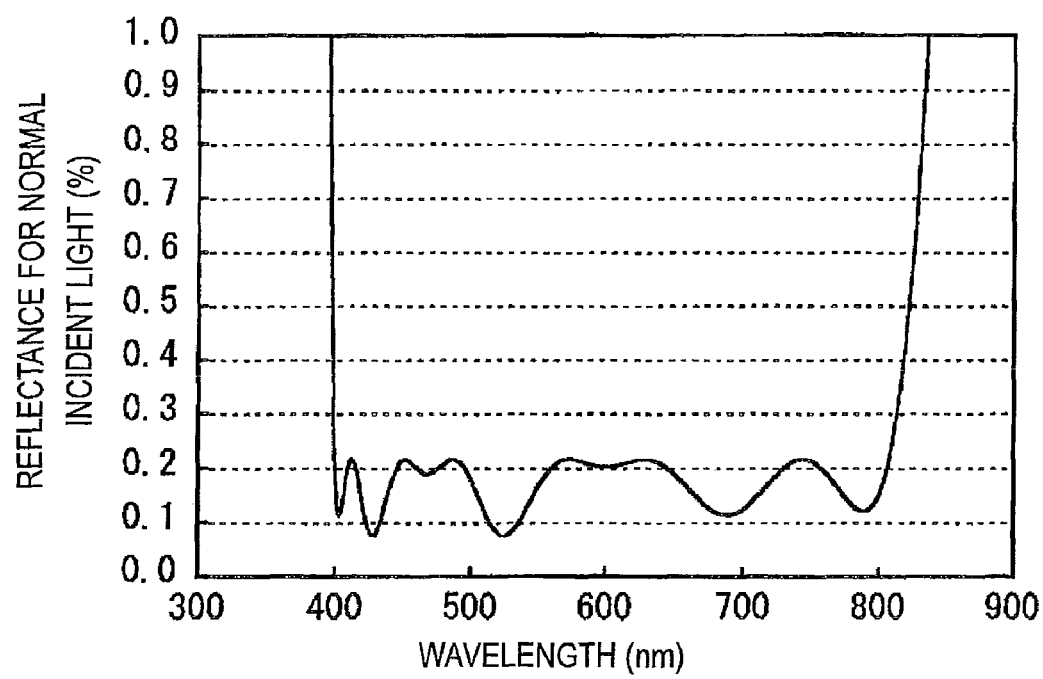
FIGS. 34A and 34B are reflectance distribution graphs of Example 6-3 corresponding to the reflection reducing film shown in FIG. 6.
Figure 34B:
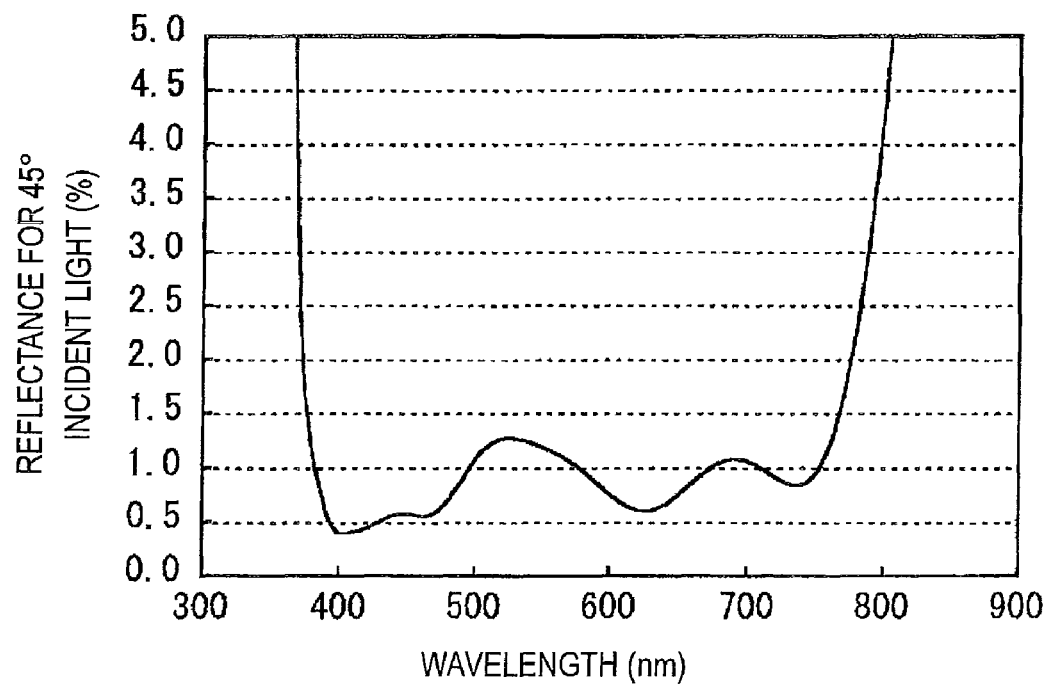
Figure 35A:
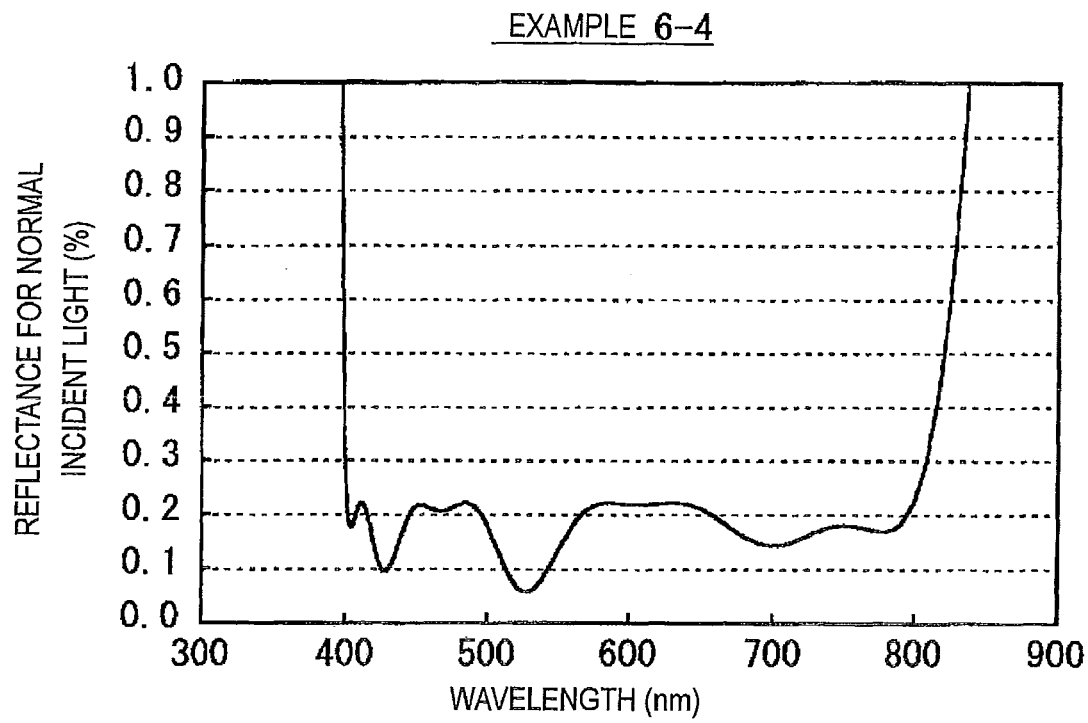
FIGS. 35A and 35B are reflectance distribution graphs of Example 6-4 corresponding to the reflection reducing film shown in FIG. 6.
Figure 35B:
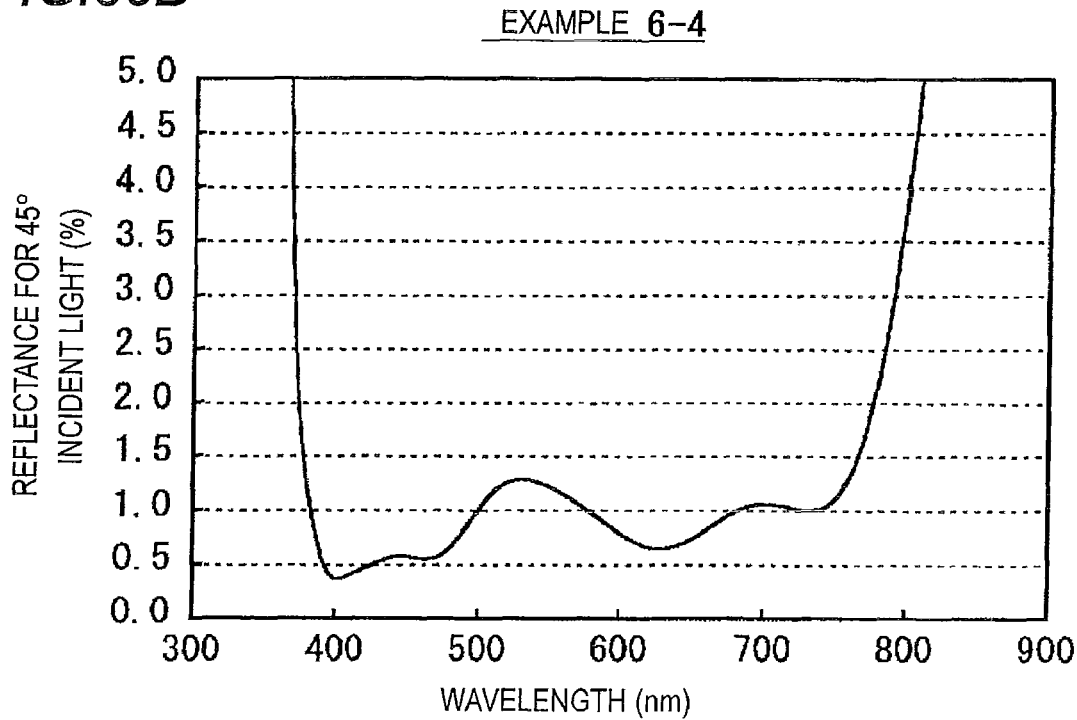

Fifth numerical examples (Examples 5-1 to 5-3) are shown in Tables 18 to 20 and FIGS. 29A to 31B. Herein, Tables 18 to 20 show basic data of Examples 5-1 to 5-3 corresponding to the reflection reducing film 1020 shown in FIG. 5. FIGS. 29A to 31B show reflectance distributions of Examples 5-1 to 5-3. Among them, FIGS. 29A, 30A and 31A show the reflectance distributions of normal incident light of the examples, and FIGS. 29B, 30B and 31B show the reflectance distributions of oblique incident light (45° incident light) of the examples.

TABLE 18

EXAMPLE 5-1

| | CONSTITUENT MATERIAL | REFRACTIVE INDEX N | PHISICAL THICKNESS d | CENTER WAVELENGTH λ = 550 nm OPTICAL FILM THICKNESS INDEX N × d | |
|---|---|---|---|---|---|
| OPTICAL SUBSTRATE | S-LAH79 | 2.0033 | — | — | |
| 15th LAYER | Al$_2$O$_3$ | 1.6376 | 13.682 | 22.406 | (0.041 λ) |
| 14th LAYER | SUB-H4 | 2.0927 | 32.580 | 68.180 | (0.124 λ) |
| 13th LAYER | Al$_2$O$_3$ | 1.6376 | 43.995 | 72.046 | (0.131 λ) |
| 12th LAYER | SUB-H4 | 2.0927 | 20.734 | 43.390 | (0.079 λ) |
| 11th LAYER | Al$_2$O$_3$ | 1.6376 | 76.570 | 125.391 | (0.228 λ) |
| 10th LAYER | SUB-H4 | 2.0927 | 12.000 | 25.112 | (0.046 λ) |
| 9th LAYER | Al$_2$O$_3$ | 1.6376 | 146.325 | 239.622 | (0.436 λ) |
| 8th LAYER | MgF$_2$ | 1.3855 | 41.519 | 57.525 | (0.105 λ) |
| 7th LAYER | Al$_2$O$_3$ | 1.6376 | 106.859 | 174.992 | (0.318 λ) |
| 6th LAYER | SUB-H4 | 2.0927 | 130.680 | 273.474 | (0.497 λ) |
| 5th LAYER | Al$_2$O$_3$ | 1.6376 | 165.921 | 271.712 | (0.494 λ) |

TABLE 18-continued

EXAMPLE 5-1

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| 4th LAYER | SUB-H4 | 2.0927 | 62.085 | 129.925 | (0.236 λ) |
| 3rd LAYER | $Al_2O_3$ | 1.6376 | 12.000 | 19.651 | (0.036 λ) |
| 2nd LAYER | SUB-H4 | 2.0927 | 45.689 | 95.613 | (0.174 λ) |
| 1st LAYER | $MgF_2$ | 1.3855 | 100.653 | 139.455 | (0.254 λ) |
| AIR | — | — | — | — | |

TABLE 19

EXAMPLE 5-2

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | S-NPH2 | 1.9229 | — | — | |
| 15th LAYER | $Al_2O_3$ | 1.6376 | 19.297 | 31.601 | (0.057 λ) |
| 14th LAYER | SUB-H4 | 2.0927 | 24.852 | 52.008 | (0.095 λ) |
| 13th LAYER | $Al_2O_3$ | 1.6376 | 54.353 | 89.008 | (0.162 λ) |
| 12th LAYER | SUB-H4 | 2.0927 | 16.472 | 34.471 | (0.063 λ) |
| 11th LAYER | $Al_2O_3$ | 1.6376 | 79.885 | 130.820 | (0.238 λ) |
| 10th LAYER | SUB-H4 | 2.0927 | 12.000 | 25.112 | (0.046 λ) |
| 9th LAYER | $Al_2O_3$ | 1.6376 | 143.283 | 234.640 | (0.427 λ) |
| 8th LAYER | $MgF_2$ | 1.3855 | 42.570 | 58.981 | (0.107 λ) |
| 7th LAYER | $Al_2O_3$ | 1.6376 | 105.952 | 173.507 | (0.315 λ) |
| 6th LAYER | SUB-H4 | 2.0927 | 130.689 | 273.493 | (0.497 λ) |
| 5th LAYER | $Al_2O_3$ | 1.6376 | 165.889 | 271.660 | (0.494 λ) |
| 4th LAYER | SUB-H4 | 2.0927 | 61.954 | 129.651 | (0.236 λ) |
| 3rd LAYER | $Al_2O_3$ | 1.6376 | 12.000 | 19.651 | (0.036 λ) |
| 2nd LAYER | SUB-H4 | 2.0927 | 45.806 | 95.858 | (0.174 λ) |
| 1st LAYER | $MgF_2$ | 1.3855 | 100.535 | 139.291 | (0.253 λ) |
| AIR | — | — | — | — | |

TABLE 20

EXAMPLE 5-3

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | LASF-N17 | 1.8830 | — | — | |
| 15th LAYER | $Al_2O_3$ | 1.6376 | 17.853 | 29.236 | (0.053 λ) |
| 14th LAYER | SUB-H4 | 2.0927 | 20.614 | 43.139 | (0.078 λ) |
| 13th LAYER | $Al_2O_3$ | 1.6376 | 53.339 | 87.348 | (0.159 λ) |
| 12th LAYER | SUB-H4 | 2.0927 | 15.910 | 33.295 | (0.061 λ) |
| 11th LAYER | $Al_2O_3$ | 1.6376 | 79.409 | 130.040 | (0.236 λ) |
| 10th LAYER | SUB-H4 | 2.0927 | 12.000 | 25.112 | (0.046 λ) |
| 9th LAYER | $Al_2O_3$ | 1.6376 | 142.783 | 233.821 | (0.425 λ) |
| 8th LAYER | $MgF_2$ | 1.3855 | 42.672 | 59.122 | (0.107 λ) |
| 7th LAYER | $Al_2O_3$ | 1.6376 | 105.743 | 173.165 | (0.315 λ) |
| 6th LAYER | SUB-H4 | 2.0927 | 130.615 | 273.338 | (0.497 λ) |
| 5th LAYER | $Al_2O_3$ | 1.6376 | 165.775 | 271.473 | (0.494 λ) |
| 4th LAYER | SUB-H4 | 2.0927 | 62.292 | 130.358 | (0.237 λ) |
| 3rd LAYER | $Al_2O_3$ | 1.6376 | 12.000 | 19.651 | (0.036 λ) |
| 2nd LAYER | SUB-H4 | 2.0927 | 45.520 | 95.260 | (0.173 λ) |
| 1st LAYER | $MgF_2$ | 1.3855 | 100.537 | 139.294 | (0.253 λ) |
| AIR | — | — | — | — | |

Tables 18 to 20 show constituent material for layers, refractive indices N at the d-line, physical thicknesses d (unit: nm) and optical film thicknesses N×d (unit: nm). Examples 5-1 to 5-3 have the same configuration, except that the constituent materials of the optical substrates are different from each other. "SUB-H4" in the column of constituent material is a substance H4 (Merck & Co., Inc.) including $LaTiO_3$ as a main component. All the center wavelengths λ0 shown in the column of optical film thickness N×d are 550 nm. As is obvious from the respective tables, the refractive indices N and the optical film thicknesses N×d of the first to ninth layers corresponding to a reflection reducing layer satisfy all the above-described conditional expressions (11) to (19).

In FIGS. 29A, 30A and 31A, a vertical axis indicates a reflectance (%) for normal incident light and a horizontal axis indicates a wavelength λ (nm) upon measurement. As is obvious from the respective drawings, a reflectance is equal to or lower than about 0.2% in a wavelength band of about 400 to 800 nm and excellent reflection characteristics are obtained.

In FIGS. 29B, 30B and 31B, a vertical axis indicates a reflectance (%) for 45° incident light and a horizontal axis indicates a wavelength λ (nm) upon measurement. As is obvious from the respective drawings, a reflectance is lower than 1.5% in a wavelength band of about 400 to 750 nm and thus excellent reflection characteristics are obtained even for oblique incident light.

Sixth Numerical Examples

Sixth numerical examples (Examples 6-1 to 6-4) are shown in Tables 21 to 24 and FIGS. 32A to 35B. Herein, Tables 21 to 24 show basic data of Examples 6-1 to 6-4 corresponding to the reflection reducing film 1030 shown in FIG. 6. FIGS. 32A to 35B show reflectance distributions of Examples 6-1 to 6-4. Among them, FIGS. 32A, 33A, 34A and 35A show the reflectance distributions of normal incident light of the examples, and FIGS. 32B, 33B, 34B and 35B show the reflectance distributions of oblique incident light (45° incident light) of the examples.

TABLE 21

EXAMPLE 6-1

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | S-TIH53 | 1.8467 | — | — | |
| 13th LAYER | $Al_2O_3$ | 1.6376 | 34.791 | 56.974 | (0.104 λ) |
| 12th LAYER | SUB-H4 | 2.0927 | 16.629 | 34.800 | (0.063 λ) |
| 11th LAYER | $Al_2O_3$ | 1.6376 | 74.063 | 121.286 | (0.221 λ) |
| 10th LAYER | SUB-H4 | 2.0927 | 12.000 | 25.112 | (0.046 λ) |
| 9th LAYER | $Al_2O_3$ | 1.6376 | 146.716 | 240.262 | (0.437 λ) |
| 8th LAYER | $MgF_2$ | 1.3855 | 40.378 | 55.944 | (0.102 λ) |
| 7th LAYER | $Al_2O_3$ | 1.6376 | 107.169 | 175.500 | (0.319 λ) |
| 6th LAYER | SUB-H4 | 2.0927 | 131.089 | 274.330 | (0.499 λ) |
| 5th LAYER | $Al_2O_3$ | 1.6376 | 165.942 | 271.747 | (0.494 λ) |
| 4th LAYER | SUB-H4 | 2.0927 | 62.615 | 131.034 | (0.238 λ) |
| 3rd LAYER | $Al_2O_3$ | 1.6376 | 12.000 | 19.651 | (0.036 λ) |
| 2nd LAYER | SUB-H4 | 2.0927 | 45.433 | 95.078 | (0.173 λ) |
| 1st LAYER | $MgF_2$ | 1.3855 | 100.581 | 139.355 | (0.253 λ) |
| AIR | — | — | — | — | |

TABLE 22

EXAMPLE 6-2

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | SFL6 | 1.8052 | — | — | |
| 13th LAYER | $Al_2O_3$ | 1.6376 | 37.328 | 61.128 | (0.111 λ) |
| 12th LAYER | SUB-H4 | 2.0927 | 14.564 | 30.478 | (0.055 λ) |
| 11th LAYER | $Al_2O_3$ | 1.6376 | 74.530 | 122.050 | (0.222 λ) |
| 10th LAYER | SUB-H4 | 2.0927 | 12.375 | 25.897 | (0.047 λ) |
| 9th LAYER | $Al_2O_3$ | 1.6376 | 143.511 | 235.014 | (0.427 λ) |
| 8th LAYER | $MgF_2$ | 1.3855 | 41.773 | 57.876 | (0.105 λ) |
| 7th LAYER | $Al_2O_3$ | 1.6376 | 106.255 | 174.003 | (0.316 λ) |
| 6th LAYER | SUB-H4 | 2.0927 | 131.158 | 274.474 | (0.499 λ) |
| 5th LAYER | $Al_2O_3$ | 1.6376 | 165.965 | 271.784 | (0.494 λ) |
| 4th LAYER | SUB-H4 | 2.0927 | 62.392 | 130.568 | (0.237 λ) |
| 3rd LAYER | $Al_2O_3$ | 1.6376 | 12.000 | 19.651 | (0.036 λ) |
| 2nd LAYER | SUB-H4 | 2.0927 | 45.585 | 95.396 | (0.173 λ) |
| 1st LAYER | $MgF_2$ | 1.3855 | 100.496 | 139.237 | (0.253 λ) |
| AIR | — | — | — | — | |

TABLE 23

EXAMPLE 6-3

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | SF14 | 1.7618 | — | — | |
| 13th LAYER | $Al_2O_3$ | 1.6376 | 40.812 | 66.834 | (0.122 λ) |
| 12th LAYER | SUB-H4 | 2.0927 | 12.000 | 25.112 | (0.046 λ) |
| 11th LAYER | $Al_2O_3$ | 1.6376 | 76.520 | 125.309 | (0.228 λ) |
| 10th LAYER | SUB-H4 | 2.0927 | 12.000 | 25.112 | (0.046 λ) |
| 9th LAYER | $Al_2O_3$ | 1.6376 | 141.567 | 231.830 | (0.422 λ) |
| 8th LAYER | $MgF_2$ | 1.3855 | 42.397 | 58.741 | (0.107 λ) |
| 7th LAYER | $Al_2O_3$ | 1.6376 | 105.704 | 173.101 | (0.315 λ) |
| 6th LAYER | SUB-H4 | 2.0927 | 131.020 | 274.186 | (0.499 λ) |
| 5th LAYER | $Al_2O_3$ | 1.6376 | 166.014 | 271.865 | (0.494 λ) |
| 4th LAYER | SUB-H4 | 2.0927 | 62.126 | 130.011 | (0.238 λ) |
| 3rd LAYER | $Al_2O_3$ | 1.6376 | 12.003 | 19.656 | (0.036 λ) |
| 2nd LAYER | SUB-H4 | 2.0927 | 45.784 | 95.812 | (0.174 λ) |
| 1st LAYER | $MgF_2$ | 1.3855 | 100.382 | 139.079 | (0.253 λ) |
| AIR | — | — | — | — | |

TABLE 24

EXAMPLE 6-4

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | S-TIH1 | 1.7174 | — | — | |
| 13th LAYER | $Al_2O_3$ | 1.6376 | 38.973 | 63.822 | (0.116 λ) |
| 12th LAYER | SUB-H4 | 2.0927 | 12.001 | 25.114 | (0.046 λ) |
| 11th LAYER | $Al_2O_3$ | 1.6376 | 67.736 | 110.924 | (0.202 λ) |
| 10th LAYER | SUB-H4 | 2.0927 | 14.550 | 30.449 | (0.055 λ) |
| 9th LAYER | $Al_2O_3$ | 1.6376 | 134.922 | 220.948 | (0.402 λ) |
| 8th LAYER | $MgF_2$ | 1.3855 | 45.278 | 62.733 | (0.114 λ) |
| 7th LAYER | $Al_2O_3$ | 1.6376 | 104.311 | 170.820 | (0.311 λ) |
| 6th LAYER | SUB-H4 | 2.0927 | 130.890 | 273.914 | (0.498 λ) |
| 5th LAYER | $Al_2O_3$ | 1.6376 | 167.435 | 274.192 | (0.499 λ) |
| 4th LAYER | SUB-H4 | 2.0927 | 57.345 | 120.006 | (0.218 λ) |
| 3rd LAYER | $Al_2O_3$ | 1.6376 | 14.563 | 23.848 | (0.043 λ) |
| 2nd LAYER | SUB-H4 | 2.0927 | 46.137 | 96.551 | (0.176 λ) |
| 1st LAYER | $MgF_2$ | 1.3855 | 101.124 | 140.107 | (0.255 λ) |
| AIR | — | — | — | — | |

Tables 21 to 24 show the same items as in the above Tables 18 to 20. Examples 6-1 to 6-4 have the same configuration, except that the constituent materials of the optical substrates are different from each other. As is obvious from the respective tables, the refractive indices N and the optical film thicknesses N×d of the first to ninth layers corresponding to a reflection reducing layer satisfy all the above-described conditional expressions (11) to (19).

In FIGS. 32A, 33A, 34A and 35A, a vertical axis indicates a reflectance (%) for normal incident light and a horizontal axis indicates a wavelength λ (nm) upon measurement. As is obvious from the respective drawings, a reflectance is lower than 0.25% in a wavelength band of about 400 to 800 nm and excellent reflection characteristics are obtained. In FIGS. 32B, 33B, 34B and 35B, a vertical axis indicates a reflectance (%) for 45° incident light and a horizontal axis indicates a wavelength λ (nm) upon measurement. As is obvious from the respective drawings, a reflectance is lower than 1.5% in a wavelength band of about 400 to 750 nm and thus excellent reflection characteristics are obtained even for oblique incident light.

Seventh Numerical Examples

Figure 36A:
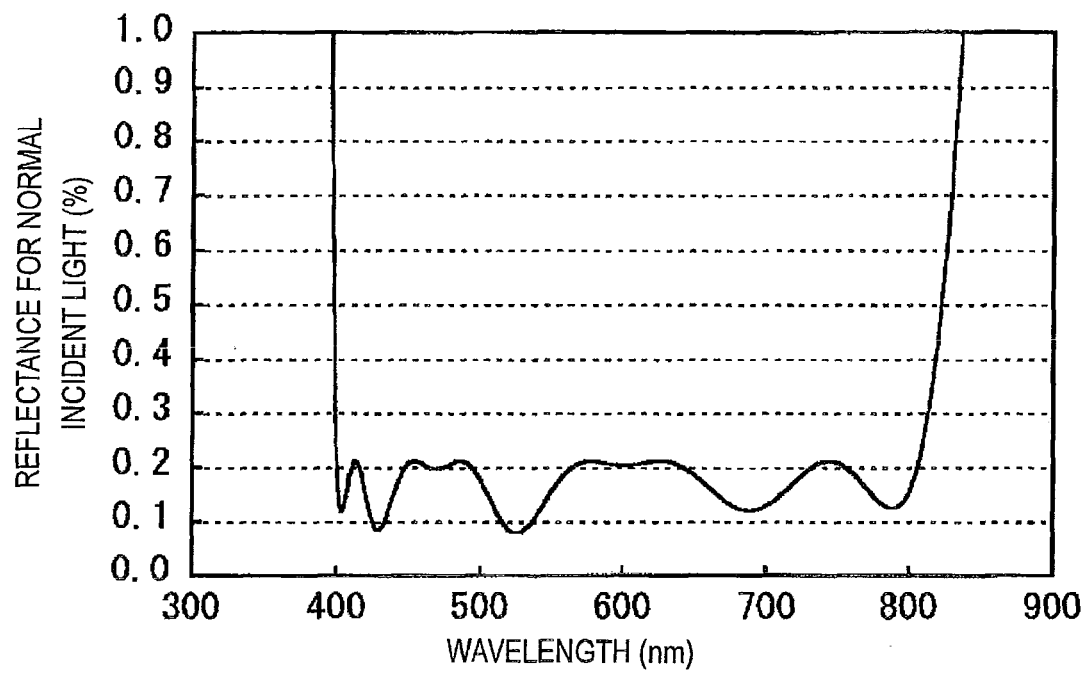
FIGS. 36A and 36B are reflectance distribution graphs of Example 7-1 corresponding to the reflection reducing film shown in FIG. 7.
Figure 36B:
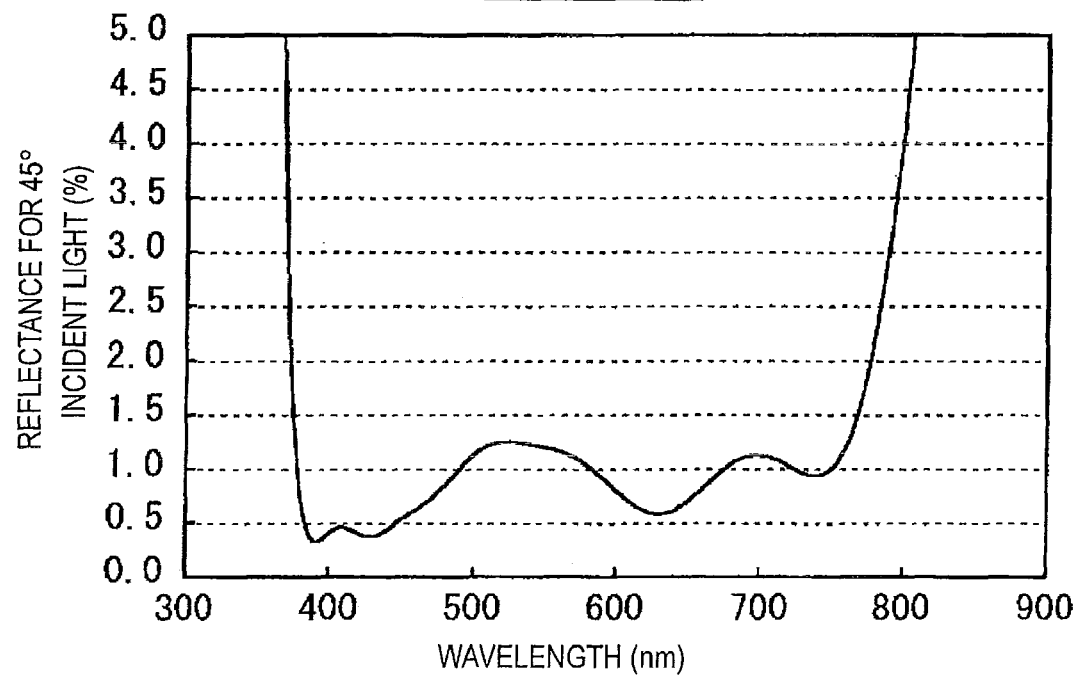
Figure 37A:
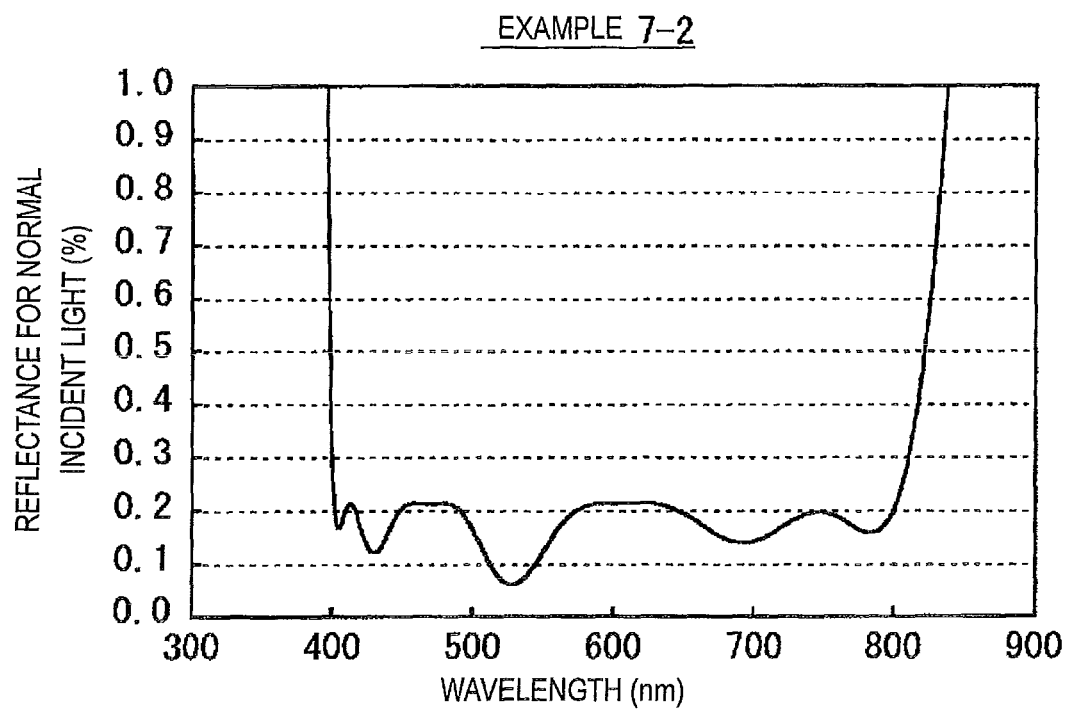
FIGS. 37A and 37B are reflectance distribution graphs of Example 7-2 corresponding to the reflection reducing film shown in FIG. 7.
Figure 37B:
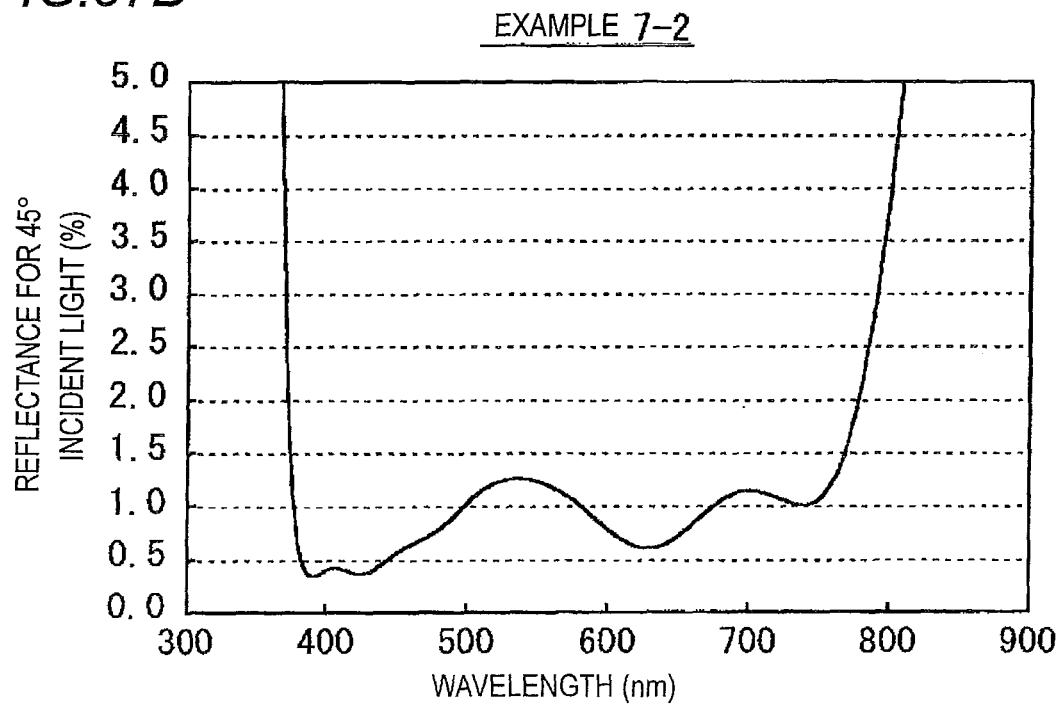
Figure 38A:
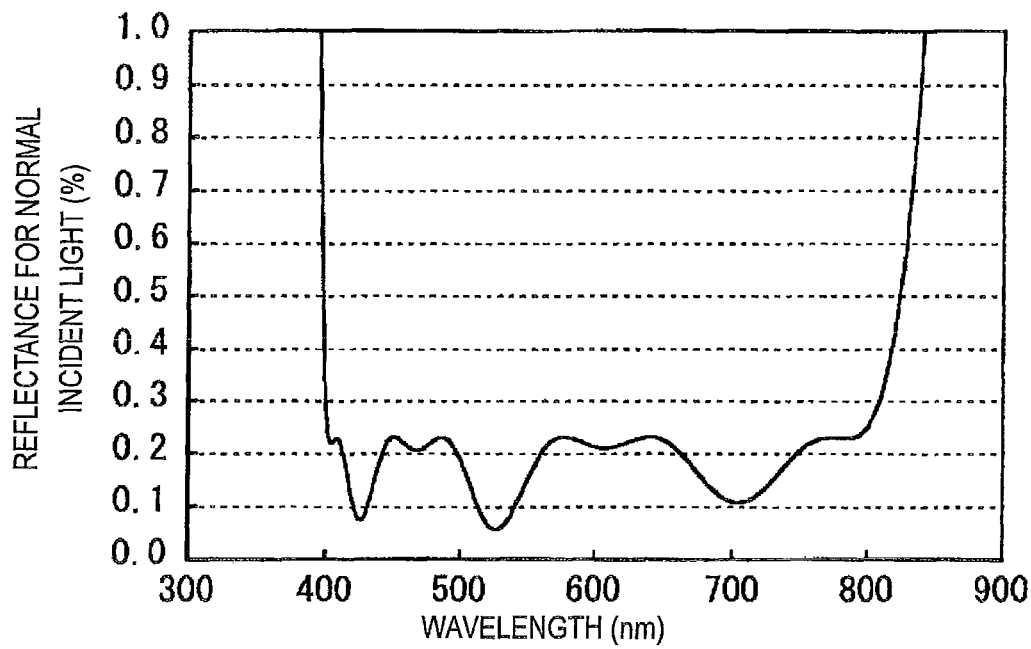
FIGS. 38A and 38B are reflectance distribution graphs of Example 7-3 corresponding to the reflection reducing film shown in FIG. 7.
Figure 38B:
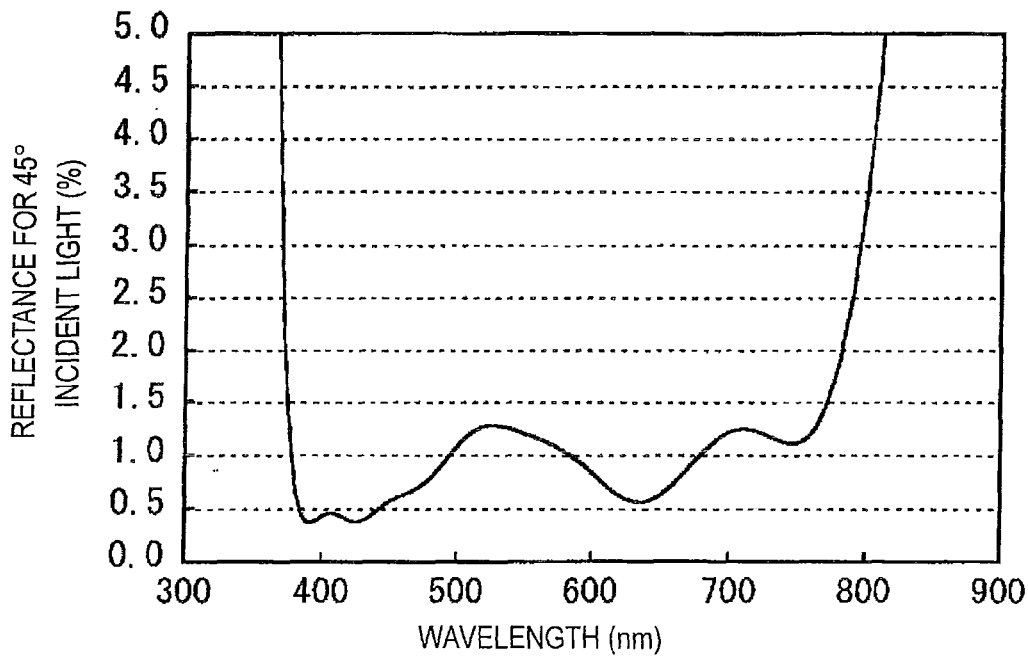

Seventh numerical examples (Examples 7-1 to 7-3) are shown in Tables 25 to 27 and FIGS. 36A to 38B. Herein, Tables 25 to 27 show basic data of Examples 7-1 to 7-3 corresponding to the reflection reducing film 1040 shown in FIG. 7. FIGS. 36A to 38B show reflectance distributions of Examples 7-1 to 7-3. Among them, FIGS. 36A, 37A and 38A show the reflectance distributions of normal incident light of the examples, and FIGS. 36B, 37B and 38B show the reflectance distributions of oblique incident light (45° incident light) of the examples.

TABLE 25

EXAMPLE 7-1

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | BASF-2 | 1.6645 | — | — | |
| 13th LAYER | Al$_2$O$_3$ | 1.6376 | 90.610 | 148.383 | (0.270 λ) |
| 12th LAYER | SUB-H4 | 2.0927 | 12.006 | 25.125 | (0.046 λ) |
| 11th LAYER | MgF$_2$ | 1.3855 | 38.907 | 53.906 | (0.098 λ) |
| 10th LAYER | SUB-H4 | 2.0927 | 17.715 | 37.072 | (0.067 λ) |
| 9th LAYER | Al$_2$O$_3$ | 1.6376 | 146.220 | 239.450 | (0.435 λ) |
| 8th LAYER | MgF$_2$ | 1.3855 | 42.154 | 58.404 | (0.106 λ) |
| 7th LAYER | Al$_2$O$_3$ | 1.6376 | 105.323 | 172.477 | (0.314 λ) |
| 6th LAYER | SUB-H4 | 2.0927 | 130.539 | 273.179 | (0.497 λ) |
| 5th LAYER | Al$_2$O$_3$ | 1.6376 | 165.857 | 271.607 | (0.494 λ) |
| 4th LAYER | SUB-H4 | 2.0927 | 61.903 | 129.544 | (0.236 λ) |
| 3rd LAYER | Al$_2$O$_3$ | 1.6376 | 12.005 | 19.659 | (0.036 λ) |
| 2nd LAYER | SUB-H4 | 2.0927 | 45.859 | 95.969 | (0.174 λ) |
| 1st LAYER | MgF$_2$ | 1.3855 | 100.345 | 139.028 | (0.253 λ) |
| AIR | — | — | — | — | |

TABLE 26

EXAMPLE 7-2

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | F-3 | 1.6129 | — | — | |
| 13th LAYER | Al$_2$O$_3$ | 1.6376 | 12.006 | 19.661 | (0.036 λ) |
| 12th LAYER | SUB-H4 | 2.0927 | 12.001 | 25.114 | (0.046 λ) |
| 11th LAYER | MgF$_2$ | 1.3855 | 37.620 | 52.123 | (0.095 λ) |
| 10th LAYER | SUB-H4 | 2.0927 | 18.114 | 37.907 | (0.069 λ) |
| 9th LAYER | Al$_2$O$_3$ | 1.6376 | 140.350 | 229.837 | (0.418 λ) |
| 8th LAYER | MgF$_2$ | 1.3855 | 43.561 | 60.354 | (0.110 λ) |
| 7th LAYER | Al$_2$O$_3$ | 1.6376 | 103.982 | 170.281 | (0.310 λ) |
| 6th LAYER | SUB-H4 | 2.0927 | 130.090 | 272.239 | (0.495 λ) |
| 5th LAYER | Al$_2$O$_3$ | 1.6376 | 166.547 | 272.737 | (0.496 λ) |
| 4th LAYER | SUB-H4 | 2.0927 | 58.235 | 121.868 | (0.222 λ) |
| 3rd LAYER | Al$_2$O$_3$ | 1.6376 | 13.619 | 22.302 | (0.041 λ) |
| 2nd LAYER | SUB-H4 | 2.0927 | 46.492 | 97.294 | (0.177 λ) |
| 1st LAYER | MgF$_2$ | 1.3855 | 100.810 | 139.672 | (0.254 λ) |
| AIR | — | — | — | — | |

TABLE 27

EXAMPLE 7-3

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | LF1 | 1.5731 | — | — | |
| 13th LAYER | Al$_2$O$_3$ | 1.6376 | 12.000 | 19.651 | (0.036 λ) |
| 12th LAYER | SUB-H4 | 2.0927 | 12.000 | 25.112 | (0.046 λ) |
| 11th LAYER | MgF$_2$ | 1.3855 | 40.622 | 56.282 | (0.102 λ) |
| 10th LAYER | SUB-H4 | 2.0927 | 18.623 | 38.972 | (0.071 λ) |
| 9th LAYER | Al$_2$O$_3$ | 1.6376 | 140.148 | 229.506 | (0.417 λ) |
| 8th LAYER | MgF$_2$ | 1.3855 | 44.988 | 62.331 | (0.113 λ) |
| 7th LAYER | Al$_2$O$_3$ | 1.6376 | 103.401 | 169.329 | (0.308 λ) |

TABLE 27-continued

EXAMPLE 7-3

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| 6th LAYER | SUB-H4 | 2.0927 | 130.345 | 272.773 | (0.496 λ) |
| 5th LAYER | Al₂O₃ | 1.6376 | 166.924 | 273.355 | (0.497 λ) |
| 4th LAYER | SUB-H4 | 2.0927 | 57.709 | 120.768 | (0.220 λ) |
| 3rd LAYER | Al₂O₃ | 1.6376 | 14.465 | 23.688 | (0.043 λ) |
| 2nd LAYER | SHB-H4 | 2.0927 | 45.746 | 95.733 | (0.174 λ) |
| 1st LAYER | MgF₂ | 1.3855 | 100.994 | 139.927 | (0.254 λ) |
| AIR | — | — | — | — | |

Tables 25 to 27 show the same items as in the above Tables 18 to 20. Examples 7-1 to 7-3 have the same configuration, except that the constituent materials of the optical substrates are different from each other. As is obvious from the respective tables, the refractive indices N and the optical film thicknesses N×d of the first to ninth layers corresponding to a reflection reducing layer satisfy all the above-described conditional expressions (11) to (19).

In FIGS. 36A, 37A and 38A, a vertical axis indicates a reflectance (%) for normal incident light and a horizontal axis indicates a wavelength λ (nm) upon measurement. As is obvious from the respective drawings, a reflectance is lower than 0.25% in a wavelength band of about 400 to 800 nm and excellent reflection characteristics are obtained. In FIGS. 36B, 37B and 38B, a vertical axis indicates a reflectance (%) for 45° incident light and a horizontal axis indicates a wavelength λ (nm) upon measurement. As is obvious from the respective drawings, a reflectance is lower than 1.5% in a wavelength band of about 400 to 750 nm and thus excellent reflection characteristics are obtained even for oblique incident light.

Eighth Numerical Example

Figure 39A:
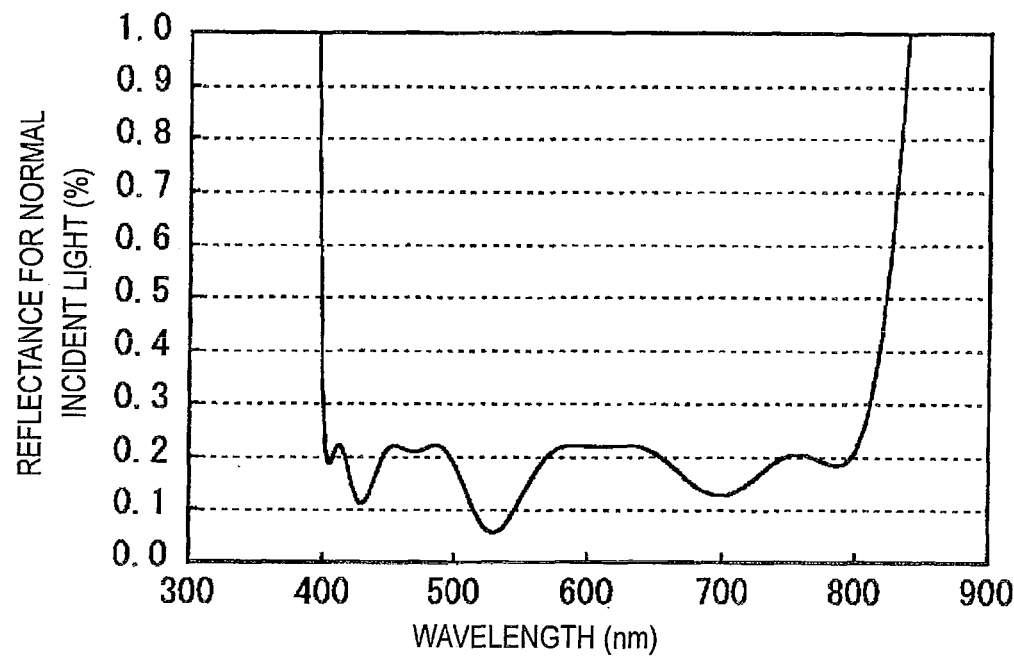
FIGS. 39A and 39B are reflectance distribution graphs of Example 8-1 corresponding to the reflection reducing film shown in FIG. 8.
Figure 39B:
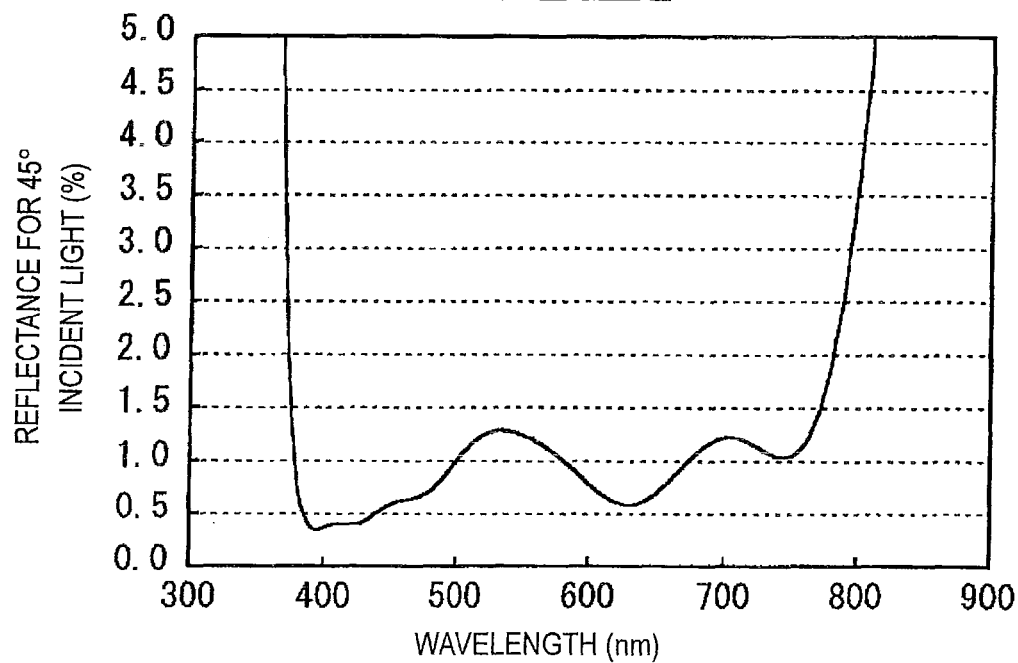
Figure 40A:
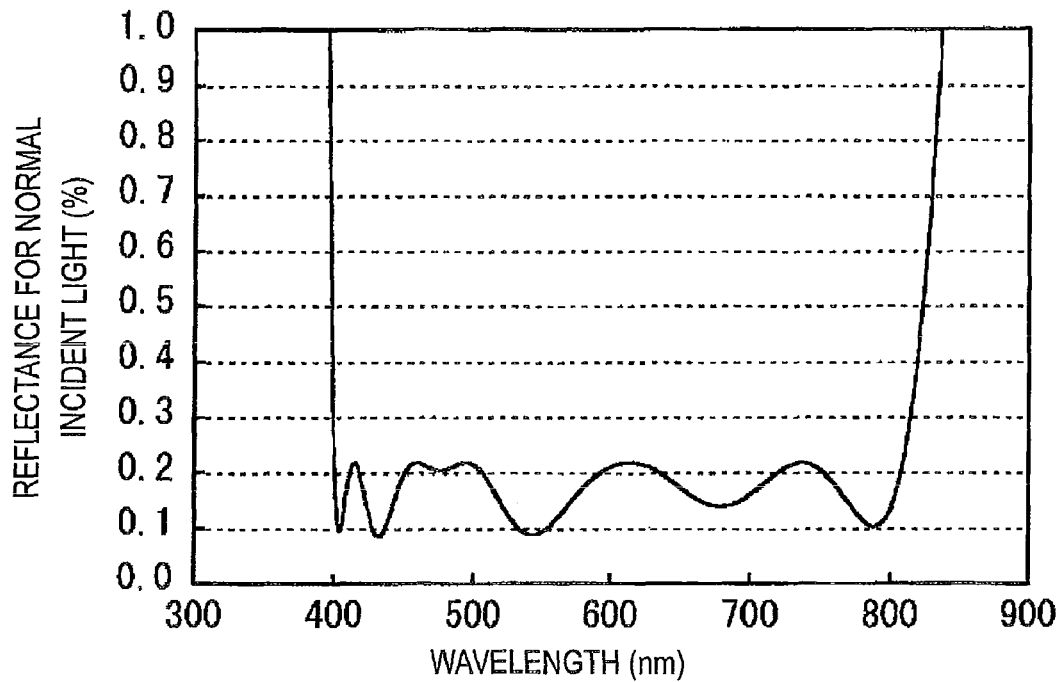
FIGS. 40A and 40B are reflectance distribution graphs of Example 9-1 corresponding to the reflection reducing film shown in FIG. 9.
Figure 40B:
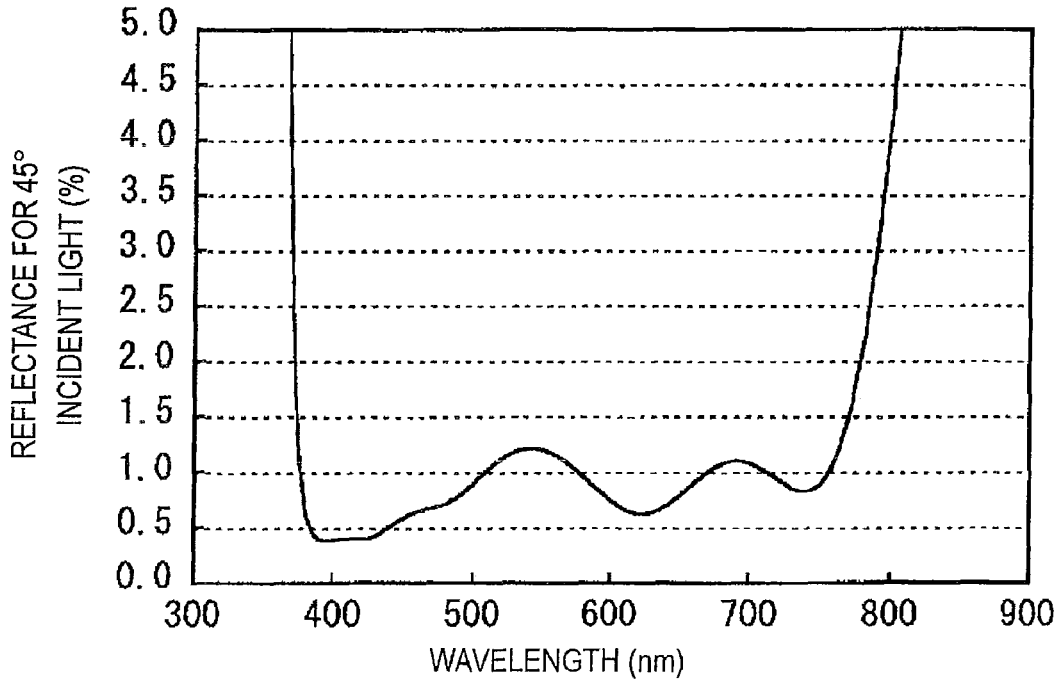

An eighth numerical example (Example 8-1) is shown in Table 28 and FIGS. 39A and 39B. Herein, Table 28 shows basic data of Example 8-1 corresponding to the reflection reducing film 1050 shown in FIG. 8 and FIGS. 39A and 39B show reflectance distribution of Example 8-1. Particularly, FIG. 39A shows the reflectance distribution of normal incident light of Example 8-1, and FIG. 39B shows the reflectance distribution of oblique incident light of Example 8-1.

TABLE 28

EXAMPLE 8-1

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | S-TIM8 | 1.5955 | — | — | |
| 14th LAYER | SUB-H4 | 2.0927 | 12.005 | 25.123 | (0.046 λ) |
| 13th LAYER | MgF₂ | 1.3855 | 34.902 | 48.357 | (0.088 λ) |
| 12th LAYER | SUB-H4 | 2.0927 | 19.180 | 40.138 | (0.073 λ) |
| 11th LAYER | MgF₂ | 1.3855 | 22.101 | 30.621 | (0.056 λ) |
| 10th LAYER | SUB-H4 | 2.0927 | 12.000 | 25.112 | (0.046 λ) |
| 9th LAYER | Al₂O₃ | 1.6376 | 120.355 | 197.093 | (0.358 λ) |
| 8th LAYER | MgF₂ | 1.3855 | 43.847 | 60.750 | (0.110 λ) |
| 7th LAYER | Al₂O₃ | 1.6376 | 102.557 | 167.947 | (0.305 λ) |
| 6th LAYER | SUB-H4 | 2.0927 | 129.558 | 271.126 | (0.493 λ) |
| 5th LAYER | Al₂O₃ | 1.6376 | 166.664 | 272.929 | (0.496 λ) |
| 4th LAYER | SUB-H4 | 2.0927 | 57.377 | 120.073 | (0.218 λ) |
| 3rd LAYER | Al₂O₃ | 1.6376 | 14.276 | 23.378 | (0.043 λ) |
| 2nd LAYER | SUB-H4 | 2.0927 | 46.167 | 96.614 | (0.176 λ) |
| 1st LAYER | MgF₂ | 1.3855 | 100.992 | 139.924 | (0.254 λ) |
| AIR | — | — | — | — | |

Table 28 shows the same items as in the above Tables 18 to 20. As is obvious from Table 28, the refractive indices N and the optical film thicknesses N×d of the first to ninth layers corresponding to a reflection reducing layer satisfy all the above-described conditional expressions (11) to (19).

In FIG. 39A, a vertical axis indicates a reflectance (%) for normal incident light and a horizontal axis indicates a wavelength λ (nm) upon measurement. As is obvious from FIG. 39A, a reflectance is lower than 0.25% in a wavelength band of about 400 to 800 nm and excellent reflection characteristics are obtained. In FIG. 39B, a vertical axis indicates a reflectance (%) for 45° incident light and a horizontal axis indicates a wavelength λ (nm) upon measurement. As is obvious from FIG. 39B, a reflectance is lower than 1.5% in a wavelength band of about 400 to 750 nm and thus excellent reflection characteristics are obtained even for oblique incident light.

TABLE 29

EXAMPLE 9-1

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | BK-7 | 1.5163 | — | — | |
| 12th LAYER | SUB-H4 | 1.6376 | 43.048 | 70.495 | (0.128 λ) |
| 11th LAYER | MgF$_2$ | 1.3855 | 31.700 | 43.920 | (0.080 λ) |
| 10th LAYER | SUB-H4 | 2.0927 | 12.000 | 25.112 | (0.046 λ) |
| 9th LAYER | Al$_2$O$_3$ | 1.6376 | 153.453 | 251.295 | (0.457 λ) |
| 8th LAYER | MgF$_2$ | 1.3855 | 39.744 | 55.065 | (0.100 λ) |
| 7th LAYER | Al$_2$O$_3$ | 1.6376 | 105.629 | 172.978 | (0.315 λ) |
| 6th LAYER | SUB-H4 | 2.0927 | 129.153 | 270.278 | (0.491 λ) |
| 5th LAYER | Al$_2$O$_3$ | 1.6376 | 166.260 | 272.267 | (0.495 λ) |
| 4th LAYER | SUB-H4 | 2.0927 | 61.579 | 128.866 | (0.234 λ) |
| 3rd LAYER | Al$_2$O$_3$ | 1.6376 | 12.000 | 19.651 | (0.036 λ) |
| 2nd LAYER | SUB-H4 | 2.0927 | 45.837 | 95.923 | (0.174 λ) |
| 1st LAYER | MgF$_2$ | 1.3855 | 100.338 | 139.018 | (0.253 λ) |
| AIR | — | — | — | — | |

TABLE 30

EXAMPLE 9-2

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | K-PFK85 | 1.4856 | — | — | |
| 12th LAYER | Al$_2$O$_3$ | 1.6376 | 39.838 | 65.239 | (0.119 λ) |
| 11th LAYER | MgF$_2$ | 1.3855 | 34.243 | 47.444 | (0.086 λ) |
| 10th LAYER | SUB-H4 | 2.0927 | 12.008 | 25.129 | (0.046 λ) |
| 9th LAYER | Al$_2$O$_3$ | 1.6376 | 152.810 | 250.242 | (0.455 λ) |
| 8th LAYER | MgF$_2$ | 1.3855 | 40.200 | 55.697 | (0.101 λ) |
| 7th LAYER | Al$_2$O$_3$ | 1.6376 | 104.562 | 171.231 | (0.311 λ) |
| 6th LAYER | SUB-H4 | 2.0927 | 129.579 | 271.170 | (0.493 λ) |
| 5th LAYER | Al$_2$O$_3$ | 1.6376 | 165.346 | 270.771 | (0.492 λ) |
| 4th LAYER | SUB-H4 | 2.0927 | 61.439 | 128.573 | (0.234 λ) |
| 3rd LAYER | Al$_2$O$_3$ | 1.6376 | 12.000 | 19.651 | (0.036 λ) |
| 2nd LAYER | SUB-H4 | 2.0927 | 46.025 | 96.317 | (0.175 λ) |
| 1st LAYER | MgF$_2$ | 1.3855 | 100.327 | 139.003 | (0.253 λ) |
| AIR | — | — | — | — | |

TABLE 31

EXAMPLE 9-3

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | SiO$_2$ | 1.4585 | — | — | |
| 12th LAYER | Al$_2$O$_3$ | 1.6376 | 36.751 | 60.183 | (0.109 λ) |
| 11th LAYER | MgF$_2$ | 1.3855 | 37.875 | 52.476 | (0.095 λ) |
| 10th LAYER | SUB-H4 | 2.0927 | 12.000 | 25.112 | (0.0462 λ) |
| 9th LAYER | Al$_2$O$_3$ | 1.6376 | 152.782 | 250.196 | (0.455 λ) |
| 8th LAYER | MgF$_2$ | 1.3855 | 41.215 | 57.103 | (0.104 λ) |
| 7th LAYER | Al$_2$O$_3$ | 1.6376 | 104.156 | 170.566 | (0.310 λ) |
| 6th LAYER | SUB-H4 | 2.0927 | 129.639 | 271.296 | (0.493 λ) |
| 5th LAYER | Al$_2$O$_3$ | 1.6376 | 165.241 | 270.599 | (0.492 λ) |
| 4th LAYER | SUB-H4 | 2.0927 | 62.356 | 130.492 | (0.237 λ) |
| 3rd LAYER | Al$_2$O$_3$ | 1.6376 | 12.000 | 19.651 | (0.036 λ) |

TABLE 31-continued

EXAMPLE 9-3

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| 2nd LAYER | SUB-H4 | 2.0927 | 45.282 | 94.762 | (0.172 λ) |
| 1st LAYER | MgF$_2$ | 1.3855 | 100.360 | 139.049 | (0.253 λ) |
| AIR | — | — | — | — | |

TABLE 32

EXAMPLE 9-4

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | CaF$_2$ | 1.4339 | — | — | |
| 12th LAYER | Al$_2$O$_3$ | 1.6376 | 33.878 | 55.479 | (0.101 λ) |
| 11th LAYER | MgF$_2$ | 1.3855 | 41.346 | 57.285 | (0.104 λ) |
| 10th LAYER | SUB-H4 | 2.0927 | 11.625 | 24.328 | (0.044 λ) |
| 9th LAYER | Al$_2$O$_3$ | 1.6376 | 153.650 | 251.617 | (0.457 λ) |
| 8th LAYER | MgF$_2$ | 1.3855 | 41.290 | 57.207 | (0.104 λ) |
| 7th LAYER | Al$_2$O$_3$ | 1.6376 | 104.178 | 170.602 | (0.310 λ) |
| 6th LAYER | SUB-H4 | 2.0927 | 129.612 | 271.239 | (0.493 λ) |
| 5th LAYER | Al$_2$O$_3$ | 1.6376 | 164.714 | 269.736 | (0.490 λ) |
| 4th LAYER | SUB-H4 | 2.0927 | 63.540 | 132.970 | (0.242 λ) |
| 3rd LAYER | Al$_2$O$_3$ | 1.6376 | 11.625 | 19.037 | (0.035 λ) |
| 2nd LAYER | SUB-H4 | 2.0927 | 44.769 | 93.688 | (0.170 λ) |
| 1st LAYER | MgF$_2$ | 1.3855 | 100.319 | 138.992 | (0.253 λ) |
| AIR | — | — | — | — | |

Tables 29 to 32 show the same items as in the above Tables 18 to 20. Examples 9-1 to 9-4 have the same configuration, except that the constituent materials of the optical substrates are different from each other. As is obvious from the respective tables, the refractive indices N and the optical film thicknesses N×d of the first to ninth layers corresponding to a reflection reducing layer satisfy all the above-described conditional expressions (11) to (19).

Figure 41A:
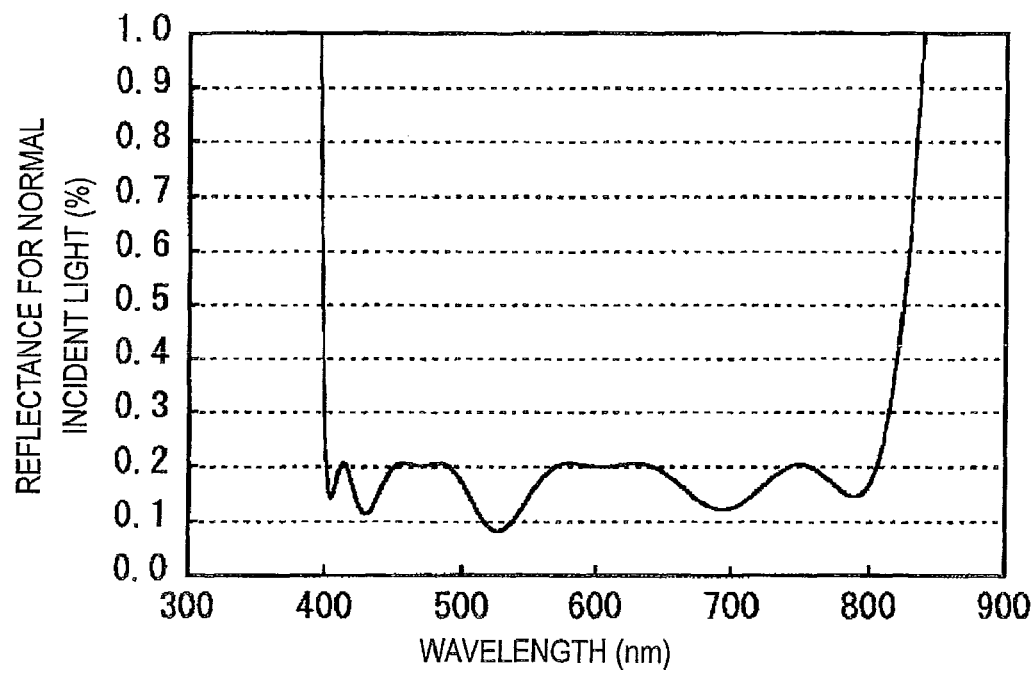
FIGS. 41A and 41B are reflectance distribution graphs of Example 9-2 corresponding to the reflection reducing film shown in FIG. 9.
Figure 41B:
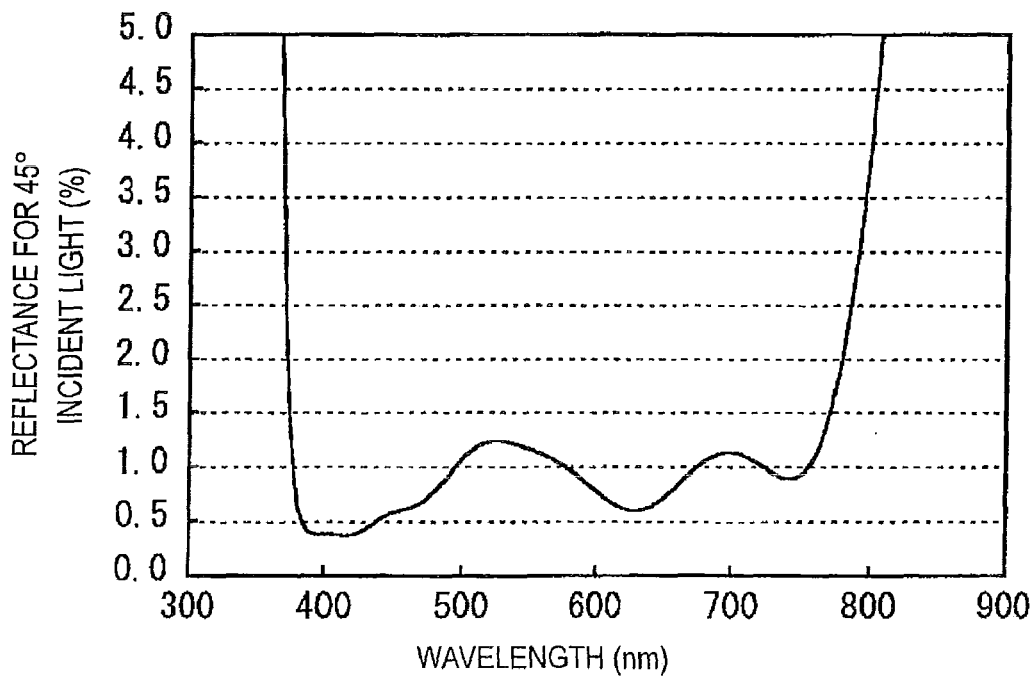
Figure 42A:
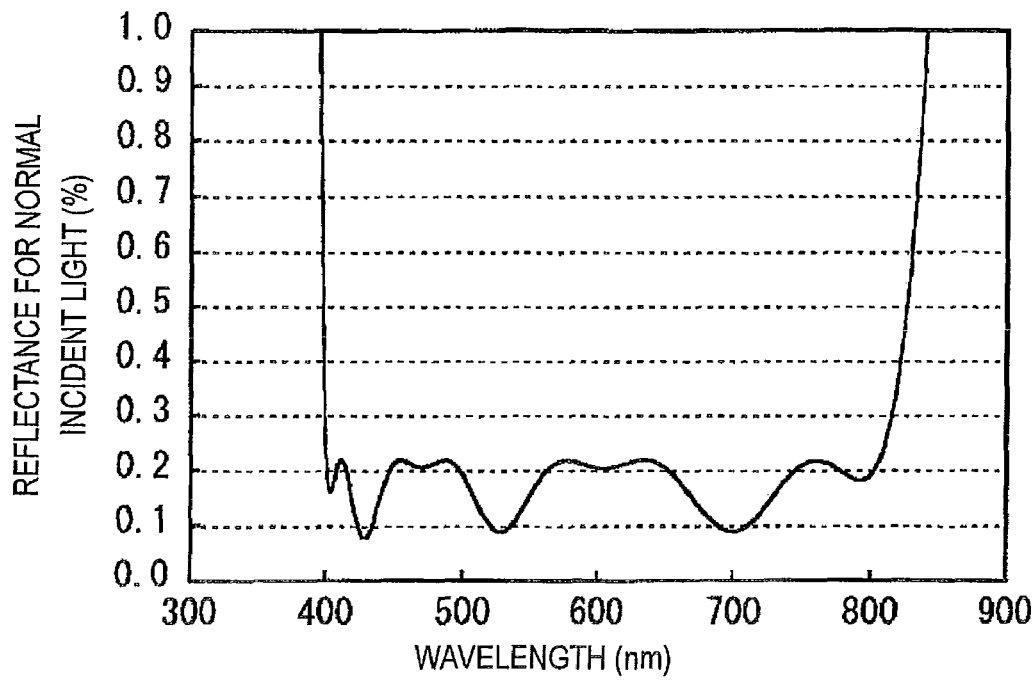
FIGS. 42A and 42B are reflectance distribution graphs of Example 9-3 corresponding to the reflection reducing film shown in FIG. 9.
Figure 42B:
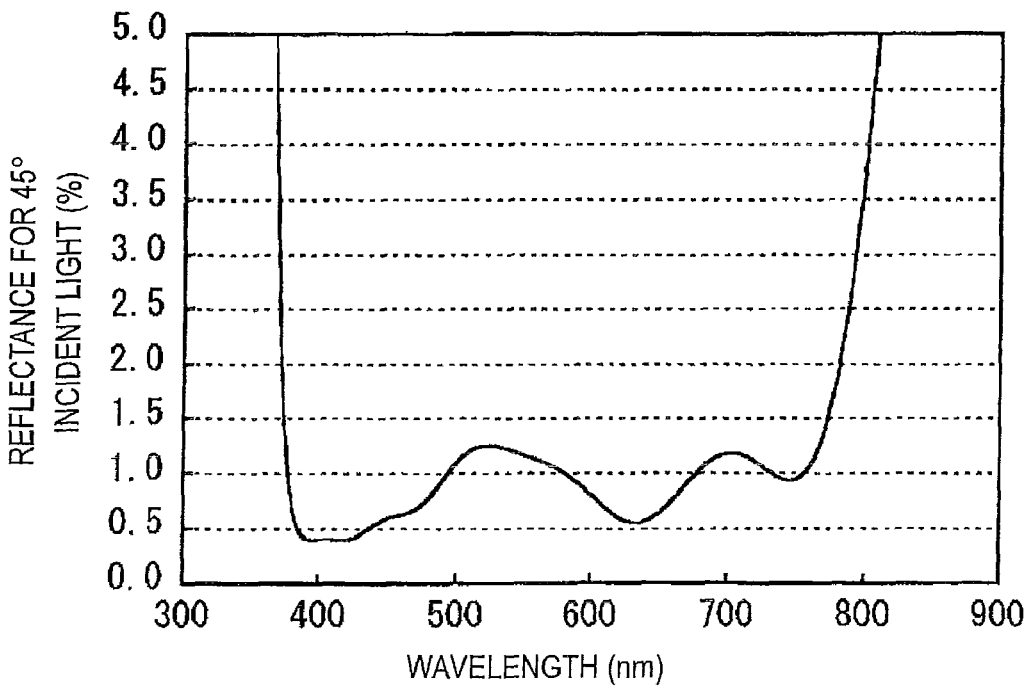

In FIGS. 41A, 42A and 43A, a vertical axis indicates a reflectance (%) for normal incident light and a horizontal axis indicates a wavelength λ (nm) upon measurement. As is obvious from the respective drawings, a reflectance is lower than 0.25% in a wavelength band of about 400 to 800 nm and excellent reflection characteristics are obtained. In FIGS. 41B, 42B and 43B, a vertical axis indicates a reflectance (%) for 45° incident light and a horizontal axis indicates a wavelength λ (nm) upon measurement. As is obvious from the respective drawings, a reflectance is lower than 1.5% in a wavelength band of about 400 to 750 nm and thus excellent reflection characteristics are obtained even for oblique incident light.

Tenth Numerical Examples

Figure 44A:
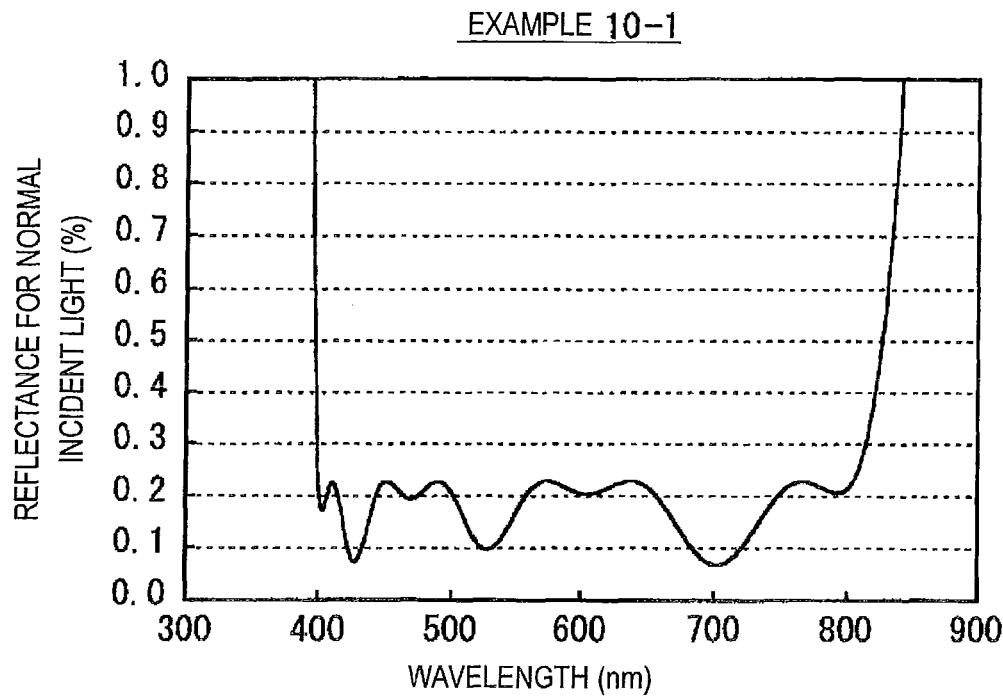
FIGS. 44A and 44B are reflectance distribution graphs of Example 10-1 corresponding to the reflection reducing film shown in FIG. 10.
Figure 44B:
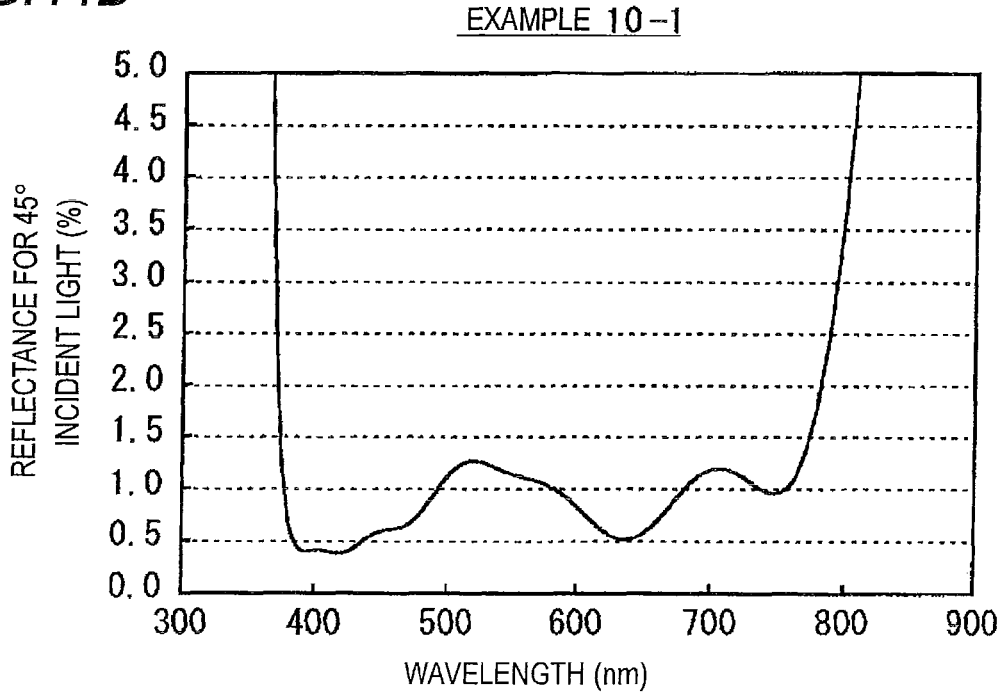
Figure 45:
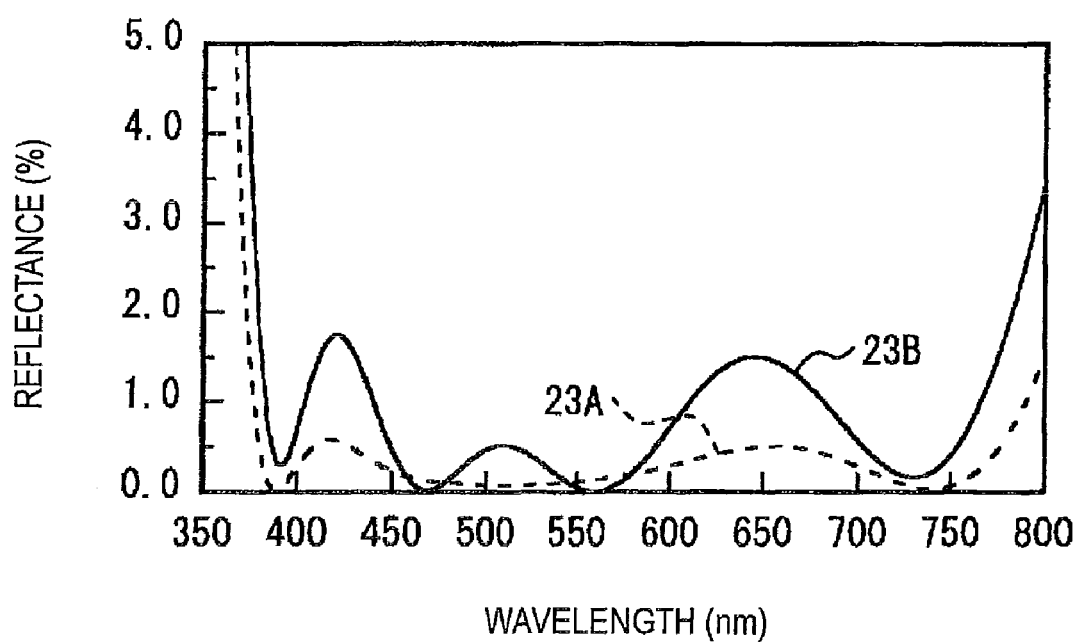
FIG. 45 is a reflectance distribution graph of Related examples 1 and 2.

Tenth numerical example (Example 10-1) is shown in Table 33 and FIGS. 44A and 44B. Herein, Table 33 shows basic data of Example 10-1 corresponding to the reflection reducing film 1060A shown in FIG. 10. FIGS. 44A and 44B show reflectance distributions of Example 10-1. Among them, FIG. 44A shows the reflectance distributions of normal incident light of the examples, and FIG. 44B shows the reflectance distributions of oblique incident light (45° incident light) of the examples.

TABLE 33

EXAMPLE 10-1

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| OPTICAL SUBSTRATE | CaF$_2$ | 1.4339 | — | — | |
| 12th LAYER | Y$_2$O$_3$ | 1.8098 | 17.511 | 31.691 | (0.058 λ) |
| 11th LAYER | MgF$_2$ | 1.3855 | 49.060 | 67.973 | (0.124 λ) |
| 10th LAYER | SUB-H4 | 2.0927 | 11.625 | 24.328 | (0.044 λ) |
| 9th LAYER | Al$_2$O$_3$ | 1.6376 | 153.914 | 252.050 | (0.458 λ) |
| 8th LAYER | MgF$_2$ | 1.3855 | 41.172 | 57.044 | (0.104 λ) |

TABLE 33-continued

EXAMPLE 10-1

CENTER WAVELENGTH λ = 550 nm

| | CONSTITUENT MATERIAL | REFRACTIVE INDEX N | PHISICAL THICKNESS d | OPTICAL FILM THICKNESS INDEX N × d | |
|---|---|---|---|---|---|
| 7th LAYER | Al$_2$O$_3$ | 1.6376 | 104.235 | 170.695 | (0.310 λ) |
| 6th LAYER | SUB-H4 | 2.0927 | 129.592 | 271.197 | (0.493 λ) |
| 5th LAYER | Al$_2$O$_3$ | 1.6376 | 164.719 | 269.744 | (0.490 λ) |
| 4th LAYER | SUB-H4 | 2.0927 | 63.382 | 132.640 | (0.241 λ) |
| 3rd LAYER | Al$_2$O$_3$ | 1.6376 | 11.625 | 19.037 | (0.035 λ) |
| 2nd LAYER | SUB-H4 | 2.0927 | 44.900 | 93.962 | (0.171 λ) |
| 1st LAYER | MgF$_2$ | 1.3855 | 100.335 | 139.014 | (0.253 λ) |
| AIR | — | — | — | — | |

Table 33 shows the same items as in the above Tables 18 to 20. As is obvious from Table 33, the refractive indices N and the optical film thicknesses N×d of the first to ninth layers corresponding to a reflection reducing layer satisfy all the above-described conditional expressions (11) to (19).

In FIG. 44A, a vertical axis indicates a reflectance (%) for normal incident light and a horizontal axis indicates a wavelength λ (nm) upon measurement. As is obvious from FIG. 44A, a reflectance is lower than 0.25% in a wavelength band of about 400 to 800 nm and excellent reflection characteristics are obtained. In FIG. 44B, a vertical axis indicates a reflectance (%) for 45° incident light and a horizontal axis indicates a wavelength λ (nm) upon measurement. As is obvious from FIG. 44B, a reflectance is lower than 1.5% in a wavelength band of about 400 to 750 nm and thus excellent reflection characteristics are obtained even for oblique incident light.

As is obvious from the above basic data and reflectance distribution graphs, in the examples, stable low reflectance distribution of both of normal incident light and oblique incident light is achieved in a visible region. That is, according to the reflection reducing film of the invention, it was confirmed that a reflectance for oblique incident light was particularly sufficiently reduced in a wavelength band wider than in conventional cases and distribution of the reflectance can be made sufficiently uniform.

As above, the invention has been described using the embodiments and the examples, but is not limited to the embodiments and the examples, and various modifications may be made. For example, the refractive indices and the optical film thicknesses of the respective layers and the respective substrates are not limited to the values shown in the above numerical examples and other values can be taken. Further, the kinds of the materials for the respective layers and the respective substrates are not limited to those shown in the above numerical examples and other kinds of materials can be used.

Moreover, the respective layers may be composed of plural films based on an equivalent film theory. That is, the respective layers may be configured so as to act as an optical single layer by symmetrically laminating two kinds of films having different refractive indices.

What is claimed is:
1. A reflection reducing film comprising:
a reflection reducing layer that is provided on a substrate and includes first to eighth layers sequentially laminated from the opposite side to the substrate;
wherein the first and sixth layers are made of a low-refractive index material having a refractive index equal to or higher than 1.35 and equal to or lower than 1.50 at the d-line,
the third, fifth and seventh layers are made of an intermediate-refractive index material having a refractive index equal to or higher than 1.55 and equal to or lower than 1.85 at the d-line, and
the second, fourth and eighth layers are made of a high-refractive index material having a refractive index higher than that of the intermediate-refractive index material in the range of 1.70 to 2.50 at the
wherein all the following conditional expressions (1) to (8) are satisfied:

$$0.23 \times \lambda 0 \leq N1 \times d1 \leq 0.25 \times \lambda 0 \quad (1)$$

$$0.11 \times \lambda 0 \leq N2 \times d2 \leq 0.13 \times \lambda 0 \quad (2)$$

$$0.03 \times \lambda 0 \leq N3 \times d3 \leq 0.05 \times \lambda 0 \quad (3)$$

$$0.25 \times \lambda 0 \leq N4 \times d4 \leq 0.29 \times \lambda 0 \quad (4)$$

$$0.22 \times \lambda 0 \leq N5 \times d5 \leq 0.24 \times \lambda 0 \quad (5)$$

$$0.22 \times \lambda 0 \leq N6 \times d6 \leq 0.26 \times \lambda 0 \quad (6)$$

$$0.21 \times \lambda 0 \leq N7 \times d7 \leq 0.24 \times \lambda 0 \quad (7)$$

$$0.45 \times \lambda 0 \leq N8 \times d8 \; 0.53 \times \lambda 0 \quad (8)$$

where λ0 denotes a center wavelength, N1 to N8 denote refractive indices of the first to eighth layers at the center wavelength λ0, and d1 to d8 denote physical film thicknesses of the first to eighth layers.

2. The reflection reducing film according to claim 1, further comprising a buffer layer which has a single-layer structure made of the intermediate-refractive index material or a multilayer structure in which a layer coming into contact with the reflection reducing layer is made of the intermediate-refractive index material, between the substrate and the reflection reducing layer.

3. The reflection reducing film according to claim 2,
wherein a refractive index of the substrate at the d-line is equal to or higher than 1.66 and equal to or lower than 2.2,
wherein the buffer layer includes ninth to thirteenth layers sequentially laminated from the side of the reflection reducing layer, and
wherein the ninth, eleventh and thirteenth layers are made of the intermediate-refractive index material, and
the tenth and twelfth layers are made of the high-refractive index material.

4. The reflection reducing film according to claim 2,
wherein a refractive index of the substrate at the d-line is equal to or higher than 1.51 and equal to or lower than 1.72,
wherein the buffer layer includes ninth to eleventh layers sequentially laminated from the side of the reflection reducing layer, and
wherein the ninth and eleventh layers are made of the intermediate-refractive index material, and the tenth layer is made of the high-refractive index material.

5. The reflection reducing film according to claim 2,
wherein a refractive index of the substrate at the d-line is equal to or higher than 1.40 and equal to or lower than 1.58,
wherein the buffer layer includes ninth to twelfth layers sequentially laminated from the side of the reflection reducing layer, and
wherein the ninth and twelfth layers are made of the intermediate-refractive index material, the tenth layer is made of the high-refractive index material and the eleventh layer is made of the low-refractive index material, or
the ninth layer is made of the intermediate-refractive index material, the tenth and twelfth layers are made of the high-refractive index material and the eleventh layer is made of the low-refractive index material.

6. The reflection reducing film according to claim 1,
wherein the low-refractive index material includes at least one of magnesium fluoride ($MgF_2$), silicon dioxide ($SiO_2$) and aluminum fluoride ($AlF_3$),
wherein the intermediate-refractive index material includes at least one of praseodymium aluminate ($PrAlO_3$), lanthanum aluminate ($La_{2x}Al_{2y}O_{3(X+Y)}$), aluminum oxide ($Al_2O_3$), germanium oxide ($GeO_2$) and yttrium oxide ($Y_2O_3$), and
wherein the high-refractive index material includes at least one of lanthanum titanate ($LaTiO_3$), zirconium oxide ($ZrO_2$), titanium oxide ($TiO_2$), tantalum oxide ($Ta_2O_5$), niobium oxide ($Nb_2O_5$), hafnium oxide ($HfO_2$) and cerium oxide ($CeO_2$).

7. An optical member comprising the reflection reducing film according to claim 1 on a surface thereof.

8. An optical system comprising the optical member according to claim 7.

* * * * *